United States Patent
Yamamoto et al.

(10) Patent No.: US 9,686,559 B2
(45) Date of Patent: Jun. 20, 2017

(54) IMAGE DECODING DEVICE, AND IMAGE ENCODING DEVICE

(71) Applicant: SHARP KABUSHIKI KAISHA, Osaka-shi, Osaka (JP)

(72) Inventors: Tomoyuki Yamamoto, Osaka (JP); Tomohiro Ikai, Osaka (JP); Yukinobu Yasugi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 238 days.

(21) Appl. No.: 14/410,188

(22) PCT Filed: Jun. 19, 2013

(86) PCT No.: PCT/JP2013/066792
§ 371 (c)(1),
(2) Date: Dec. 22, 2014

(87) PCT Pub. No.: WO2014/007058
PCT Pub. Date: Jan. 9, 2014

(65) Prior Publication Data
US 2015/0334411 A1 Nov. 19, 2015

(30) Foreign Application Priority Data

Jul. 3, 2012 (JP) .................................. 2012-149979

(51) Int. Cl.
| | |
|---|---|
| *H04N 7/12* | (2006.01) |
| *H04N 11/02* | (2006.01) |
| *H04N 11/04* | (2006.01) |
| *H04N 19/30* | (2014.01) |
| *H04N 19/55* | (2014.01) |
| *H04N 19/513* | (2014.01) |

(Continued)

(52) U.S. Cl.
CPC ........... *H04N 19/30* (2014.11); *H04N 19/513* (2014.11); *H04N 19/55* (2014.11); *H04N 19/70* (2014.11); *H04N 19/119* (2014.11)

(58) Field of Classification Search
CPC ............................. H04N 7/50; H04N 7/26244
See application file for complete search history.

(56) References Cited

U.S. PATENT DOCUMENTS

| | | |
|---|---|---|
| 2014/0037013 A1 | 2/2014 | Sato |
| 2014/0301446 A1 | 10/2014 | Maeda |
| 2015/0103896 A1* | 4/2015 | Kim ...................... H04N 19/52 |
| | | 375/240.12 |

FOREIGN PATENT DOCUMENTS

| | | |
|---|---|---|
| JP | 2013-102296 A | 5/2013 |
| WO | WO 2013/008538 A1 | 1/2013 |

OTHER PUBLICATIONS

"Advanced video coding for generic audiovisual services", ITU-T Telecommunication Standardization Sector of ITU, H.264, Series H: Audiovisual and Multimedia Systems, Nov. 2007, 564 pages.

(Continued)

*Primary Examiner* — Chikaodili E Anyikire
(74) *Attorney, Agent, or Firm* — Birch, Stewart, Kolasch & Birch, LLP

(57) ABSTRACT

Included is an inter-layer merge candidate derivation unit 1464B that derives motion information decoded in an area on a reference layer corresponding to an area which is located at a lower right part of a target PU and for which decoding has not been performed, in the target PU of a target layer, as a merge candidate.

4 Claims, 39 Drawing Sheets

(51) Int. Cl.
H04N 19/70 (2014.01)
H04N 19/119 (2014.01)

(56) References Cited

OTHER PUBLICATIONS

Bross et al., "High efficiency video coding (HEVC) text specification draft 7", Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 272 pages.

Hong et al., "Scalability Support in HEVC", Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-15.

Misra et al., "Description of scalable video coding technology proposal by Sharp (proposal 1)", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 1-36.

* cited by examiner

| Intra prediction mode | Associated names |
|---|---|
| 0 | Intra_Planar |
| 1 | Intra_DC |
| Otherwise (2..34) | Intra_Angular |
| 35 | Intra_FromLuma (used only for chroma) |

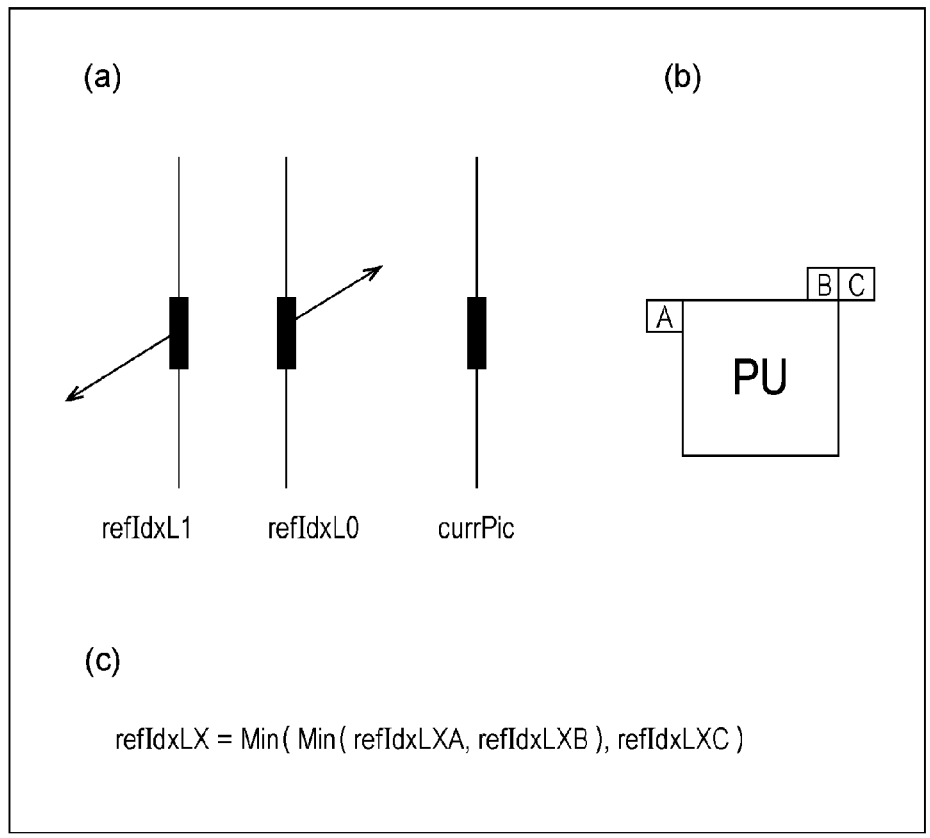

FIG. 30
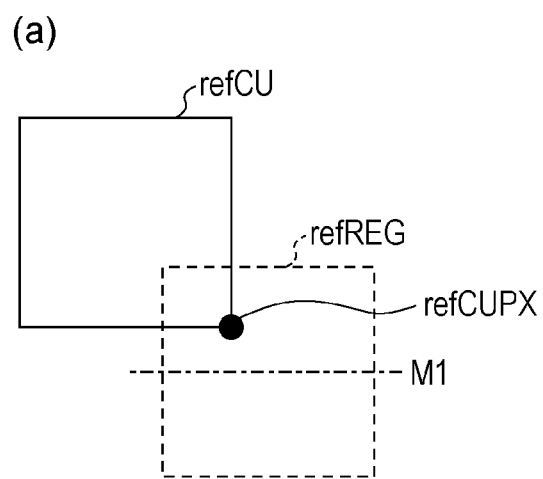
(a)
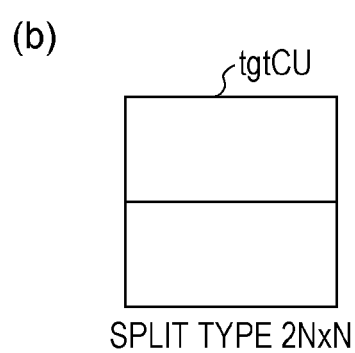
(b)
SPLIT TYPE 2N×N

FIG. 31
(a)
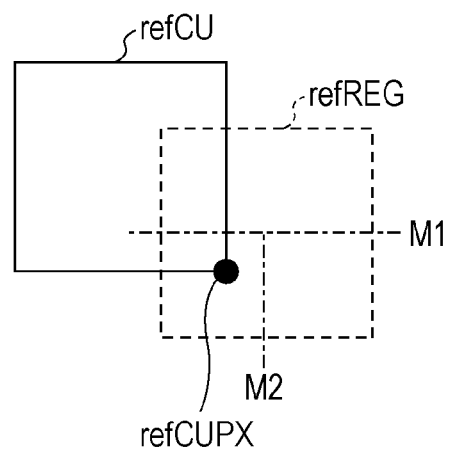
(b)
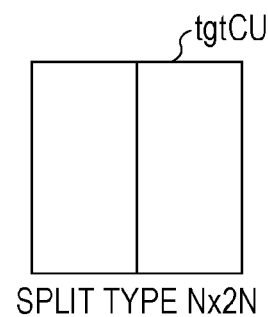
SPLIT TYPE Nx2N

FIG. 32
(a)
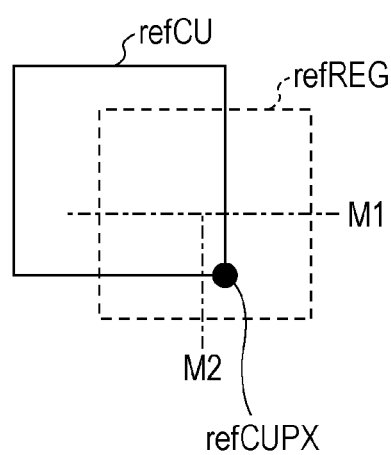
(b)
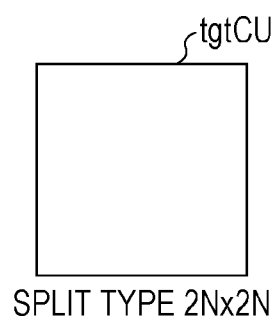
SPLIT TYPE 2Nx2N

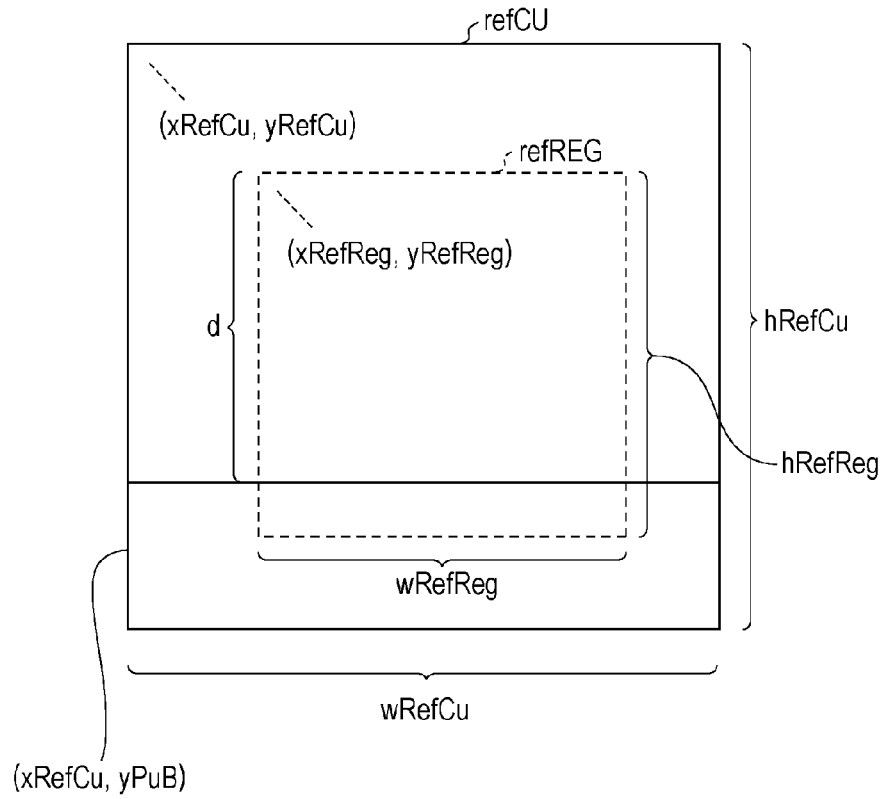

FIG. 42

| coding_unit( x0, y0, log2CbSize ) { | Descriptor |
|---|---|
|   CurrCbAddrTS = MinCbAddrZS[ x0 >> Log2MinCbSize ][ y0 >> Log2MinCbSize ] | |
|   if( slice_type != I ) | |
|     skip_flag[ x0 ][ y0 ] | ae(v) |
|   if( skip_flag[ x0 ][ y0 ] ) | |
|     prediction_unit( x0, y0 , log2CbSize ) | |
|   else { | |
|     base_mode_flag[x0][y0] | ae(v) |
|     if( slice_type != I  && !base_mode_flag[x0][y0]) | |
|       pred_mode_flag | ae(v) |
|     if( ( PredMode != MODE_INTRA  \|\|  log2CbSize = = Log2MinCbSize ) && !base_mode_flag[x0][y0]) | |
|       part_mode | ae(v) |
|     x1 = x0 + ( ( 1 << log2CbSize ) >> 1 ) | |
|     y1 = y0 + ( ( 1 << log2CbSize ) >> 1 ) | |
|     x2 = x1 − ( ( 1 << log2CbSize ) >> 2 ) | |
|     y2 = y1 − ( ( 1 << log2CbSize ) >> 2 ) | |
|     x3 = x1 + ( ( 1 << log2CbSize ) >> 2 ) | |
|     y3 = y1 + ( ( 1 << log2CbSize ) >> 2 ) | |
|     if( PartMode = = PART_2Nx2N ) | |
|       prediction_unit( x0, y0 , log2CbSize ) | |
|     else if( PartMode = = PART_2NxN ) { | |
|       prediction_unit( x0, y0 , log2CbSize ) | |
|       prediction_unit( x0, y1 , log2CbSize ) | |
|     } else if( PartMode = = PART_Nx2N ) { | |
|       prediction_unit( x0, y0 , log2CbSize ) | |
|       prediction_unit( x1, y0 , log2CbSize ) | |
|     } else if( PartMode = = PART_2NxnU ) { | |
|       prediction_unit( x0, y0 , log2CbSize ) | |
|       prediction_unit( x0, y2 , log2CbSize ) | |
|     } else if( PartMode = = PART_2NxnD ) { | |
|       prediction_unit( x0, y0 , log2CbSize ) | |
|       prediction_unit( x0, y3 , log2CbSize ) | |
|     } else if( PartMode = = PART_nLx2N ) { | |
|       prediction_unit( x0, y0 , log2CbSize ) | |
|       prediction_unit( x2, y0 , log2CbSize ) | |
|     } else if( PartMode = = PART_nRx2N ) { | |
|       prediction_unit( x0, y0 , log2CbSize ) | |
|       prediction_unit( x3, y0 , log2CbSize ) | |
|     } else { /* PART_NxN */ | |
|       prediction_unit( x0, y0 , log2CbSize ) | |
|       prediction_unit( x1, y0 , log2CbSize ) | |
|       prediction_unit( x0, y1 , log2CbSize ) | |
|       prediction_unit( x1, y1 , log2CbSize ) | |
|     } | |
|   if( !pcm_flag ) { | |
|     if( PredMode != MODE_INTRA && !(PartMode = = PART_2Nx2N && merge_flag[x0][y0]) ) | |
|       no_residual_data_flag | ae(v) |
|     if( !no_residual_data_flag ) { | |
|       MaxTrafoDepth = ( PredMode = = MODE_INTRA ? max_transform_hierarchy_depth_intra + IntraSplitFlag : max_transform_hierarchy_depth_inter ) | |
|       transform_tree( x0, y0, x0, y0, x0, y0, log2CbSize, log2CbSize, log2CbSize, 0, 0 ) | |
|     } | |
|   } | |
|   } | |
| } | |

SYN11 → base_mode_flag[x0][y0]
SYN12 → if( slice_type != I && !base_mode_flag[x0][y0]) / pred_mode_flag
SYN13 → if( ( PredMode != MODE_INTRA || log2CbSize = = Log2MinCbSize ) && !base_mode_flag[x0][y0]) / part_mode

FIG. 43

| prediction_unit( x0, y0, log2CbSize ) { | Descriptor |
|---|---|
|   if( skip_flag[ x0 ][ y0 ] ) { | |
|     if( MaxNumMergeCand > 1 ) | |
|       merge_idx[ x0 ][ y0 ] | ae(v) |
|   } else if( PredMode == MODE_INTRA ) { | |
|     ... | |
|   } else { /* MODE_INTER */ | |
|     if (!base_mode_flag[x0][y0]) | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B ) | |
|         inter_pred_flag[ x0 ][ y0 ] | ae(v) |
|       if( inter_pred_flag[ x0 ][ y0 ] == Pred_LC ) { | |
|         if( num_ref_idx_lc_active_minus1 > 0 ) | |
|           ref_idx_lc[ x0 ][ y0 ] | ae(v) |
|         mvd_coding(mvd_lc[ x0 ][ y0 ][ 0 ],<br>            mvd_lc[ x0 ][ y0 ][ 1 ]) | |
|         mvp_lc_flag[ x0 ][ y0 ] | ae(v) |
|       } else { /* Pred_L0 or Pred_BI */ | |
|         if( num_ref_idx_l0_active_minus1 > 0 ) | |
|           ref_idx_l0[ x0 ][ y0 ] | ae(v) |
|         mvd_coding(mvd_l0[ x0 ][ y0 ][ 0 ],<br>            mvd_l0[ x0 ][ y0 ][ 1 ]) | |
|         mvp_l0_flag[ x0 ][ y0 ] | ae(v) |
|       } | |
|       if( inter_pred_flag[ x0 ][ y0 ] == Pred_BI ) { | |
|         if( num_ref_idx_l1_active_minus1 > 0 ) | |
|           ref_idx_l1[ x0 ][ y0 ] | ae(v) |
|         if( mvd_l1_zero_flag ) { | |
|           mvd_l1[ x0 ][ y0 ][ 0 ] = 0 | |
|           mvd_l1[ x0 ][ y0 ][ 1 ] = 0 | |
|         } else | |
|           mvd_coding( mvd_l1[ x0 ][ y0 ][ 0 ],<br>             mvd_l1[ x0 ][ y0 ][ 1 ] ) | |
|         mvp_l1_flag[ x0 ][ y0 ] | ae(v) |
|       } | |
|     } | |
|   } | |
| } | |

SYN21 brackets: from `if (!base_mode_flag[x0][y0])` through `mvp_l0_flag[ x0 ][ y0 ]`

IMAGE DECODING DEVICE, AND IMAGE ENCODING DEVICE

TECHNICAL FIELD

The present invention relates to an image decoding device that decodes hierarchically encoded data which has been obtained by hierarchically encoding an image, and an image encoding device that generates hierarchically encoded data by hierarchically encoding an image.

BACKGROUND ART

An example of either information transmitted in a communication system or information recorded in a storage device is an image or a moving image. In the related art, in order to transmit and store the image (hereinafter, including the moving image), a technology of encoding the image has been known.

As moving image coding schemes, H.264/MPEG-4, AVC, and high-efficiency video coding (HEVC) that is succeeding codec have been known (NPL 1).

In the moving image coding schemes, normally, a predicted image is generated based on a local decoded image obtained by encoding/decoding an input image, and a prediction residual (also referred to as "a difference image" or "a residual image") obtained by subtracting the predicted image from the input image (an original image) is encoded. Further, examples of a predicted image generation method include an inter-frame prediction (inter-prediction) and an intra-frame prediction (intra-prediction).

In the intra-prediction, a predicted image of a frame is sequentially generated, based on the local decoded image in the same frame.

In the inter-prediction, a predicted image is generated by inter-frame motion compensation. In most cases, information (a motion compensation parameter) regarding the motion compensation is not directly encoded in order to reduce an encoding amount. Thus, in the inter-prediction, the estimation of the motion compensation parameter is performed, based on the decoding situation around the target block.

For example, in the HEVC, a list of motion compensation parameter candidates (merge candidates) is generated in a prediction unit of a merge mode, and the motion compensation of the predicted image is performed by using the merge candidate that is selected as an index from the list. The list of the merge candidates includes spatial candidates which are derived based on the motion information of an adjacent region. During the derivation of the spatial candidates, the adjacent regions are selected from the regions located in the upper left part, the upper right part, and the lower right part of a prediction unit which is a decoding target.

Meanwhile, the motion compensation is performed by generating a list of the motion compensation parameter candidates (prediction motion vector candidates), and deriving the motion compensation parameter from the motion compensation candidate which is selected as an index from the list and a difference motion vector, in the prediction unit other than that of the merge mode.

Further, in recent years, a hierarchical encoding technology for hierarchically encoding an image according to a required data rate has been proposed.

Examples of the hierarchical encoding method include an H.264/AVC Annex G Scalable Video Coding (SVC) as the standard of ISO/IEC and ITU-T.

The SVC supports spatial scalability, temporal scalability, and SNR scalability. For example, in a case of the spatial scalability, an image obtained by down-sampling an original image to a desired resolution is encoded as a lower layer in the H.264/AVC. Next, the inter-layer prediction is performed in an upper layer in order to remove redundancy between layers.

Examples of the inter-layer prediction include motion information prediction that predicts information regarding the motion prediction, from information of the lower layer at the same time, or texture prediction that performs prediction from an image obtained by up-sampling a decoded image of the lower layer at the same time (NPL 2). In the motion information prediction, motion information is encoded, with the motion information of a reference layer as an estimation value.

CITATION LIST

Non Patent Literature

NPL 1: "High efficiency video coding (HEVC) text specification draft 7 (JCTVC-I1003_d1)", Joint Collaborative Team on Video Coding (JCT-VC) of ITU-T SG16 WP3 and ISO/IEC JTC1/SC29/WG11 9th Meeting: Geneva, CH, 27 Apr.-7 May 2012 (published in April, 2012)

NPL 2: ITU-T H.264 "Advanced video coding for generic audiovisual services" (published in November, 2007)

SUMMARY OF INVENTION

Technical Problem

However, in the related art relating to the derivation of the merge candidates as described above, there are large pieces of motion information corresponding to the upper left region, and small pieces of motion information corresponding to the lower right region, in the motion information included in the candidate list. That is because the motion information corresponding to the lower right region is not derived in the same layer, and thus the motion information cannot be used as the merge candidate. Therefore, the estimation accuracy of the motion information is not sufficient, and thus there has been a case where a desired code amount reducing effect is not achieved.

The present invention has been made in view of the above problems, and an object is to realize an image decoding device and an image encoding device which are capable of reducing the code amount of motion information, by deriving various pieces of motion information as candidates, in the generation of the motion information candidate list in the hierarchical encoding.

Solution to Problem

In order to solve the above problems, an image decoding device according to the present invention is an image decoding device which decodes hierarchically encoded data obtained by hierarchically encoding image information regarding images of different qualities for respective layers, restores motion information of a target layer which is a decoding target, and restores an image of the target layer by using a predicted image generated by motion compensation prediction based on the restored motion information, including inter-layer candidate derivation means for deriving motion information which is decoded in a region on a reference layer corresponding to a non-decoded region in an adjacent region including a target prediction unit, as a candidate for estimating motion information in the target prediction unit, by referring to the reference layer which is a decoded layer, in the target prediction unit which is a processing target of predicted image generation in the target layer.

The image decoding device is a so-called hierarchical image decoding device which decodes hierarchically encoded data obtained by hierarchically encoding image information regarding images of different qualities for respective layers, and restores an image.

Such a hierarchical coding scheme may be referred to as scalable video coding (SVC), and is standardized in for example, H.264/AVC Annex G SVC. Further, the quality of the moving image described herein broadly means the elements affecting the subjective and objective appearance of the moving image. The quality of the moving image includes, for example, "resolution", "frame rate", and "image quality". Hereinafter, the layer corresponding to a higher quality is referred to as a higher layer, and the layer corresponding to a lower quality is referred to as a lower layer.

In the above configuration, the target layer refers to a layer which is a decoding target.

According to the above configuration, the motion information in the target layer is restored, and the image of the target layer is restored by using a predicted image generated by motion compensation prediction based on the restored motion information. Such prediction method by the motion compensation prediction based on the restored motion information may be referred to as an inter-prediction method.

According to the above configuration, the reference layer which is a decoded layer is referred to, in a target prediction unit which is a processing target of predicted image generation of the target layer.

In a hierarchical coding scheme, during the decoding of the target layer, the image information of the decoded layer is referred to, in some cases. In this manner, during the decoding of the target layer, the layer to be referred is called a reference layer. In general, the reference layer is a lower layer of the target layer. However, all lower layers of the target layer may not be referred to, and the lower layer in which information required for decoding at least the target layer is decoded may be referred to.

According to the above configuration, motion information which is decoded in a region on the reference layer corresponding to a non-decoded region in adjacent regions including the target prediction unit is derived as a candidate for estimating motion information in the target prediction unit.

The adjacent regions including the target prediction unit is a region located in a predetermined range from the target prediction unit and including the target prediction unit. The adjacent regions including the target prediction unit includes, for example, adjacent regions of the target prediction unit. The non-decoded region means a region in which the motion information is not decoded.

In addition, the candidate for estimating the motion information is information for estimating the motion compensation parameter based on a decoding situation around the target prediction unit. For example, it corresponds to a merge candidate in HEVC. Such candidates are classified into one or plurality of lists. The list may be referred to as a merge candidate list.

According to the above configuration, it is possible to add the motion information on the reference region corresponding to a region which cannot be used due to non-decoding, on the same layer, in the merge candidate list.

Accordingly, there is an effect in which the code amount of motion information can be reduced by deriving various pieces of motion information as candidates, in the generation of a motion information candidate list of hierarchical encoding.

In the image decoding device according to the present invention, it is preferable that the region on the reference layer corresponding to the non-decoded region in the adjacent region including the target prediction unit be a lower right region which is a region of a predetermined range including a lower right pixel in the region on the reference layer corresponding to the target prediction unit.

According to the above configuration, it is possible to add the motion information of the region of the predetermined range surrounding the lower right pixel of the target prediction unit which cannot be used due to non-decoding on the same layer, as the candidate of the motion information. Since there is a high possibility that the motion information derived in the vicinity of the lower right pixel of the region on the reference layer has a property different from that of the motion information of the upper left region of the target layer, a higher code amount reduction effect is expected.

In the image decoding device according to the present invention, it is preferable that the lower right region be a motion information recording unit including a lower right pixel in a region on a reference layer corresponding to the target prediction unit.

According to the above configuration, it is possible to add the motion information corresponding to the lower right pixel of the target prediction unit which cannot be used due to non-decoding on the same layer, as the candidate of the motion information. Since there is a high possibility that the motion information corresponding to the lower right pixel has a property different from that of the motion information of the upper left region, a higher code amount reduction effect is expected.

In the image decoding device according to the present invention, it is preferable that the lower right region be a motion information recording unit that is adjacent to any of a right part, a lower part, and a lower right part of a motion information recording unit including a lower right pixel in a region on a reference layer corresponding to the target prediction unit.

When the target prediction unit or a region on a reference layer corresponding to the target prediction unit is small, there is a possibility that a pixel corresponding to an upper left position in a region on the reference layer and a pixel corresponding to a lower right position belong to the same motion information recording unit.

According to the above configuration, it is possible to use motion information of the motion information recording unit that is adjacent to any of the right part, the lower part, and the lower right part of the motion information recording unit including the lower right pixel in the region on the reference layer corresponding to the target prediction unit. Therefore, the possibility of deriving motion information from a recording unit different from the upper left part in the corresponding reference region increases. Thus, the possibility of deriving various pieces of motion information increases.

In the image decoding device according to the present invention, it is preferable that the inter-layer candidate derivation means derives a plurality of pieces of motion information including the motion information of the lower right region as the candidate, and derive the motion information of the lower right region in preference to other motion information.

According to the above configuration, even when a plurality of pieces of motion information including the motion information of the lower right region is not available, the candidate of the motion information may be derived in some cases.

In the image decoding device according to the present invention, it is preferable that the inter-layer candidate derivation means derive, at least, motion information of the motion information recording unit including the upper left pixel in a region on the reference layer corresponding to the target prediction unit, as the other motion information.

According to the above configuration, even when the motion information of the motion information recording unit including the lower right pixel is not available, it is possible to add motion information of a region having a high possibility of use of the motion information.

The image decoding device according to the present invention, preferably further includes determination means for determining whether motion information which is derived as a candidate matches motion information which is derived as a candidate, and it is preferable that the inter-layer candidate derivation means derive the other motion information as a candidate, in a case where the determination means determines that the other motion information to be derived as a candidate does not match motion information of the lower right region.

According to the above configuration, it is possible to avoid the overlap of motion information to be derived as a candidate.

The image decoding device according to the present invention preferably further includes target layer candidate derivation means for deriving a candidate of motion information, based on decoding information which is decoded in the target layer, and it is preferable that the determination means do not perform match determination of motion information which is derived as a candidate by the inter-layer candidate derivation means and motion information which is derived as a candidate by the target layer candidate derivation means.

When performing the match determination of the motion information which is derived as a candidate by the inter-layer candidate derivation means and the motion information which is derived as a candidate by the target layer candidate derivation means, a possibility of performing a candidate derivation process of motion information by the inter-layer candidate derivation means and a candidate derivation process of motion information by the target layer candidate derivation means in parallel is lowered. For example, when performing the match determination described above, after the candidate derivation process of motion information by the inter-layer candidate derivation means is ended, the candidate derivation process of motion information by the target layer candidate derivation means is performed in series.

In contrast, according to the above configuration, the match determination is performed for the motion information which is derived as a candidate by the target layer candidate derivation means, and the match determination described above is not performed.

Therefore, it is possible to increase a possibility of performing the candidate derivation process of motion information by the inter-layer candidate derivation means and the candidate derivation process of motion information by the target layer candidate derivation means in parallel.

The image decoding device according to the present invention preferably further includes spatial motion information candidate derivation means for deriving a candidate of motion information, based on decoded motion information in the adjacent region of the target prediction unit; and determination means for determining whether motion information which is derived as a candidate matches motion information which is derived as a candidate, and it is preferable that in a case where determination means determines that motion information to be derived as a candidate does not match a candidate of motion information having a highest priority, among candidates of motion information which are derived by the spatial motion information candidate derivation means, the inter-layer candidate derivation means derive the motion information as a candidate.

According to the above configuration, when motion information to be derived as a candidate by the inter-layer candidate derivation means does not match a candidate of motion information having a highest priority, among candidates of motion information which are derived by the spatial motion information candidate derivation means, the inter-layer candidate derivation means derives the motion information as a candidate.

Therefore, it is possible to increase the parallelism while preventing motion information having a highest priority from being derived while being overlapped.

In other words, it is possible to reduce a possibility that the same merge candidate is included in the candidate list while suppressing a decrease in the parallelism.

The image decoding device according to the present invention preferably further includes time motion information candidate derivation means for deriving a candidate of motion information, based on motion information decoded in a picture other than a picture to which the target prediction unit belongs, and it is preferable that in a case where a candidate derivation process of motion information by the inter-layer candidate derivation means is performed, the time motion information candidate derivation means do not perform the candidate derivation process of motion information.

The image decoding device according to the present invention preferably further includes time motion information candidate derivation means for deriving a candidate of motion information, based on motion information decoded in a picture other than a picture to which the target prediction unit belongs, and it is preferable that in a case where a candidate derivation process of the motion information by the time motion information candidate derivation means is performed, the inter-layer candidate derivation means do not perform the candidate derivation process of motion information.

There is no great difference between a reduced code amount of motion information when both the inter-layer candidate derivation means and the time motion information candidate derivation means derive a candidate of motion information and a reduced code amount of motion information when any of the inter-layer candidate derivation means and the time motion information candidate derivation means derives a candidate of motion information.

According to the above configuration, in a case of deriving a candidate of the motion information by the inter-layer candidate derivation means, the time motion information candidate derivation means does not derive the candidate of the motion information.

As a result, the time motion information candidate derivation means can reduce the processing amount required for deriving a candidate of the motion information and a memory amount for recording a motion vector of the reference image, while suppressing a great increase in a code amount of motion information. In addition, the reverse is also considered to be the same.

In order to solve the above problems, an image encoding device according to the present invention is an image encoding device which generates a prediction residual of a target layer by subtracting a predicted image which is generated by motion compensation prediction based on motion information which is derived in the target layer which is an encoding target, from an input original image of the target layer, in a case of generating hierarchically encoded data obtained by hierarchically encoding image information regarding images of different qualities for respective layers, including inter-layer candidate derivation means for deriving motion information which is decoded in a region on a reference layer corresponding to a non-decoded region in an adjacent region including a target prediction unit, as a candidate for estimating motion information in the target prediction unit, by referring to the reference layer which is a decoded layer, in the target prediction unit which is a processing target of predicted image generation in the target layer.

The image encoding device configured as described above also belongs to a scope of the present invention, and even in this case, it is possible to achieve the same operation and effect as the image decoding device.

In addition, the data structures of the hierarchically encoded data which is generated by the image encoding device and decoded by the image decoding device also belong to the scope of the present invention.

Advantageous Effects of Invention

An image decoding device according to the present invention is an image decoding device which decodes hierarchically encoded data obtained by hierarchically encoding image information regarding images of different qualities for respective layers, restores motion information of a target layer which is a decoding target, and restores an image of the target layer by using a predicted image generated by motion compensation prediction based on the restored motion information, and is configured to include inter-layer candidate derivation means for deriving motion information which is decoded in a region on a reference layer corresponding to a non-decoded region in an adjacent region including a target prediction unit, as a candidate for estimating the motion information in the target prediction unit, by referring to the reference layer which is a decoded layer, in the target prediction unit which is a processing target of predicted image generation in the target layer.

An image encoding device according to the present invention is an image encoding device which generates a prediction residual of a target layer by subtracting a predicted image which is generated by motion compensation prediction based on motion information which is derived in the target layer which is an encoding target, from an input original image of the target layer, when generating hierarchically encoded data obtained by hierarchically encoding image information regarding images of different qualities for respective layers, and is configured to include inter-layer candidate derivation means for deriving motion information which is decoded in a region on a reference layer corresponding to a non-decoded region in an adjacent region including a target prediction unit, as a candidate for estimating motion information in the target prediction unit, by referring to the reference layer which is a decoded layer, in the target prediction unit which is a processing target of predicted image generation in the target layer.

Accordingly, there is an effect in which the code amount of motion information can be reduced by deriving various pieces of motion information as candidates, in the generation of a motion information candidate list of hierarchical encoding.

BRIEF DESCRIPTION OF DRAWINGS

FIG. 13 is a diagram illustrating an operation of a time merge candidate derivation unit included in the merge candidate derivation unit.

FIG. 14 is a diagram illustrating an example of a merge candidate combination list.

FIG. 15 is a diagram illustrating an operation of a zero merge candidate derivation unit included in the merge candidate derivation unit.

FIG. 30 is a diagram illustrating a method of setting a PU split type, by using a result obtained by determining a position in the reference region of a position of a lower right pixel of the reference CU.

FIG. 31 is a diagram illustrating the method of setting the PU split type, by using a result obtained by determining the position in the reference region of the position of the lower right pixel of the reference CU.

FIG. 32 is a diagram illustrating the method of setting the PU split type, by using a result obtained by determining the position in the reference region of the position of the lower right pixel of the reference CU.

FIG. 40 is a diagram illustrating the determination of the degree of overlap of the overlapping region in more detail.

FIG. 41 is a table illustrating a relationship between a syntax element value and a CU type.

FIG. 42 is a syntax table in a case of coding a base_mode_flag in a coding_unit.

FIG. 43 is a syntax table in a case of determining the base_mode_flag in a prediction_unit.

DESCRIPTION OF EMBODIMENTS

A hierarchical moving image decoding device 1 and a hierarchical moving image encoding device 2 according to an embodiment of the present invention will be described with reference to FIGS. 1 to 46.

[Overview]

The hierarchical moving image decoding device (image decoding device) 1 according to the embodiment decodes encoded data that has been subjected to scalable video coding (SVC) by the hierarchical moving image encoding device (image encoding device) 2. The scalable video coding refers to a coding scheme is a coding scheme of hierarchically encoding a moving image from a low quality to a high quality. The scalable video coding is standardized by, for example, H.264/AVC Annex G SVC. Further, the quality of the moving image described herein broadly means the elements affecting the subjective and objective appearance of the moving image. The quality of a moving image includes, for example, "a resolution", "a frame rate", "an image quality", and "representation accuracy of a pixel". Accordingly, hereinafter, the meaning that the quality of the moving image is different illustratively indicates that "the resolutions" and the like are different, but is not limited thereto. For example, in the case of the moving images which are quantized in different quantization steps (in other words, in the case of the moving image which is encoded by different encoding noises), it may be said that the qualities of the moving images are different.

Further, the SVC may be classified into (1) spatial scalability, (2) time scalability, and (3) signal to noise ratio (SNR) scalability, in terms of the type of information to be hierarchized. The spatial scalability is a technology for hierarchizing data in a resolution or an image size. The time scalability is a technology for hierarchizing data in a frame rate (the number of frames per unit time). Further, the SNR scalability is a technology for hierarchizing data in a coding noise.

Prior to the detailed description of the hierarchical moving image encoding device 2 and the hierarchical moving image decoding device 1 according to the present embodiment, first, (1) a layer structure of the hierarchically encoded data to be generated by the hierarchical moving image encoding device 2 and decoded by the hierarchical moving image decoding device 1 will be described, and subsequently, a (2) a detailed example of a data structure that can be employed in each layer will be described.

[Layer Structure of Hierarchically Encoded Data]

Figure 2:
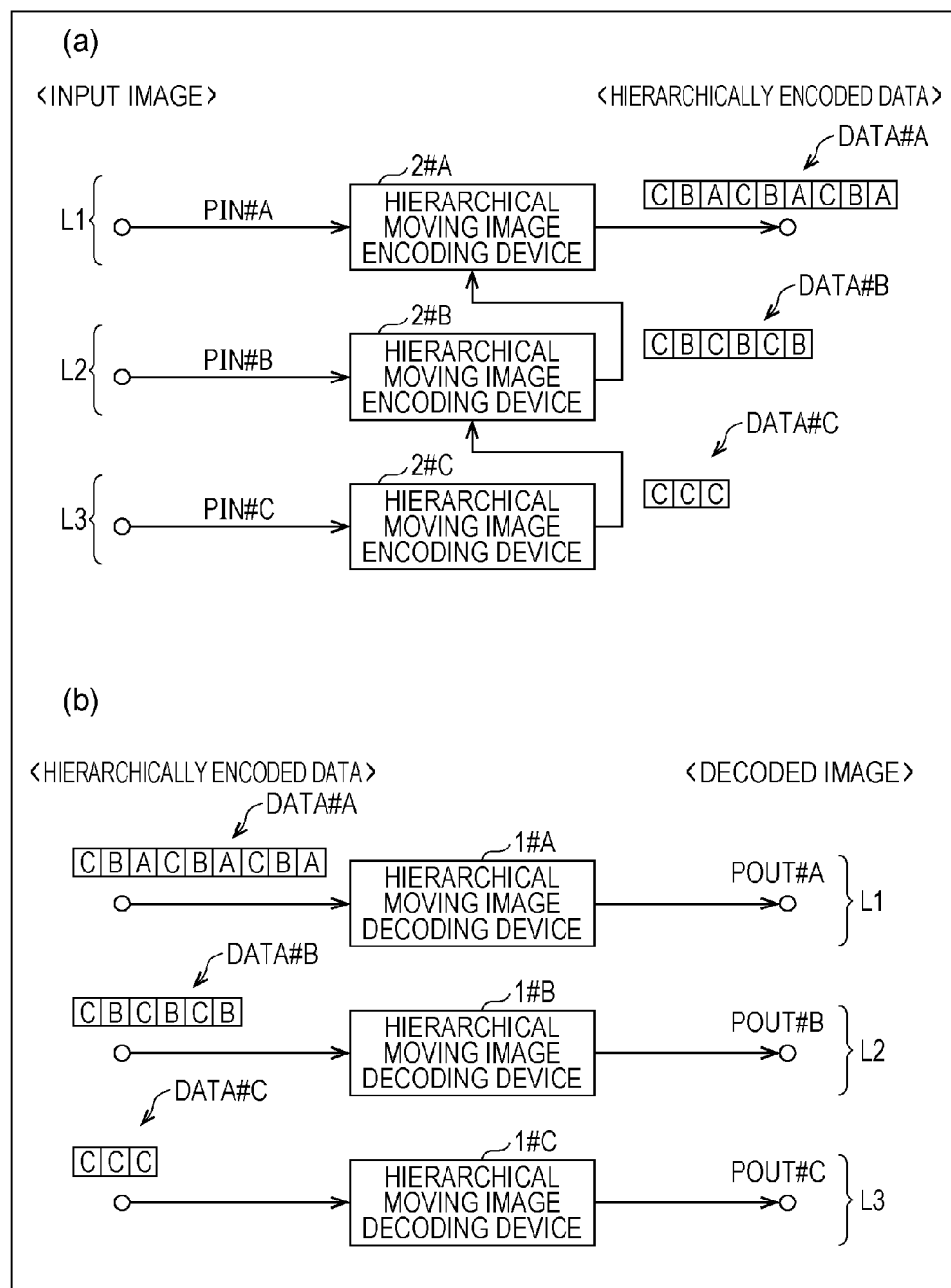
FIG. 2 is a diagram illustrating a layer structure of hierarchically encoded data according to the embodiment of the present invention, (a) illustrates a hierarchical moving image encoding device, and (b) illustrates a hierarchical moving image decoding device.

Here, a description of encoding and decoding of the hierarchically encoded data using FIG. 2 is as follows. FIG. 2 is a diagram schematically illustrating a case of hierarchically encoding/decoding a moving image into three hierarchies moving image of a lower hierarchy L3, a middle hierarchy L2, and an upper hierarchy L1. In other words, in the examples illustrated in FIGS. 2(a) and (b), among three hierarchies, the upper hierarchy L1 is a highest layer, and the lower hierarchy L3 is a lowest layer.

In the following description, a decoded image corresponding to a specific quality which is obtained by decoding the hierarchically encoded data is referred to as a decoded image of a specific hierarchy (or a decoded image corresponding to a specific hierarchy) (for example, a decoded image POUT#A of the upper hierarchy L1).

FIG. 2(a) illustrates hierarchical moving image encoding devices 2#A to 2#C that generate encoded data DATA#A to DATA#C by hierarchically encoding respective input images PIN#A to PIN#C. FIG. 2(b) illustrates hierarchical moving image decoding devices 1#A to 1#C that generate decoded images POUT#A to POUT#C by decoding respective pieces of encoded data DATA#A to DATA#C which are hierarchically encoded.

First, a description will be given of the encoding devices with reference to FIG. 2(a). The input images PIN#A, PIN#B, and PIN#C which are inputs of the encoding devices have the same original image, but have different image qualities (resolution, frame rate, image quality, and the like). The image quality is lowered in the order of the input images PIN#A, PIN#B, and PIN#C.

The hierarchical moving image encoding device 2#C of the lower hierarchy L3 generates the encoded data DATA#C of the lower hierarchy L3 by encoding the input image PIN#C of the lower hierarchy L3. The encoded data DATA#C includes basic information required for decoding the decoded image POUT#C of the lower hierarchy L3 (denoted by "C" in FIG. 2). Since the lower hierarchy L3 is a lowest hierarchy, the encoded data DATA#C of the lower hierarchy L3 is referred to as basic encoded data.

Further, the hierarchical moving image encoding device 2#B of the middle hierarchy L2 generates encoded data DATA#B of the middle hierarchy L2 by encoding the input image PIN#B of the middle hierarchy L2 while referring to the encoded data DATA#C of the lower hierarchy. The encoded data DATA#B of the middle hierarchy L2 includes additional information (denoted by "B" in FIG. 2) required for decoding the decoded image POUT#B of the middle hierarchy, in addition to the basic information "C" included in the encoded data DATA#C.

Further, the hierarchical moving image encoding device 2#A of the upper hierarchy L1 generates encoded data DATA#A of the upper hierarchy L1 by encoding the input image PIN#A of the upper hierarchy L1 while referring to the encoded data DATA#B of the middle hierarchy L2. The encoded data DATA#A of the upper hierarchy L1 includes additional information (denoted by "A" in FIG. 2) required for decoding the decoded image POUT#A of the upper hierarchy, in addition to the basic information "C" required for decoding the decoded image POUT#C of the lower hierarchy L3, and the additional information "B" required for decoding the decoded image POUT#B of the middle hierarchy L2.

In this manner, the encoded data DATA#A of the upper hierarchy L1 includes information regarding the decoded image of a plurality of different qualities.

Next, a description will be given of the decoding devices with reference to FIG. 2(b). On the decoding device side, the decoding devices 1#A, 1#B, and 1#C respectively corresponding to the upper hierarchy L1, the middle hierarchy L2, and the lower hierarchy L3 respectively decode the encoded data DATA#A, DATA#B, and DATA#C so as to output the decoded images POUT#A, POUT#B, and POUT#C.

In addition, some pieces of information of hierarchically encoded data of the upper hierarchy are extracted and a specific decoding device of the lower hierarchy decodes the extracted information, thereby allowing a moving image of a specific quality to be played.

For example, the hierarchical moving image decoding device 1#B of the middle hierarchy L2 may extract information (in other words, "B" and "C" included in the hierarchically encoded data DATA#A) required for decoding the decoded image POUT#B, among the hierarchically encoded data DATA#A of the upper hierarchy L1, and decode the decoded image POUT#B. In other words, the decoding devices can decode the decoded images POUT#A, POUT#B, and POUT#C, based on the information included in the hierarchically encoded data DATA#A of the upper hierarchy L1.

In addition, hierarchically encoded data is not limited to the hierarchically encoded data of the above three hierarchies, and the hierarchically encoded data may be hierarchically encoded into two hierarchies, and hierarchically encoded into hierarchies of the number greater than three hierarchies.

Further, a part or all of the encoded data regarding the decoded image of the specific hierarchy is encoded independently of the other hierarchies, during decoding of a specific hierarchy, the hierarchically encoded data may be configured to be completed without referring to other hierarchical information. For example, in the example described above with reference to FIGS. 2(a) and (b), the decoding of the decoded image POUT#B has been described with reference to "C" and "B", but is not limited thereto. It is possible to configure the hierarchically encoded data such that the decoded image POUT#B can be decoded by using only "B".

In addition, in a case of realizing the SNR scalability, after the same original image is used as the input images PIN#A, PIN#B, and PIN#C, it is possible to generate hierarchically encoded data such that the decoded images POUT#A, POUT#B, and POUT#C have different image qualities. In this case, the hierarchical moving image encoding device of the lower hierarchy generates hierarchically encoded data by quantizing a prediction residual by using a larger quantization width, compared to the hierarchical moving image encoding device of the upper hierarchy.

In this specification, for convenience of explanation, terms are defined as follows. The following terms are used to represent the following technical matters, unless otherwise indicated.

Upper layer: A hierarchy which is located higher than a certain hierarchy is referred to as an upper layer. For example, in FIG. 2, the upper layer of the lower hierarchy L3 is the middle hierarchy L2 and the upper hierarchy L1. Further, the decoded image of the upper layer refers to a decoded image of a higher quality (for example, a resolution is high, a frame rate is high, an image quality is high, and the like).

Lower layer: A hierarchy which is located lower than a certain hierarchy refers to a lower layer. For example, in FIG. 2, the lower layer of the upper hierarchy L1 is the middle hierarchy L2 and the lower hierarchy L3. Further, the decoded image of the lower layer refers to a decoded image of a lower quality.

Target layer: A hierarchy which is a decoding target or encoding is referred to as a target layer.

Reference layer: A certain lower layer to be referred for decoding a decoded image corresponding to the target layer is referred to as a reference layer.

In the example illustrated in FIGS. 2(a) and (b), the reference layer of the upper hierarchy L1 is the middle hierarchy L2 and the lower hierarchy L3. However, without being limited thereto, it is possible to configure the hierarchically encoded data such that all lower layers may not be referred for decoding a certain layer. For example, the hierarchically encoded data may be configured such that the reference layer of the upper hierarchy L1 is one of the middle hierarchy L2 and the lower hierarchy L3.

Base layer: A hierarchy which is located in the lowest layer is referred to as a base layer. The decoded image of the base layer is a decoded image which is obtained by decoding the encoded data and has the lowest quality, and is referred to as a base decoded image. In other words, the base decoded image is a decoded image corresponding to a hierarchy of the lowest layer. The partially encoded data of the hierarchically encoded data required for decoding the base decoded image is referred to as base encoded data. For example, base information "C" included in the hierarchically encoded data DATA#A of the upper hierarchy L1.

Enhancement layer: the upper layer of the base layer is referred to as an enhancement layer.

Layer identifier: A layer identifier is intended to identify a hierarchy, and has a one-to-one correspondence with the hierarchy. The hierarchically encoded data includes a hierarchical identifier used for selecting partially encoded data required for decoding the decoded image of a specific hierarchy. The subset of the hierarchically encoded data associated with the layer identifier corresponding to the specific layer is referred to as layer representation.

In general, the layer representation of the hierarchy and/or the layer representation corresponding to the lower layer of the hierarchy are used for decoding of the decoded image of the specific hierarchy. In other words, the layer representation of the target layer and/or the layer representation of one or more hierarchies included in the lower layer of the target hierarchy are used for decoding of the decoded image of the target layer.

Inter-layer prediction: Inter-layer prediction means predicting a syntax element value of a target layer, encoding parameter used for decoding the target layer, and the like based on the syntax element value included in the layer representation of a hierarchy (reference layer) different from the layer representation of the target layer, a value derived from the syntax element value, and a decoded image. The inter-layer prediction for predicting the information regarding motion prediction from information of a reference layer (at the same time) may be referred to as motion information prediction. Further, the inter-layer prediction for performing prediction from an image obtained by up-sampling the decoded image of the lower layer (at the same time) may be referred to as texture prediction (or inter-layer intra-prediction). In addition, the hierarchy used for the inter-layer prediction is exemplarily a lower layer of the target layer. Further, the prediction performed in the target layer without using the reference layer may be referred to as intra-layer prediction.

In addition, the above terms are defined for only convenience of explanation, and the technical matters may be represented by different terms.

[Data Structure of Hierarchically Encoded Data]

Hereinafter, a case of using HEVC and the extension method as a coding scheme of generating encoded data of respective hierarchy will be described. However, without being limited thereto, the encoded data of respective hierarchies may be generated by a coding scheme such as MPEG-2 and H.264/AVC.

Further, the lower layer and the upper layer may be encoded by different coding schemes. Further, the encoded data of respective hierarchies may be supplied to the hierarchical moving image decoding device 1 through transmission paths different from each other, or may be supplied to the hierarchical moving image decoding device 1 through the same transmission path.

For example, in a case of performing scalable encoding on a high-resolution video (a moving image, 4K video data) in the base layer and one enhancement layer, and transmitting the video; in the base layer, the 4K video data is down-scaled, an interlaced video data is encoded by the MPEG-2 or H.264/AVC and transmitted over a television broadcasting network; and in the enhancement layer, the 4K video (progressive) is encoded by the HEVC, and may be transmitted over the Internet.

(Base Layer)

Figure 3:
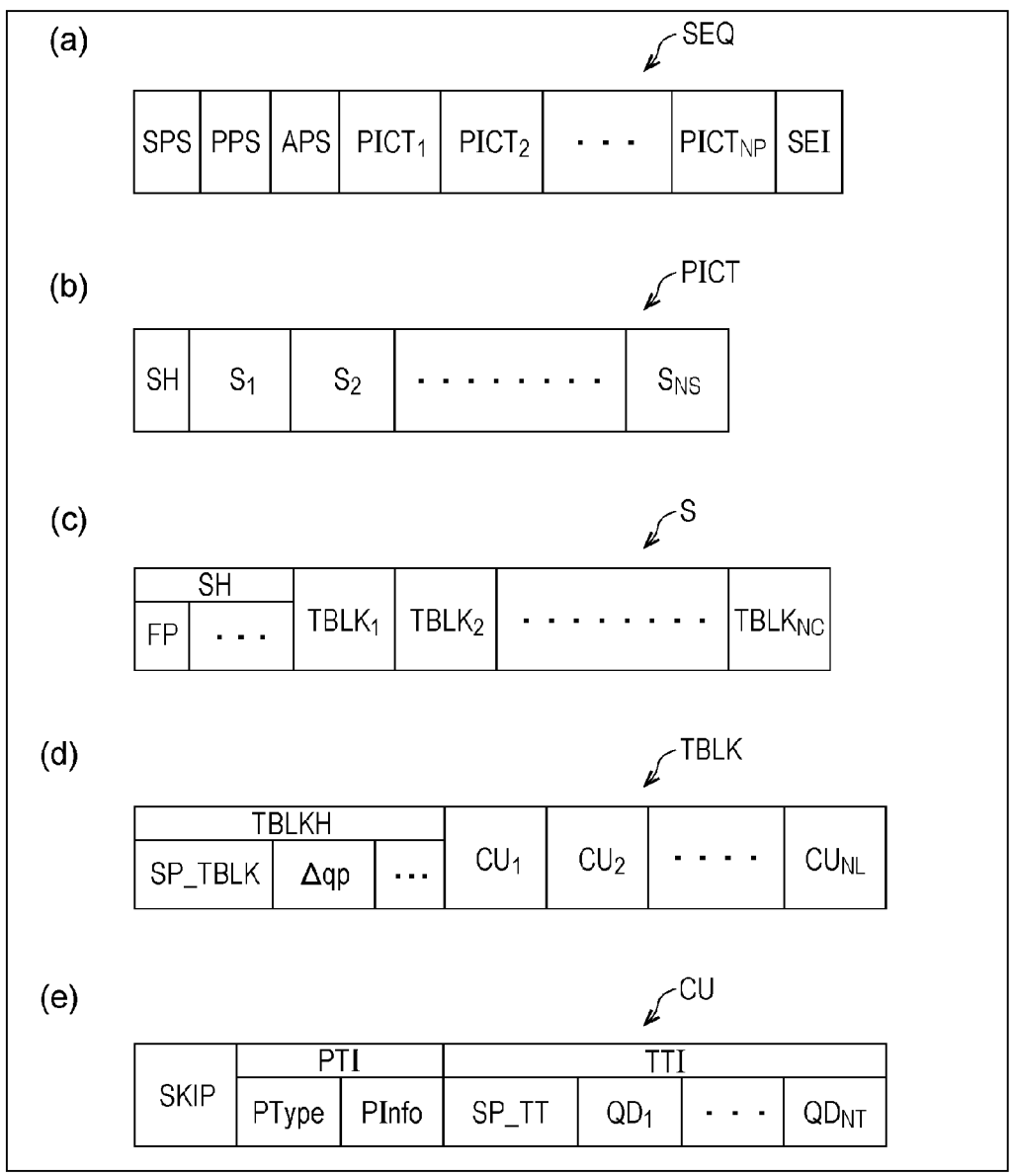
FIG. 3 is a diagram illustrating a configuration of hierarchically encoded data according to the embodiment of the present invention, (a) illustrates a sequence layer defining a sequence SEQ, (b) illustrates a picture layer defining a picture PICT, (c) illustrates a slice layer defining a slice S, (d) illustrates a tree block layer defining a tree block TBLK, and (e) illustrates a CU layer defining a coding unit (CU) included in the tree block TBLK.

FIG. 3 is a diagram illustrating a data structure of the encoded data (in the example of FIG. 2, the hierarchically encoded data DATA#C) that may be employed in the base layer. The hierarchically encoded data DATA#C for example includes a sequence, and a plurality of pictures constituting the sequence.

FIG. 3 illustrates a hierarchical structure of data of the hierarchically encoded data DATA#C. FIGS. 3(a) to (e) are diagrams respectively illustrating a sequence layer defining a sequence SEQ, a picture layer defining a picture PICT, a slice layer defining a slice S, a tree block layer defining a tree block TBLK, and a CU layer defining a coding unit (CU) included in the tree block TBLK.

(Sequence Layer)

In the sequence layer, a set of data that is referred to by the hierarchical moving image decoding device 1 in order to decode a sequence to be processed SEQ (hereinafter, also referred to as a target sequence) is defined. The sequence SEQ, as shown in FIG. 3(a), includes a sequence parameter set SPS, picture parameter set PPS, adaptation parameter set APS, pictures $PICT_1$ to $PICT_{NP}$ (NP is the total number of pictures included in the sequence SEQ), and supplemental enhancement information SEI.

In the sequence parameter set SPS, a set of coding parameters which are referred to by the hierarchical moving image decoding device 1 for decoding the target sequence is defined.

In the picture parameter set PPS, a set of coding parameters which are referred to by the hierarchical moving image decoding device 1 for decoding each pictures in the target sequence is defined. In addition, a plurality of PPSs may exist. In this case, one of the plurality of PPSs is selected from each picture in the target sequence.

In the adaptation parameter set APS, a set of coding parameters which are referred to by the hierarchical moving image decoding device 1 for decoding each slice in the target sequence is defined. A plurality of APSs may exist. In this case, one of the plurality of APSs is selected from each slice in the target sequence.

(Picture Layer)

In the picture layer, a set of data which is referred to by the hierarchical moving image decoding device 1 for decoding a picture PICT to be processed (hereinafter, also referred to as a target picture) is defined. The picture PICT, as shown in FIG. 3(b), includes a picture header PH, and slices $S_1$ to $S_{NS}$ (NS is the total number of slices included in the picture PICT).

In addition, hereinafter, when there is no need to distinguish respective slices $S_1$ to $S_{NS}$, they may be described by omitting subscripts of symbols. Further, the same applies to other data, denoted by subscripts, which is included in the hierarchically encoded data DATA#C that will be described below.

The picture header PH includes a coding parameter group which is referred to by the hierarchical moving image decoding device 1 for determining a target picture decoding method. In addition, the coding parameter group does not necessarily need to be included in the picture header PH, and the coding parameter group may be indirectly included in the picture header PH by referring to, for example, the picture parameter set PPS.

(Slice Layer)

In the slice layer, a set of data which is referred to by the hierarchical moving image decoding device 1 for decoding the slice S to be processed (also referred to as a target slice) is defined. The slice S includes, as illustrated in FIG. 3(c), a slice header SH, and a sequence of tree blocks $TBLK_1$ to $TBLK_{NC}$ (NC is the total number of tree blocks included in the slice S).

The slice header SH includes a coding parameter group which is referred to by the hierarchical moving image decoding device 1 for determining a target slice decoding method. Slice type designation information (slice_type) for designating a slice type is an example of coding parameters included in the slice header SH.

Examples of the slice type that can be designated by the slice type designation information include (1) an I slice using only intra-prediction in the case of coding, (2) a P slice using unidirectional prediction or intra-prediction in the case of coding, and (3) a B slice using unidirectional prediction, bidirectional prediction, or intra-prediction in the case of coding.

In addition, the slice header SH may include reference to the picture parameter set PPS (pic_parameter_set_id), and reference to the adaptation parameter set APS (aps_id) which are included in the sequence layer.

Further, the slice header SH includes filter parameters FP which are referred to by an adaptation filter included in the hierarchical moving image decoding device 1. The filter parameter FP includes a filter coefficient group. The filter coefficient group includes (1) number-of-taps designation information designating the number of taps of a filter, (2) filter coefficients $a_{NT-1}$ (NT is the total number of filter coefficients included in the filter coefficient group), and (3) offset.

(Tree Block Layer)

In the tree block layer, a set of data which is referred to by the hierarchical moving image decoding device 1 for decoding the tree block TBLK to be processed (hereinafter, also referred to as a target tree block) is defined. In addition, the tree block may be referred to as a coding tree block (CTB) or largest cording unit (LCU).

The tree block TBLK includes a tree block header TBLKH, and coding unit information $CU_1$ to $CU_{NL}$ (NL is the total number of coding unit information pieces included in the tree block TBLK). Here, first, a description of a relationship between the tree block TBLK and the coding unit information CU is as follows.

The tree block TBLK is split into partitions for specifying a block size for intra-prediction or inter-prediction, and each process for conversion.

The partition of the tree block TBLK is split by quad-tree recursive splitting. The tree structure obtained by the quad-tree recursive splitting is referred to as, hereinafter, a coding tree.

Hereinafter, a partition corresponding to a leaf which is a node of a terminal of the coding tree is referred to as a coding node. Further, since the coding node is a basic unit of a coding process, hereinafter, the coding node is also referred to as a coding unit (CU). In addition, the coding node is also referred to as a coding block (CB).

In other words, the coding unit information (hereinafter, also referred to as CU information) $CU_1$ to $CU_{NL}$ is information corresponding to each coding node (coding unit) obtained by recursively quad-tree-splitting the tree block TBLK.

Further, the root of the coding tree is associated with the tree block TBLK. In other words, the tree block TBLK is associated with the highest node of the tree structure of the quad-tree splitting recursively including a plurality of coding nodes.

In addition, the size of each coding node is half of the horizontal and vertical sizes of a coding node to which the coding node directly belongs (in other words, the partition of a node which is one hierarchy higher than the coding node).

Further, the size of the tree block TBLK and the size of each coding node depend on size designation information of a minimum coding node and the difference in hierarchy depths of the maximum coding node and the minimum coding node, which are included in the sequence parameter set SPS of the hierarchically encoded data DATA#C. For example, when the size of the minimum coding node is 8×8 pixels and the difference in hierarchy depths of the maximum coding node and the minimum coding node is 3, the size of the tree block TBLK is 64×64 pixels, and one of four types of sizes, in other words, 64×64 pixels, 32×32 pixels, 16×16 pixels, and 8×8 pixels, may be used as the size of the coding node.

(Tree Block Header)

The tree block header TBLKH includes coding parameters which are referred to by the hierarchical moving image decoding device 1 for determining a target tree block decoding method. Specifically, as shown in FIG. 3(d), the tree block header includes tree block split information SP_TBLK designating a split pattern of the target tree block into each CU, and quantization parameter difference Δqp(qp_delta) designating the size of a quantization step.

The tree block split information SP_TBLK is information indicating a coding tree for splitting the tree block, specifically, information designating the shape and size of each CU included in the target tree block, and the position of the CU in the target tree block.

In addition, the tree block split information SP_TBLK may not explicitly include the shape and size of the CU. For example, the tree block split information SP_TBLK may be a set of flags indicating whether to split all target tree blocks or partial regions of the tree block into four parts. In this case, it is possible to specify the shape and size of each CU by combining the shape and size of the tree block.

Further, the quantization parameter difference Δqp is a difference qp−qp' between the quantization parameter qp of the target tree block and the quantization parameter qp' in the encoded tree block immediately before the target tree block.

(CU Layer)

In the CU layer, a set of data which is referred to by the hierarchical moving image decoding device 1 for decoding the CU to be processed (hereinafter, referred to as an object CU) is defined.

Here, prior to the description of the specific contents of data included in the CU information CU, a tree structure of data included in the CU will be described. The coding node is a root node of a prediction tree (PT) and a transform tree (TT). The descriptions of the prediction tree and the transform tree are as follows.

In the prediction tree, the coding node is split into one or a plurality of prediction blocks, and the position and the size of each prediction block are defined. In other words, the prediction block is one or a plurality of regions, which do not overlap with each other, constituting the coding node. Further, the prediction tree includes one or a plurality of prediction blocks which are obtained by the above division.

The prediction process is performed for each prediction block. Hereinafter, a prediction block which is a unit of prediction is also referred to as a prediction unit (PU).

Roughly, the types of the split of the prediction tree (hereinafter, abbreviated as PU splitting) includes an intra-prediction case and an inter-prediction case.

In the intra-prediction case, as the split method, there are a 2N×2N (the same size as that of the coding node) and an N×N.

Further, in the inter-prediction case, as the split method, there are a 2N×2N (the same size as that of the coding node), a 2N×N, a 2N×nU, a 2N×nD, an N×2N, an nL×2N, an nR×2N, an N×N, and the like. The type of the PU split will be described with reference to the drawings.

Further, in the transform tree, the coding node is split into the one or a plurality of transform blocks, and the position and size of each transform block is defined. In other words, a block is one or a plurality of transform blocks constituting the coding node, which do not overlap with each other. Further, the transform tree includes one or a plurality of transform blocks which are obtained from the above splitting.

The split of the transform tree includes allocating a region of the same size as the coding node as a transform block, and quad-tree recursive splitting, similar to the split of the tree block as described above.

The transform process is performed for each transform block. Hereinafter, a transform block which is a unit of transform is referred to as a transform unit (TU).

(Data Structure of CU Information)

Subsequently, the specific contents of data included in the CU information CU will be described with reference to FIG. 3(e). As illustrated in FIG. 3(e), the CU information CU includes, specifically, a skip flag SKIP, prediction tree information (hereinafter, abbreviated as PT information) PTI, and transform tree information (hereinafter, abbreviated as TT information) TTI.

The skip flag SKIP is a flag indicating whether or not the skip mode is applied to the target PU. When the value of the skip flag SKIP is 1, in other words, when the skip mode is applied to the target CU, some pieces of PT information PTI and TT information TTI in the CU information CU are omitted. In addition, the skip flag SKIP is omitted in the I slice.

[PT Information]

The PT information PTI is information regarding the prediction tree (hereinafter, abbreviated as PT) included in the CU. In other words, the PT information PTI is a set of information regarding each of one or a plurality of PUs included in the PT, and is referred when a predicted image is generated by the hierarchical moving image decoding device 1. As illustrated in FIG. 3(e), the PT information PTI includes prediction type information PType and prediction information PInfo.

The prediction type information PType is information designating whether an intra-prediction is used or an inter-prediction is used as a predicted image generation method for the target PU.

The prediction information PInfo includes intra-prediction information PP_Intra or inter-prediction information PP_Inter, depending on which prediction method is designated by the prediction type information Ptype. Hereinafter, a PU to which the intra-prediction is applied is referred to as an intra-PU, and a PU to which the inter-prediction is applied is referred to as an inter-PU.

The inter-prediction information PP_Inter includes encoding parameters which are referred to by the hierarchical moving image decoding device 1 when generating an inter-predicted image by the inter-prediction. More specifically, the inter-prediction information PP_Inter includes inter-PU split information designating a split pattern of the target CU to each inter-PU, and inter-prediction parameter for each inter-PU.

The intra-prediction information PP_Intra includes encoding parameters which are referred to by the hierarchical moving image decoding device 1 when generating an intra-predicted image by the intra-prediction. More specifically, the intra-prediction information PP_Intra includes intra-PU split information designating a split pattern of the target CU to each intra-PU, and intra-prediction parameter for each intra-PU. The intra-prediction parameter is a parameter for designating an intra-prediction method (prediction mode) for each intra-PU.

Further, the PU split information may include information designating the shape, size, and position of the target PU. The PU split information will be described in detail later.

[TT Information]

TT information TTI is information regarding a transform tree (hereinafter, abbreviated as TT) included in the CU. In other words, the TT information TTI is a set of information regarding one or each of a plurality of TUs included in the TT, and is referred during the decoding of the residual data by the hierarchical moving image decoding device 1. In addition, hereinafter, the TU is referred to as a block.

As illustrated in FIG. 3(e), the TT information TTI includes TT split information SP_TT for designating a splitting pattern of the target CU to each transform block, and quantized prediction residuals $QD_1$ to $QD_{NT}$ (NT is a total number of blocks included in the target CU).

Specifically, the TT split information SP_TT is information for determining the shape and size of each TU included in the target CU, and the position of each TU in the target CU. For example, it is possible to realize the TT split information SP_TT from the information (split_transform_unit_flag) indicating whether to perform splitting of a node which is a target and the information (trafoDepth) indicating the depth of the splitting.

Further, for example, when the size of CU is 64×64, each TU obtained by splitting has a size of 32×32 pixels to 4×4 pixels.

Each quantized prediction residual QD is encoded data generated by the hierarchical moving image encoding device 2 performing the following processes 1 to 3 on the target block which is a processing target block.

Process 1: Frequency conversion (for example, discrete cosine transform (DCT) and discrete sine transform (DST)) of a prediction residual obtained by subtracting a predicted image from an encoding target image;

Process 2: Quantization of transform coefficients obtained by the process 1;

Process 3: Variable-length encoding of the transform coefficients quantized in the process 2;

In addition, the quantization parameter qp described above represents the size of the quantization step QP used when the hierarchical moving image encoding device 2 quantizes the transform coefficients ($QP=2^{qp/6}$).

(Prediction Parameters)

The prediction parameters of the inter-prediction and the intra-prediction will be described in detail. As described above, the inter-prediction parameter or the intra-prediction parameter is included in the prediction information PInfo.

Examples of the inter-prediction parameter include a merge flag (merge_flag), a merge index (merge_idx), an estimated motion vector index (mvp_idx), a reference image index (ref_idx), an inter-prediction flag (inter_pred_flag), and a motion vector residual (mvd).

Meanwhile, examples of the intra-prediction parameter include an estimated prediction mode flag, an estimated prediction mode index, and a residual prediction mode index.

(PU Split Information)

Assuming that the size of the target CU is 2N×2N pixels, the PU split type designated by the PU split information have a total of eight types of patterns as follows. In other words, they are four types of symmetric splitting such as 2N×2N pixels, 2N×N pixels, N×2N pixels, and N×N pixels, and four types of asymmetric splitting such as 2N×nU pixels, 2N×nD pixels, nL×2N pixels, and nR×2N pixels. In addition, it means that N=2' (m is an arbitrary integer of 1 or more). Hereinafter, the region obtained by splitting the target CU is also referred to as a partition.

FIGS. 4(a) to (h) specifically illustrate the position of a boundary of PU splitting in the CU, for each split type.

FIG. 4(a) illustrates the 2N×2N PU split type in which the splitting of the CU is not performed. Further, FIGS. 4(b), 4(c), and 4(d) respectively illustrate the partition shapes when the PU split types are respectively the 2N×N, the 2N×nU, and the 2N×nD. Further, FIGS. 4(e), 4(f), and 4(g) respectively illustrate the partition shapes when the PU split types are respectively the N×2N, the nL×2N, and the nR×2N. Further, FIG. 4(h) illustrates the partition shape when the PU split type is the N×N.

The PU split types of FIGS. 4(a) and (h) are referred to as a square splitting based on the partition shape. Further, the PU split types of FIGS. 4(b) to (g) are referred to as a non-square splitting.

Further, in FIGS. 4(a) to (h), the number assigned to each region represents the identification number of the region, and the process is performed for the region in an identification number order. In other words, the identification number represents a scan order of the region.

[Split Type in the Case of Inter-Prediction]

In the inter-PU, seven types other than the N×N (FIG. 4(h)) among eight types of splitting patterns are defined. In addition, six asymmetric splitting is also referred to as an asymmetric motion partition (AMP).

Further, the specific value of N is defined by the size of the CU to which the PU belongs, and the specific values of nU, nD, nL, and nR are determined according to the value of N. For example, it is possible to split the inter-CU of 128×128 pixels into inter-PUs of 128×128 pixels, 128×64 pixels, 64×128 pixels, 64×64 pixels, 128×32 pixels, 128×96 pixels, 32×128 pixels, and 96×128 pixels.

[Split Type in the Case of Intra-Prediction]

In the intra-PU, the following two types of splitting patterns are defined. They are the splitting pattern 2N×2N in which the target CU is not split, in other words, the target CU itself is handled as one PU, and a pattern N×N in which the target CU is asymmetrically split into four PUs.

Figure 4:
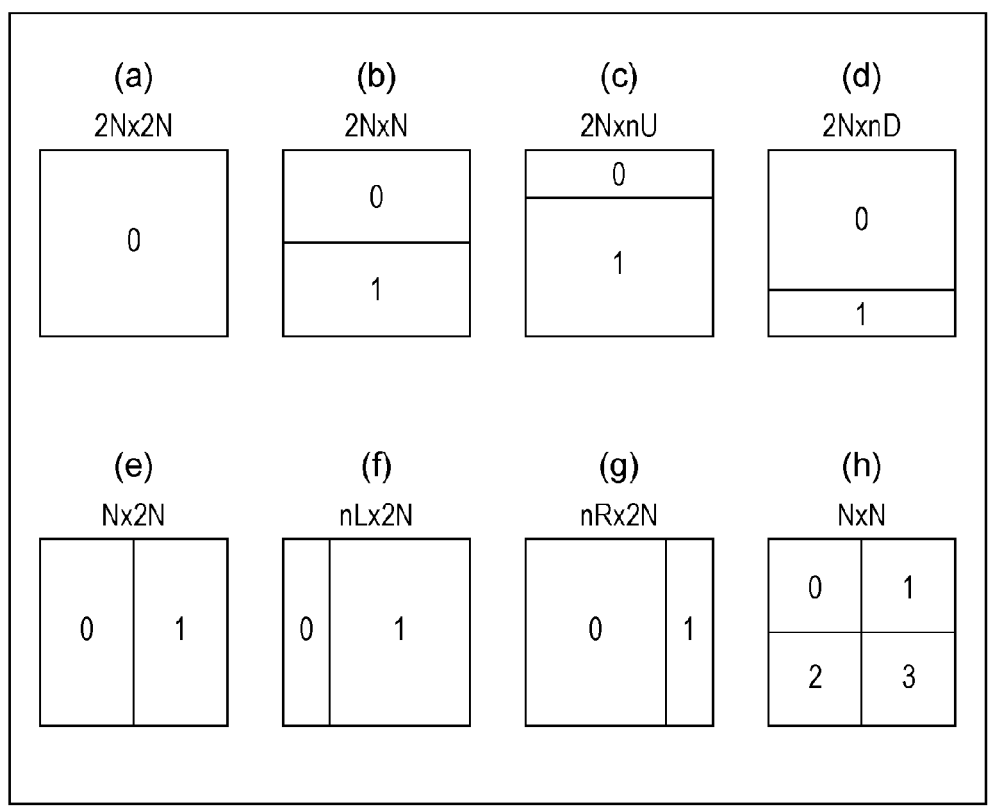
FIG. 4 is a diagram showing a pattern of a PU split type, and (a) to (h) are respective partition shapes when a PU split type is 2N×N, 2N×nU, 2N×nD, 2N×N, 2N×nU, and 2N×nD.

Accordingly, it is possible to handle the splitting patterns of (a) and (h) in the example illustrated in FIG. 4, in the intra-PU.

For example, the intra-CU of 128×128 pixels may be split into the intra-PUs of 128×128 pixels and 64×64 pixels.

(Enhancement Layer)

It is possible to employ, for example, a data structure similar to the data structure shown in FIG. 3, for the encoded data of the enhancement layer. However, in the encoded data of the enhancement layer, it is possible to add additional information or to omit a parameter as follows.

Information indicating hierarchical encoding may be encoded in the SPS.

Further, respective pieces of hierarchical identification information of the spatial scalability, the time scalability, and the SNR scalability (respectively, dependency_id, temporal_id, and quality_id) may be encoded in the slice layer.

It is possible to encode filter information and on/off information of a filter (described later) by the PPS, the slice header, the macro block header, and the like.

Further, a skip flag (skip_flag), a base mode flag (base_mode_flag) and a prediction mode flag (pred_mode_flag) may be encoded in the CU information CU.

Further, the flags may specify that the CU type of the target CU is any of the intra-CU, the inter-CU, the skip CU and the base skip CU.

It is possible to define the intra-CU and the skip CU similar to the case of the HEVC method described above. For example, in the skip CU, "1" is set in the skip flag. In the case of not skip CU, "0" is set in the skip flag. Further, in the intra-CU, "0" is set in the prediction mode flag.

Further, the inter-CU may be defined as a CU to which a non-skip or motion compensation (MC) is applied. In the inter-CU, for example, "0" is set in the skip flag, and "1" is set in the prediction mode flag.

The base skip CU is a CU type of estimating the information of the CU or the PU from the reference layer. Further, in the base skip CU, for example, "1" is set in the skip flag, "1" is set in the base mode flag.

Further, the PT information PTI may specify that the PU type of the target PU is any of the intra-PU, the inter-PU, the merge PU, and the base merge PU.

It is possible to define the intra-PU, the inter-PU, and the merge PU, similar to the case of the HEVC method described above.

The base merge PU is a PU type of estimating the PU information from the reference layer. Further, for example, in the PT information PTI, the merge flag and the base mode flag are encoded, and it may be determined whether or not the target PU is a PU of performing the base merge by using the flags. In other words, in the base merge PU, "1" is set in the merge flag, and "1" is set in the base mode flag.

In addition, it is possible to use a configuration of omitting the motion vector information which can be derived from the motion vector information included in the lower layer among motion vector information included in the enhancement layer from the enhancement layer. By such a configuration, it is possible to reduce the code amount of the enhancement layer, and thus the coding efficiency is improved.

Further, the encoded data of the enhancement layer may be generated by the coding scheme different from the coding scheme of the lower layer, as described above. In other words, the encoding and decoding process of the enhancement layer is not dependent on the type of the codec of the lower layer.

The lower layer may be encoded by, for example, the MPEG-2 or the H.264/AVC method.

When the target layer and the reference layer are encoded by different coding schemes, it is possible to maintain compatibility of each other in the inter-layer by transforming the parameter of the reference layer into a corresponding parameter or a similar parameter of the target layer. For example, it is possible to read and interpret the macro block of the MPEG-2 or the H.264/AVC method as the CTB of the HEVC.

In addition, the parameters described above may be encoded alone, and a plurality of parameters may be encoded in a complex manner. When the plurality of parameters are encoded in a complex manner, an index is assigned to the combination of the parameter values, and the assigned index is encoded. Further, if the parameters can be derived from another parameter and decoding information, it is possible to omit encoding of the parameters.

[Hierarchical Moving Image Decoding Device]

Hereinafter, the configuration of the hierarchical moving image decoding device 1 according to the present embodiment will be described with reference to FIGS. 1 to 21.

(Configuration of Hierarchical Moving Image Decoding Device)

Figure 5:
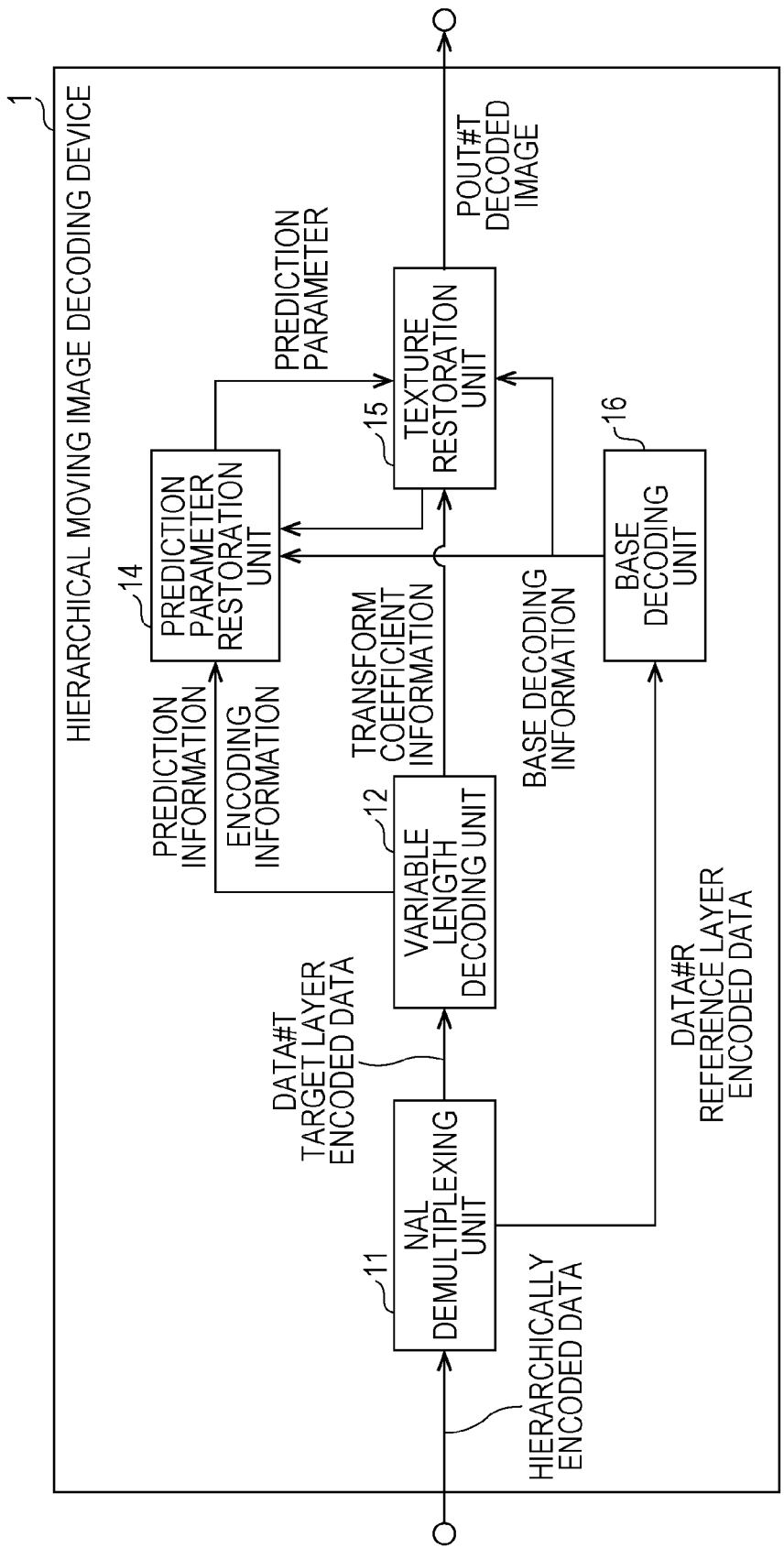
FIG. 5 is a functional block diagram illustrating a schematic configuration of the hierarchical moving image decoding device.

The description of a schematic configuration of the hierarchical moving image decoding device 1 with reference to FIG. 5 is as follows. FIG. 5 is a functional block diagram illustrating a schematic configuration of the hierarchical moving image decoding device 1. The hierarchical moving image decoding device 1 generates a decoded image POUT#T of a target layer by decoding the hierarchically encoded data DATA supplied from the hierarchical moving image encoding device 2 by an HEVC method.

As illustrated in FIG. 5, the hierarchical moving image decoding device 1 includes an NAL demultiplexing unit 11, a variable length decoding unit 12, a prediction parameter restoration unit 14, a texture restoration unit 15, and a base decoding unit 16.

The NAL demultiplexing unit 11 demultiplexes the hierarchically encoded data DATA which is transmitted in an NAL unit in a network abstraction layer (NAL).

The NAL is a layer provided in order to abstract the communication between a video coding layer (VCL) and a lower system that transmits and stores the encoded data.

The VCL is a layer for performing a moving image encoding process, and encoding is performed by the VCL.

Meanwhile, the lower system referred to herein corresponds to the file formats of H.264/AVC and HEVC, and an MPEG-2 system. In the example illustrated below, the lower system corresponds to the decoding process in the target layer and reference layer.

In addition, in the NAL, a bit stream generated by the VCL is separated into an NAL unit, and transmitted to the lower system which is a destination. The NAL unit includes encoded data which has been encoded by the VCL, and a header for the encoded data to appropriately reach the lower system which is the destination. Further, the encoded data in each hierarchy is stored in a NAL unit, such that the encoded data is NAL multiplexed and transmitted to the hierarchical moving image decoding device 1.

The NAL demultiplexing unit 11 extracts target layer encoded data DATA#T and reference layer encoded data DATA#R by demultiplexing the hierarchically encoded data DATA. Further, the NAL demultiplexing unit 11 supplies the target layer encoded data DATA#T to the variable length decoding unit 12, and supplies the reference layer encoded data DATA#R to the base decoding unit 16.

The variable length decoding unit 12 performs a decoding process of information in order to decode various syntax values from binary included in the target layer encoded data DATA#T.

Specifically, the variable length decoding unit 12 decodes, as described below, the prediction information, the encoding information, and the transform coefficient information from the encoded data DATA#T.

In other words, the variable length decoding unit 12 decodes prediction information regarding each CU or PU, from the encoded data DATA#T. The prediction information includes, for example, designation of a CU type or a PU type.

When the CU is an inter-CU, the variable length decoding unit 12 decodes the PU split information from encoded DATA#T. In addition, in each PU, the variable length decoding unit 12 decodes motion information such as a reference image index RI, an estimated motion vector index PMVI, and a motion vector residual MVD and mode information, as prediction information, from the encoded data DATA#T.

In contrast, when the CU is an intra-CU, the variable length decoding unit 12 decodes (1) size designation information designating the size of the prediction unit, and (2) intra-prediction information including prediction index designation information designating a prediction index, as prediction information, from the encoded data DATA#T.

Further, the variable length decoding unit 12 decodes the encoding information from the encoded data DATA#T. The encoding information includes information for specifying the shape, size and position of a CU. More specifically, the encoding information includes tree block split information designating a split pattern of each CU of the target tree block, in other words, the shape and size of each CU included in the target tree block and the position of the CU in the target tree block.

The variable length decoding unit 12 supplies the decoded prediction information and encoding information to the prediction parameter restoration unit 14.

Further, the variable length decoding unit 12 decodes the quantized prediction residual QD regarding each block, and a quantization parameter difference Δqp regarding the tree block including the block, from the encoded data DATA#T. The variable length decoding unit 12 supplies the quantized prediction residual QD and the quantization parameter difference Δqp which are decoded, as the transform coefficient information, to the texture restoration unit 15.

The base decoding unit 16 decodes base decoding information, which is information regarding a reference layer which is referred when decoding the decoded image corresponding to the target layer, from the reference layer encoded data DATA#R. The base decoding information includes a base prediction parameter, a base transform coefficient, and a base decoded image. The base decoding unit 16 supplies the decoded base decoding information to the prediction parameter restoration unit 14 and the texture restoration unit 15.

The prediction parameter restoration unit 14 restores the prediction parameter by using the prediction information and the base decoding information. The prediction parameter restoration unit 14 supplies the restored prediction parameter to the texture restoration unit 15. In addition, when restoring the prediction parameter, the prediction parameter restoration unit 14 can refer to the motion information stored in a frame memory 155 (described later) included in the texture restoration unit 15.

The texture restoration unit 15 generates the decoded image POUT#T by using the transform coefficient information and the base decoding information and prediction parameter, and outputs the decoded image POUT#T to the outside. In addition, in the texture restoration unit 15, information regarding the restored decoded image is stored in the frame memory 155 (described later) provided therein.

Hereinafter, the base decoding unit 16, the prediction parameter restoration unit 14, and the texture restoration unit 15 will be respectively described in detail.

(Prediction Parameter Restoration Unit)

Figure 6:
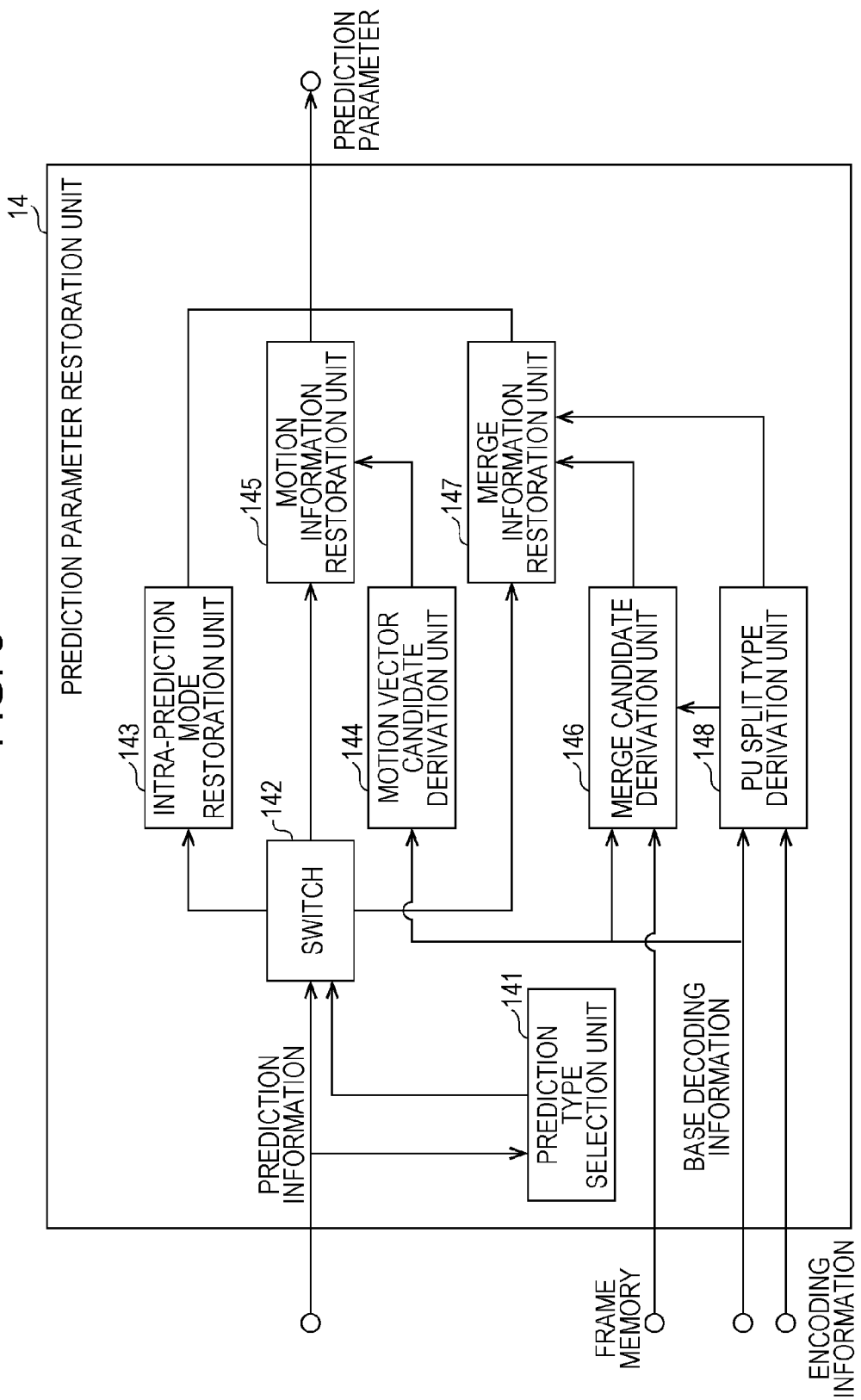
FIG. 6 is a functional block diagram illustrating a schematic configuration of a prediction parameter restoration unit included in the hierarchical moving image decoding device.

The detailed configuration of the prediction parameter restoration unit 14 will be described with reference to FIG. 6. FIG. 6 is a functional block diagram illustrating a configuration of the prediction parameter restoration unit 14.

As illustrated in FIG. 6, the prediction parameter restoration unit 14 includes a prediction type selection unit 141, a switch 142, an intra-prediction mode restoration unit 143, a motion vector candidate derivation unit 144, a motion information restoration unit 145, a merge candidate derivation unit 146, a merge information restoration unit 147, and a PU split type derivation unit 148.

The prediction type selection unit 141 transmits a switching instruction to the switch 142 in response to the CU type or the PU type so as to control the derivation process of the prediction parameter. Specifically, the operation is as follows.

When the intra-CU or the intra-PU is specified, the prediction type selection unit 141 controls the switch 142 so as to derive the prediction parameter by using the intra-prediction mode restoration unit 143.

When any of the inter-CU (no merge) and the inter-PU (no merge) is specified, the prediction type selection unit 141 controls the switch 142 so as to derive the prediction parameter by using the motion information restoration unit 145.

When any of the base skip CU, the base merge PU, the skip CU and the merge PU is specified, the prediction type selection unit 141 controls the switch 142 so as to derive the prediction parameter by using the merge information restoration unit 147.

The switch 142 supplies the prediction information to any of the intra-prediction mode restoration unit 143, the motion information restoration unit 145, and the merge information restoration unit 147, in response to the instruction from the prediction type selection unit 141. The prediction parameter is derived in the supply destination of the prediction information.

The intra-prediction mode restoration unit 143 derives the prediction mode from the prediction information. In other words, the intra-prediction mode restoration unit 143 restores the prediction mode as the prediction parameter.

Figures 7, 8:
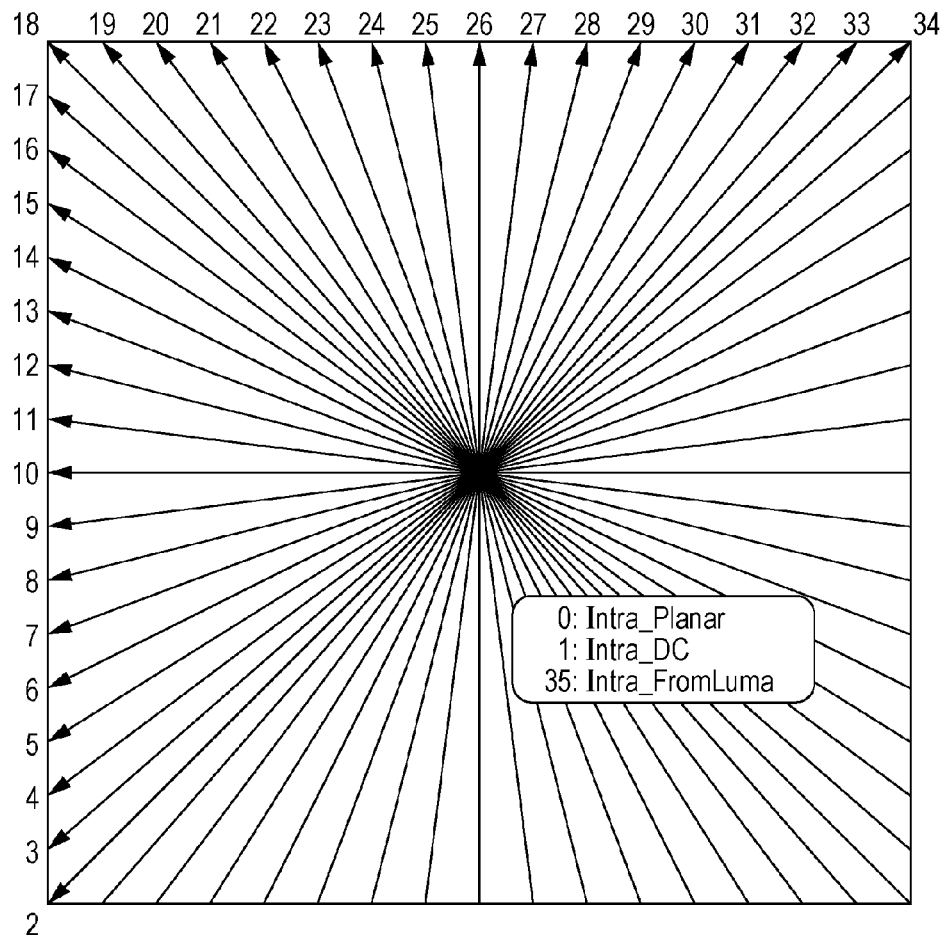
FIG. 7 is a diagram illustrating a direction of an available intra-prediction in the hierarchical moving image decoding device.
FIG. 8 is a diagram illustrating an intra-prediction mode and a name associated with the intra-prediction mode.

Here, the definition of the prediction mode will be described with reference to FIG. 7. FIG. 7 illustrates the definition of the prediction mode. As illustrated in FIG. 7, the prediction modes of 36 types are defined, and respective prediction modes are specified by the numbers "0" to "35" (intra-prediction mode index). Further, as illustrated in FIG. 8, the following names are assigned to the respective prediction modes. In other words, "0" is an "Intra_Planar (planar prediction mode)", "1" is an "Intra DC (intra-DC prediction mode)", "2" to "34" are "Intra Angular (directional prediction)", and "35" is "Intra From Luma". "35" is specific to a color difference prediction mode, and is a mode in which the prediction of a color difference is performed based on the prediction of the luminance. In other words, the color difference prediction mode "35" is a prediction mode using the correlation between the luminance pixel value and the color difference pixel value. The color difference prediction mode "35" is also referred to as an LM mode. The number of prediction modes (intraPredModeNum) is "35", regardless of the size of the target block.

The motion vector candidate derivation unit 144 derives the candidates of the estimated motion vector by the intra-layer motion estimation process or the inter-layer motion estimation process, by using the base decoding information. The motion vector candidate derivation unit 144 supplies the candidates of the derived motion vector to the motion information restoration unit 145.

The motion information restoration unit 145 restores the motion information regarding each inter-PU for which merging is not performed. In other words, the motion information restoration unit 145 restores motion information as the prediction parameter.

When the target CU (PU) is an inter-CU (inter-PU), the motion information restoration unit 145 restores the motion information from the prediction information. More specifically, the motion information restoration unit 145 acquires a motion vector residual (mvd), an estimated motion vector index (mvp_idx), an inter-prediction flag (inter_pred_flag), and a reference image index (refIdx). Then, a reference image list using flag is determined for each of a reference image list L0 and a reference image list L1, based on the value of the inter-prediction flag. Subsequently, when the corresponding reference image list using flag indicates that the reference image is used, the motion information restoration unit 145 derives the estimated motion vector based on the value of the estimated motion vector index, and derives the motion vector based on the motion vector residual and the estimated motion vector. The motion information restoration unit 145 outputs the derived motion vector, the reference image list using flag, and the reference image index, as the motion information (motion compensation parameter).

The merge candidate derivation unit 146 derives various merge candidates, by using decoded motion information supplied from the frame memory 155 to be described later and/or base decoding information supplied from the base decoding unit 16. The merge candidate derivation unit 146 supplies the derived merge candidate to the merge information restoration unit 147.

The merge information restoration unit 147 restores the motion information regarding each PU for which merging is performed in the intra-layer or the inter-layer. In other words, the motion information restoration unit 145 restores the motion information as the prediction parameter.

Specifically, when the target CU (PU) is a skip CU (merge PU) for which merging is performed in the intra-layer, the merge information restoration unit 147 restores motion information, by deriving the motion compensation parameter corresponding to the merge index (merge_idx) included in the prediction information, from the merge candidate list that is derived by the merge candidate derivation unit 146 through the intra-layer merge.

Further, when the target CU (PU) is a base skip CU for which merging is performed in the inter-layer, the merge information restoration unit 147 restores motion information, by deriving the motion compensation parameter corresponding to the merge index (merge_idx) included in the prediction information, from the merge candidate list that is derived by the merge candidate derivation unit 146 through the inter-layer merge.

The PU split type derivation unit 148 estimates the PU split type of the target CU to the PU in the target layer, by using the encoding information and base decoding information. The PU split type derivation unit 148 supplies the estimated PU split type to the merge candidate derivation unit 146 and the merge information restoration unit 147.

In addition, the merge candidate derivation unit 146 and the PU split type derivation unit 148 will be described in detail.

(Texture Restoration Unit)

Figure 9:
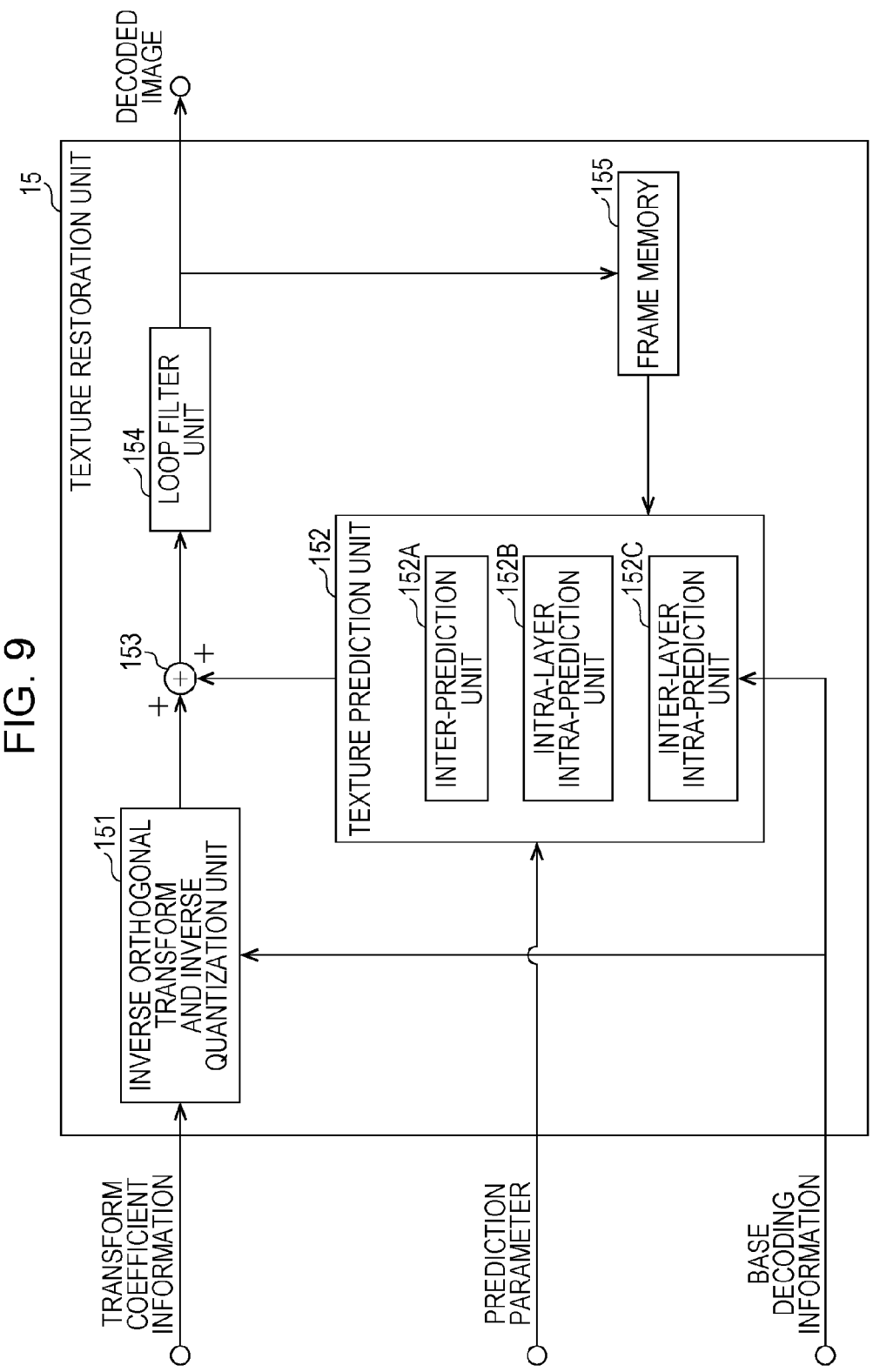
FIG. 9 is a functional block diagram illustrating a schematic configuration of a texture restoration unit included in the hierarchical moving image decoding device.

The detailed configuration of the texture restoration unit 15 will be described with reference to FIG. 9. FIG. 9 is a functional block diagram illustrating a configuration of the texture restoration unit 15.

As illustrated in FIG. 9, the texture restoration unit 15 includes an inverse orthogonal transform and inverse quantization unit 151, a texture prediction unit 152, an adder 153, a loop filter unit 154, and a frame memory 155.

The inverse orthogonal transform and inverse quantization unit 151, (1) inverse quantizes the quantized prediction residual QD included in the transform coefficient information supplied from the variable length decoding unit 12, (2) inverse orthogonal transforms the DCT coefficient obtained by the inverse quantization (for example, discrete cosine transform (DCT) transform), and (3) supplies prediction residual D obtained by the inverse orthogonal transform to the adder 153. In addition, when the quantized prediction residual QD is inverse quantized, the inverse orthogonal transform and inverse quantization unit 151 derives a quantization step QP from the quantization parameter difference Δqp included in the transform coefficient information. The quantization parameter qp can be derived by adding the quantization parameter difference Δqp to the quantization parameter qp' regarding the tree block which is inverse quantized/inverse orthogonal transformed immediately before, and the quantization step QP can be derived by $QP=2^{qp/6}$ from the quantization parameter qp. Further, the generation of the prediction residual D by the inverse orthogonal transform and inverse quantization unit 151 is performed with the block (transform unit) as a unit.

The texture prediction unit 152 generates a predicted image, with reference to the base decoded image included in the base decoding information or the decoded image, for which decoding has been completed, stored in the frame memory, according to the prediction parameter.

More specifically, the texture prediction unit 152 includes an inter-prediction unit 152A, an intra-layer intra-prediction unit 152B, and an inter-layer intra-prediction unit 152C.

The inter-prediction unit 152A generates a predicted image regarding each inter-prediction partition by the inter-prediction. Specifically, the inter-prediction unit 152A generates the predicted image from the reference image, by using the motion information supplied from the motion information restoration unit 145 or the merge information restoration unit 147, as the prediction parameter.

The intra-layer intra-prediction unit 152B generates the predicted image regarding each intra-prediction partition by the intra-layer intra-prediction. Specifically, the intra-layer intra-prediction unit 152B generates the predicted image from the decoded image for which decoding has been completed, by using the prediction mode supplied from the intra-prediction mode restoration unit 143, as the prediction parameter.

The inter-layer intra-prediction unit 152C generates a predicted image regarding each intra-prediction partition by the inter-layer intra-prediction. Specifically, the inter-layer intra-prediction unit 152C generates a predicted image based on the base decoded image included in the base decoding information, by using the prediction mode supplied from the intra-prediction mode restoration unit 143, as the prediction parameter. The base decoded image may be appropriately up-sampled in accordance with the resolution of the target layer.

The texture prediction unit 152 supplies the predicted images which are generated by the inter-prediction unit 152A, the intra-layer intra-prediction unit 152B, or the inter-layer intra-prediction unit 152C, to the adder 153.

The adder 153 generates a decoded image by adding the texture prediction unit 153 predicted image and the prediction residual D supplied from the inverse orthogonal transform and inverse quantization unit 151.

The loop filter unit 154 performs a deblocking process and a filter process by an adaptive filter parameter on the decoded image supplied from the adder 153.

The frame memory 155 stores the decoded image which is filtered by the loop filter unit 154.

(Base Decoding Unit)

Figure 10:
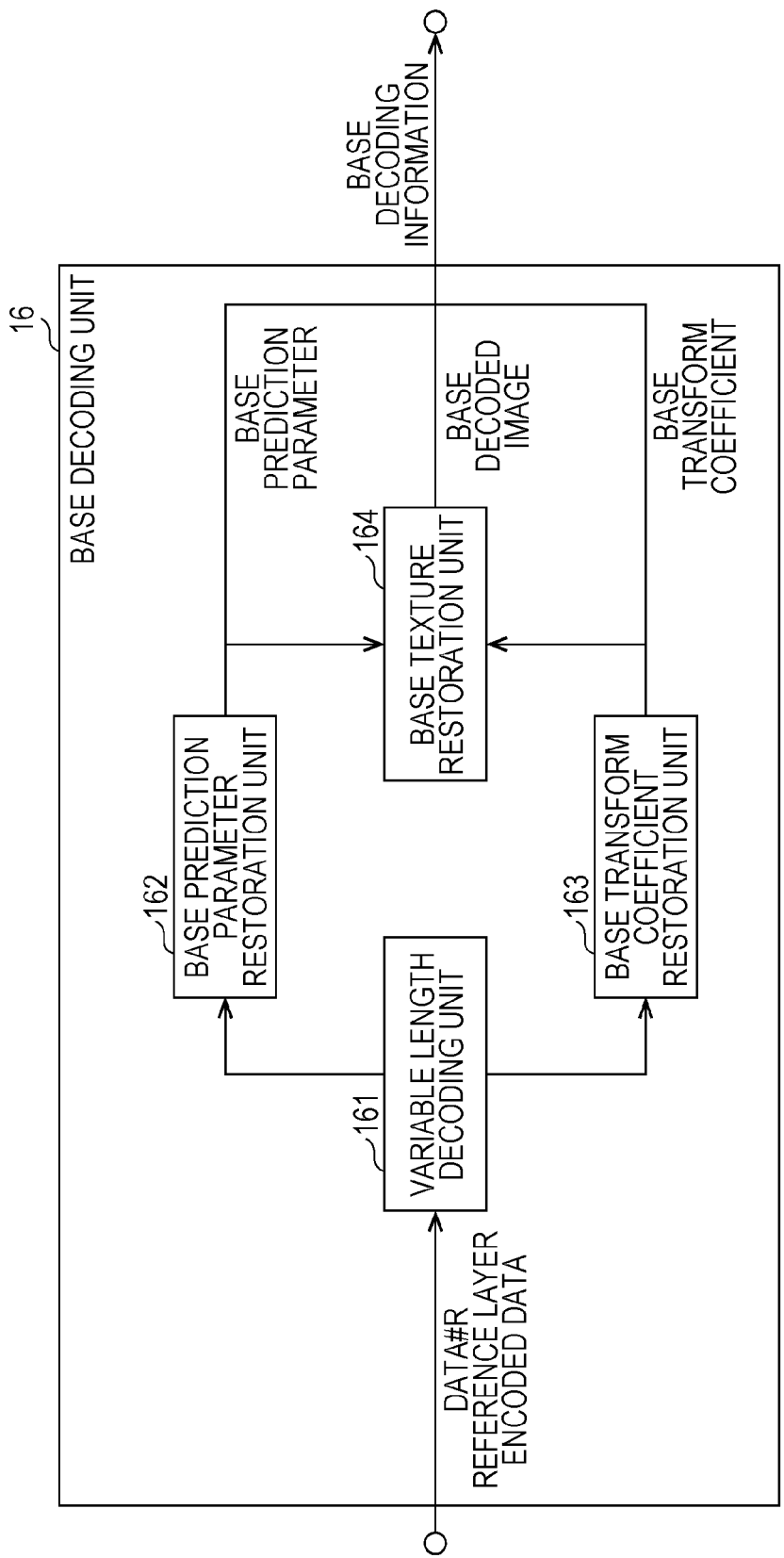
FIG. 10 is a functional block diagram illustrating a schematic configuration of a base decoding unit included in the hierarchical moving image decoding device.

The detailed configuration of the base decoding unit 16 will be described with reference to FIG. 10. FIG. 10 is a functional block diagram illustrating a configuration of the base decoding unit 16.

As illustrated in FIG. 10, the base decoding unit 16 includes a variable length decoding unit 161, a base prediction parameter restoration unit 162, a base transform coefficient restoration unit 163, and a base texture restoration unit 164.

The variable length decoding unit 161 performs a decoding process of information for decoding various syntax values from binary data included in the reference layer encoded data DATA#R.

Specifically, the variable length decoding unit 161 decodes the prediction information and the transform coefficient information from the encoded data DATA#R. Since the syntaxes of the prediction information and the transform coefficient which are decoded by the variable length decoding unit 161 are the same as in the variable length decoding unit 12, the detailed description thereof will be omitted.

The length decoding unit 161 supplies the decoded prediction information to the base prediction parameter restoration unit 162, and supplies the decoded transform coefficient information to the base transform coefficient restoration unit 163.

The base prediction parameter restoration unit 162 restores the base prediction parameter, based on the prediction information supplied from the variable length decoding unit 161. A method by which the base prediction parameter restoration unit 162 restores the base prediction parameter is similar to the prediction parameter restoration unit 14, and thus the detailed description thereof will be omitted here. The base prediction parameter restoration unit 162 supplies the restored base prediction parameter to the base texture restoration unit 164, and outputs the restored base prediction parameter to the outside.

The base transform coefficient restoration unit 163 restores the transform coefficient, based on the transform coefficient information supplied from the variable length decoding unit 161. A method by which the base transform coefficient restoration unit 163 restores the transform coefficient is similar to the inverse orthogonal transform and inverse quantization unit 151, and thus the detailed description thereof will be omitted here. The base transform coefficient restoration unit 163 supplies the restored base transform coefficient to the base texture restoration unit 164, and outputs the restored base transform coefficient to the outside.

The base texture restoration unit 164 generates a decoded image, by using the base prediction parameter supplied from the base prediction parameter restoration unit 162 and the base transform coefficient supplied from the base transform coefficient restoration unit 163. Specifically, the base texture restoration unit 164 generates a predicted image by performing the same texture prediction as that by the texture prediction unit 152, based on the base prediction parameter. Further, the base texture restoration unit 164 generates the prediction residual based on the base transform coefficient, and generates the base decoded image by adding the generated prediction residual and the predicted image generated by the texture prediction.

In addition, the base texture restoration unit 164 may perform the same filter process as that by the loop filter unit 154 on the base decoded image. Further, the base texture restoration unit 164 may include a frame memory for storing the decoded base decoded image, and may refer the decoded base decoded image which is stored in the frame memory for the texture prediction.

<<Details of Merge Candidate Derivation Unit>>

Figure 1:
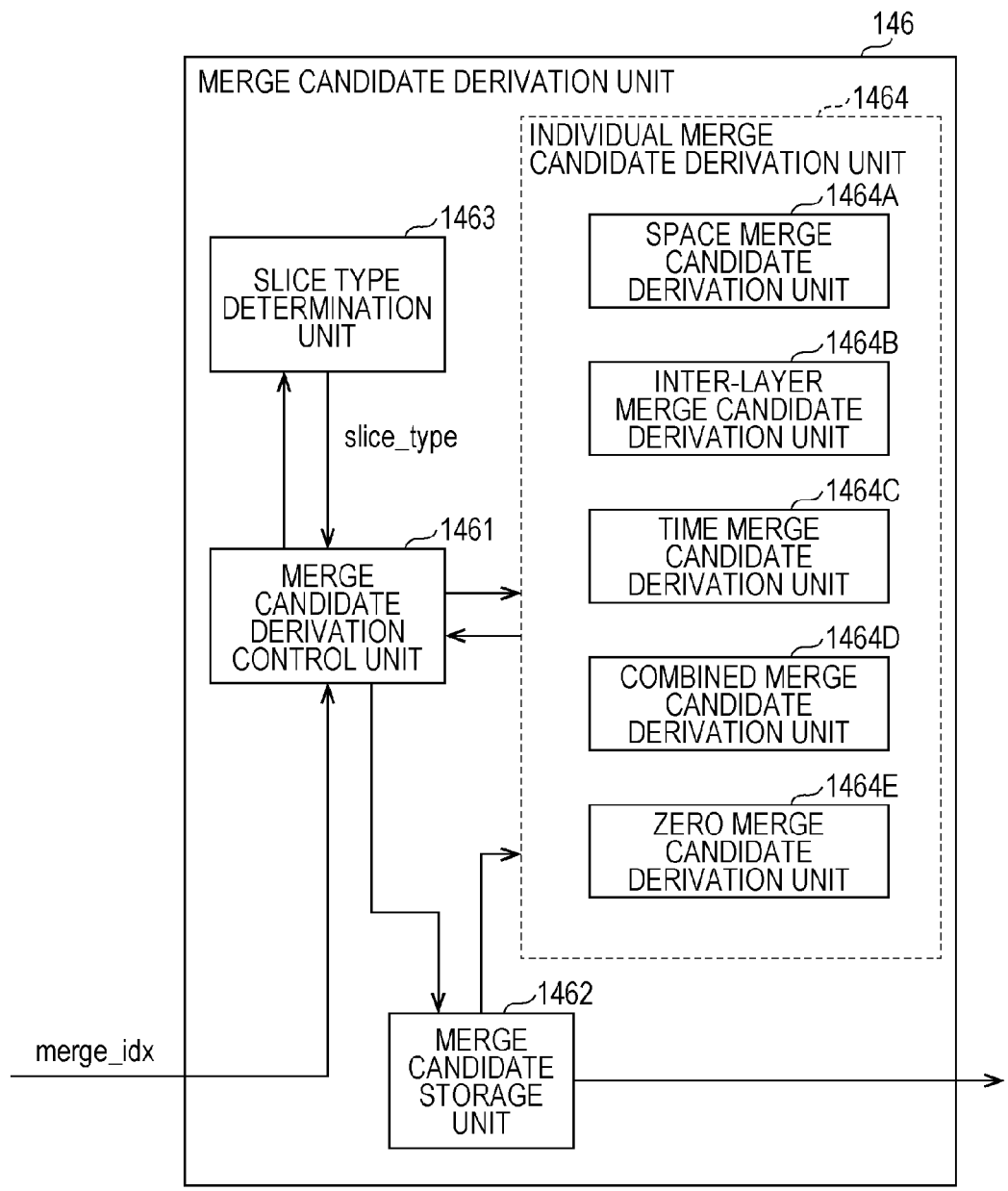
FIG. 1 is a functional block diagram illustrating a configuration of a merge candidate derivation unit included in a hierarchical moving image decoding device according to an embodiment of the present invention.

Next, the detailed configuration of the merge candidate derivation unit 146 will be described with reference to FIG. 1. FIG. 1 is a functional block diagram illustrating a configuration of the merge candidate derivation unit 146.

As illustrated in FIG. 1, the merge candidate derivation unit 146 is configured to include a merge candidate derivation control unit (determination means) 1461, a merge candidate storage unit 1462, a slice type determination unit 1463, and an individual merge candidate derivation unit 1464.

The merge candidate derivation control unit 1461 controls the individual merge candidate derivation unit 1464 so as to derive merge candidates of a predetermined number (the number of derived merge candidates) and store the merge candidates in the merge candidate storage unit 1462. For example, a value of merge_idx+1 is usually used as the number of derived merge candidates. In addition, any integer which is equal to or greater than the value of merge_idx+1 may be used as the number of derived merge candidates. For example, MRG_MAX_NUM_CANDS which is the value obtained by adding 1 to the maximum value of merge_idx may be used as the number of derived merge candidates.

A plurality of merge candidates are stored in the merge candidate storage unit 1462. The merge candidates are recorded as an ordered list (merge candidate list).

The slice type determination unit 1463 determines a slice type of a slice including a target PU as necessary, and outputs the result.

The individual merge candidate derivation unit 1464 derives merge candidates by the designated derivation method, and outputs the merge candidates. The detailed operation of each merge candidate derivation unit selected based on the designated derivation method will be described later. In addition, the merge candidates to be derived are illustratively configured with a reference image list using flag (predFlagLX), a reference image index (refIdxLX), and a motion vector (mvLX) for the reference image list LX. Here, LX is L0 or L1.

(Details of Individual Merge Candidate Derivation Unit)

More specifically, the individual merge candidate derivation unit 1464 includes a space merge candidate derivation unit (target layer candidate derivation means, space motion information candidate derivation means) 1464A, an inter-layer merge candidate derivation unit (inter-layer candidate derivation means) 1464B, a time merge candidate derivation unit (target layer candidate derivation means, time motion information candidate derivation means) 1464C, a combined merge candidate derivation unit (target layer candidate derivation means) 1464D, and a zero merge candidate derivation unit (target layer candidate derivation means) 1464E. In addition, although not illustrated in FIG. 1, the encoding parameters of decoded CU and PU which are stored in the frame memory 155, in particular, the motion compensation of a PU unit (motion compensation parameter) are supplied to the space merge candidate derivation unit 1464A and the time merge candidate derivation unit 1464C.

Further, hereinafter, when collectively referring the space merge candidate derivation unit 1464A, the inter-layer merge candidate derivation unit 1464B, the time merge candidate derivation unit 1464C, the combined merge candidate derivation unit 1464D, and the zero merge candidate derivation unit 1464E, they are collectively referred to as "respective merge candidate derivation units". Further, the respective merge candidate derivation units derive merge candidates according to a predetermined priority order. The derivation order of the merge candidate is controlled by the merge candidate derivation control unit 1461.

Further, when performing the intra-layer merge, the merge candidate derivation control unit 1461 can derive any merge candidate except for the inter-layer merge candidate to the respective merge candidate derivation units. Further, when performing the inter-layer merge, the merge candidate derivation control unit 1461 can derive any merge candidate including the inter-layer merge candidate to the respective merge candidate derivation units.

(Space Merge Candidate Derivation Unit)

Figure 11:
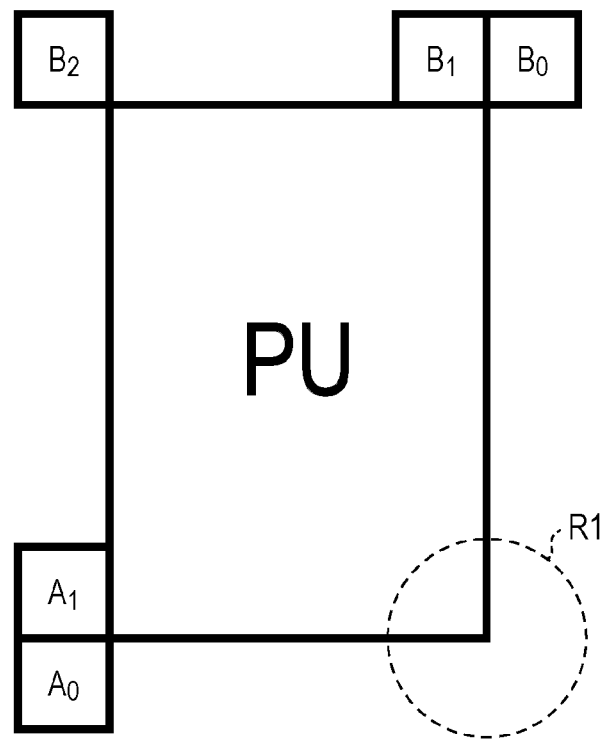
FIG. 11 is a diagram illustrating an operation of a space merge candidate derivation unit included in the merge candidate derivation unit.

FIG. 11 is a diagram illustrating an operation of the space merge candidate derivation unit 1464A. FIG. 11 illustrates a positional relationship between the target PU and the adjacent blocks A0, A1, B0, B1, and B2. In general, the space merge candidate derivation unit 1464A outputs the motion compensation parameters of the respective adjacent blocks as merge candidates. The derivation is performed, for example, in the order of A1, B1, B0, A0, and B2. The derived merge candidates are stored in the merge candidate storage unit 1462. More specifically, the derived merge candidates are added to the end of the merge candidate list which is stored in the merge candidate storage unit 1462, in the derived order. The positions of the respective adjacent blocks can be represented as follows, with the upper left coordinates of the PU as (xP, yP), and the size of the PU as (nPSW, nPSH).

A0: (xP−1, yP+nPSH)
A1: (xP−1, yP+nPSH−1)
B0: (xP+nPSW, yP−1)
B1: (xP+nPSW−1, yP−1)
B2: (xP−1, yP−1)

In addition, if any of the following conditions is satisfied, the merge candidate corresponding to the position N (N is any of A0, A1, B0, B1, and B2) is not derived.

A case where the block of the position N is not usable (not available).
A case where the block of the position N is intra-encoded.
A case where N is B2, and all merge candidates corresponding to the positions of A0, A1, B0, and B1 are derived.
A case where the split type of PU is 2N×N or N×2N, the index of PU is 1, and the block N and the PU of the index 0 have the same motion compensation parameter.
A case where N is B0 and the block N and the block B1 have the same motion compensation parameter.
A case where N is A0 and the block N and the block A1 have the same motion compensation parameter.
A case where N is B2 and the block N has the same motion compensation parameter as either the block A1 or the block B1.

Here, the case where a certain block is not available is a case where the block is out of a screen, or the block is non-decoded. Further, the case where two blocks have the same motion compensation parameter represents that reference image lists using a flag, reference image indexes, and motion vectors for the reference image lists L0 and L1 are all equal in both blocks. The determination of the identity (match determination) of the motion compensation parameter will be described later in detail.

(Inter-Layer Merge Candidate Derivation Unit)

Figure 12:
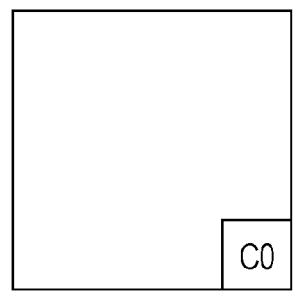
FIG. 12 is a diagram illustrating an operation of an inter-layer merge candidate derivation unit included in the merge candidate derivation unit.

FIG. 12 is a diagram illustrating an operation of the inter-layer merge candidate derivation unit 1464B. FIG. 12 illustrates a region on the reference layer which is referred when the inter-layer merge candidate is derived. The inter-layer merge candidate derivation unit 1464B outputs, for example, the motion compensation parameter in the lower right position C0 in the region on the reference layer corresponding to the target PU (hereinafter, abbreviated as a corresponding reference region) as the merge candidate. The derived merge candidate is stored in the merge candidate storage unit 1462. More specifically, the derived merge candidate is added to the end of the merge candidate list which is stored in the merge candidate storage unit 1462, in the derived order.

Specifically, the inter-layer merge candidate derivation unit 1464B derives the merge candidate with reference to the base decoding information as follows.

The motion compensation parameters (mxLX_RL, refIdxLX_RL, and predFlagLX_RL) of the reference layer are included in the base decoding information which is referred to by the inter-layer merge candidate derivation unit 1464B.

Further, the merge candidate (merge candidate C0) which is derived by the inter-layer merge candidate derivation unit 1464B is configured with the motion compensation parameters (mvLX_C0, refIdxLX_C0, and predFlagLX_C0).

Here, if it is assumed that
an upper left pixel position in a target prediction unit: (xP, yP), a corresponding pixel position on a reference layer: (xPR, yPR),
a ratio of resolution of the target layer to the reference layer: (scaleX, scaleY), and
a size of the target PU: nPSW*nPSH,
the size of the corresponding reference region is nPSWR=ceil(nPSW/scaleX), nPSHR=ceil(nPSH/scaleY). The corresponding reference region is the region on the reference layer corresponding to the target PU.

Further, in this case, if the position of C0 is assumed to be (xC0, yC0), $(xC0, yC0) = (xPR+nPSWR-1, yPR+nPSHR-1)$, and the merge candidate C0 is $mvL\_C0[0] = mvLX\_RL(xC0, yC0)[0] * scaleX$, $mvL\_C0[1] = mvLX\_RL(xC0, yC0)[1] * scaleY$, $refIdxLX\_C0 = refIdxLX\_RL(xC0, yC0)$, and $predFlagLX\_C0 = predFlagLX\_RL(xC0, yC0)$.

The space merge candidates are derived based on information of the positions of the upper right blocks (B1, B0), the lower left blocks (A1, A0), and the upper left block (B2) of the target PU as described above; in contrast, the inter-layer merge candidates are derived based on the information of the position of the lower right block (C0) in the corresponding reference region. Thus, various merge candidates having properties different from the space merge candidate are included in the merge candidate list.

As a result, a possibility of any merge candidate included in the merge candidate list matching actual motion information is increased, and thus the amount of code of the motion information can be reduced.

In addition, without being limited to the above example, the inter-layer merge candidate derivation unit 1464B may be configured to derive a merge candidate from any position in the corresponding reference region.

For example, the motion information which is decoded in the region on the reference layer corresponding to the non-decoded region in the target prediction unit may be derived as a merge candidate.

Further, the inter-layer merge candidate derivation unit 1464B may derive merge candidates based on the information of the positions which are adjacent to the right part, the lower part, and the lower right part of the lower right block (C0).

For example, the inter-layer merge candidate derivation unit 1464B may derive the merge candidate from the position on the reference layer corresponding to the position adjacent to the region R1 of the target PU illustrated in FIG. 11. The region R1 can be represented as a region of a predetermined range including the lower right position in the target reference region.

If speaking qualitatively, the inter-layer merge candidate may be derived from a position on the reference layer corresponding to a position different from the position from which the space merge candidate is derived ("different position" is, in other words, "a position separated by a predetermined distance or more").

In the space merge candidates, there are mainly a large pieces of motion information corresponding to the upper left region of the target PU, and small pieces of motion information corresponding to the lower right region (region R1). According to the above configuration, it is possible to derive merge candidates having properties different from the space merge candidate as the inter-layer merge candidate, from the position in the corresponding reference region.

Figure 20:
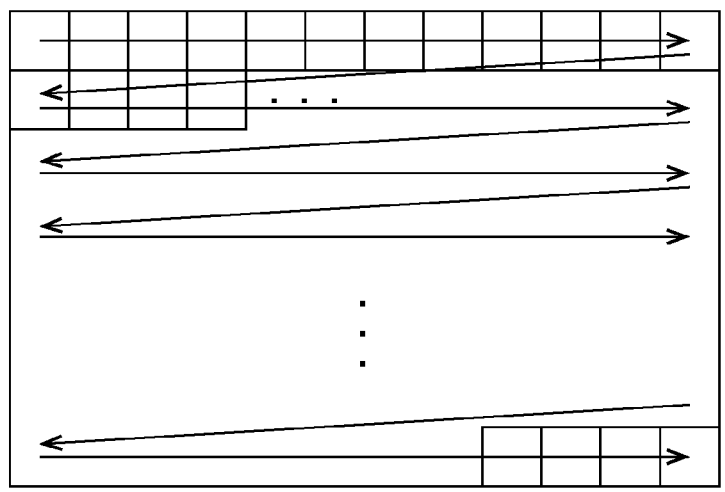
FIG. 20 is a diagram illustrating a non-decoded region when a scan order is a raster scan order.

The supplement of the non-decoded region is as follows. In general, a tree block is subjected to a decoding process in a raster scan order toward a lower right direction, with the upper left part of a picture as a start point, as illustrated in FIG. 20. In such a case, for the target tree block including the target prediction unit, a subsequent tree block in the raster scan order is a non-decoded region. In the case of the raster scan order, a tree block located below the target tree block, or a tree block which is located at the same vertical position as that of the target tree block, and at the right position of the target tree block is a non-decoded tree block. The region included in the non-decoded tree block is a non-decoded region.

Next, with respect to the process order of the coding unit (CU) in the tree block, the CU in the tree block is processed in a so-called Z scan order. In the Z scan, the tree block is split into four congruent squares, and the process is performed in the order of CUs included in respective square regions of the upper left part, the upper right part, the lower left part, and the lower right part. Subsequently, the respective square regions are recursively processed. For example, the region of the upper left part is further split into four congruent square regions, and the process is performed in the order of CUs included in respective square regions of the upper left part, the upper right part, the lower left part, and the lower right part.

Figure 21:
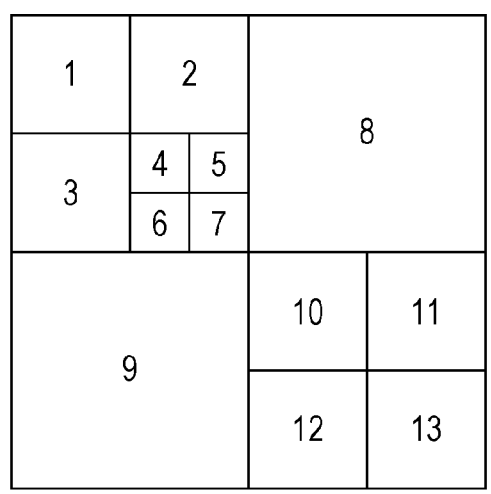
FIG. 21 is a diagram illustrating a non-decoded region when the scan order is a Z scan order.

An example of the Z scan will be described with reference to the example of FIG. 21. In FIG. 21, the numbers given to the respective regions represent a scan order by the Z scan. With respect to the regions which is obtained by splitting the tree blocks into four regions, the CUs of 1 to 7 are included in the upper left region, the CU of 8 is included in the upper right region, the CU of 9 is included in the lower left region and the CUs of 10 to 13 are included in the lower right region. With respect to the regions which is obtained by splitting the upper left region in which the CUs of 1 to 7 are included into four regions, the CU of 1 is included in the upper left region, the CU of 2 is included in the upper right region, the CU of 3 is included in the lower left region and the CUs of 4 to 7 are included in the lower right region. The CU subsequent to the target CU in the Z scan order is a non-decoded CU, and the region included in the CU is a non-decoded region.

Further, the inter-layer merge candidate derivation unit 1464B may be limited or prohibited from deriving a merge candidate from the specific position.

Figure 17:
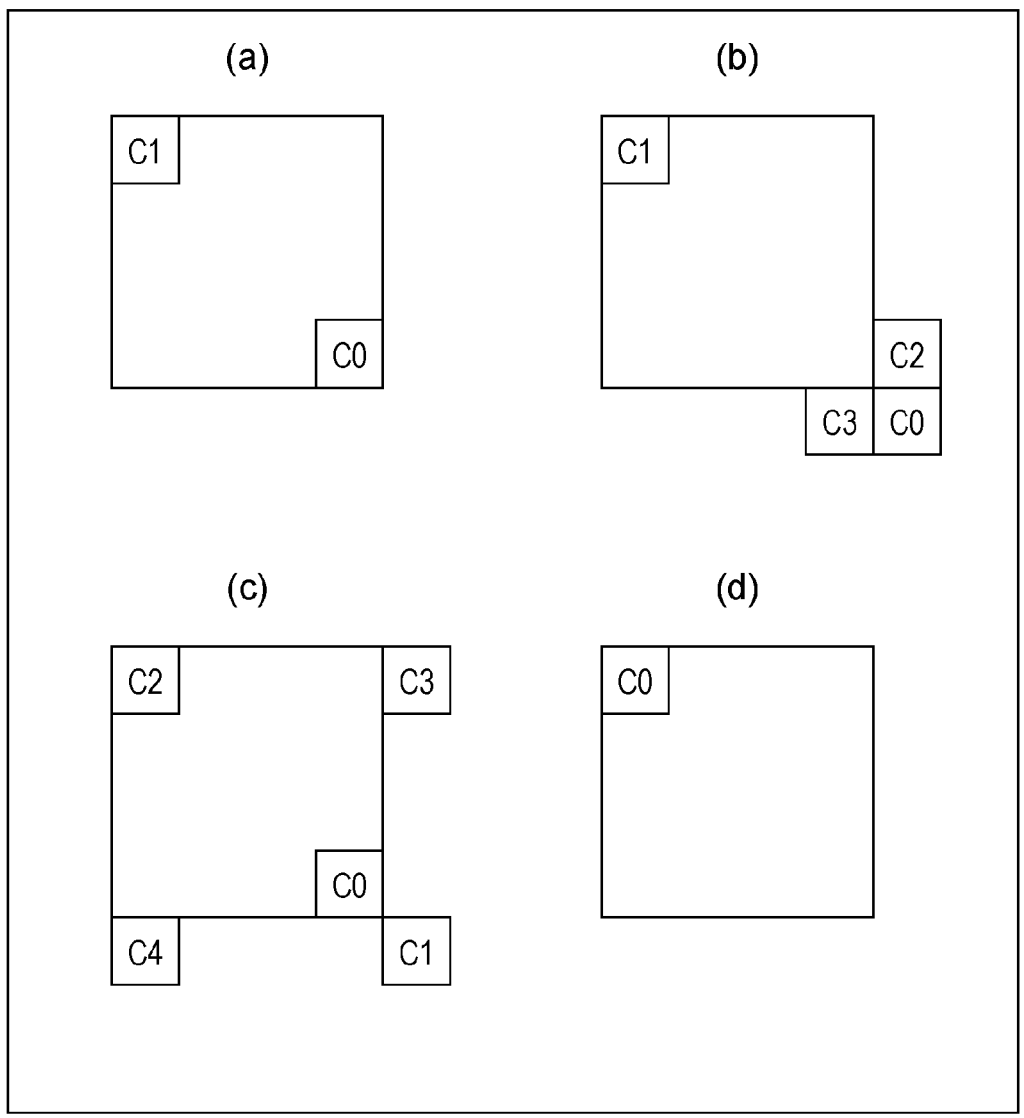
FIG. 17 is a diagram illustrating another operation of the inter-layer merge candidate derivation unit. (a) to (c) illustrate examples of deriving inter-layer merge candidates from two or more positions. (d) illustrates an example of prohibiting the derivation of inter-layer merge candidates.

For example, the derivation of a merge candidate from the position C0 of the upper left part in the corresponding reference region illustrated in FIG. 17(*d*) may be prohibited.

Further, there is a case where the motion information corresponding to the position of the lower right (C0) in the corresponding reference region is not recorded in the memory, but in such a case, a merge candidate may be derived based on the information corresponding to the position adjacent to the lower right (C0). For example, when the motion information of the reference layer is thinned out and recorded in a specific interval (in a N pixel unit), instead of the position of C0, in other words, the position of (xC0, yC0), the merge candidate may be derived based on the motion information corresponding to the position of the ((xC0//N)*N, (yC0//N)*N). Here, the operator "//" is an operator by which the value of "x//y" is a quotient obtained by dividing x by y.

(Time Merge Candidate Derivation Unit)

FIG. 13 is a diagram illustrating an operation of the time merge candidate derivation unit 1464C. If a description is made with reference to FIG. 13(*a*), the time merge candidate derivation unit 1464C schematically derives a time merge candidate as follows. In other words, when a current picture is a currPic, the time merge candidate derivation unit 1464C derives the time merge candidate by copying the motion compensation parameters of a PU on a reference image which is specified by a reference image index refIdxL0 or a PU on a reference image which is specified by a reference image index refIdxL1, which occupies a spatial position similar to the spatial position of the target PU in the current picture. A derivation method of the reference index number refIdxL0 and the reference index number refIdxL1 will be described with reference to FIG. 13(*b*). The reference index number refIdxLX (here, X is 0, 1, or C) is obtained as follows by using the reference pictures refIdxLXA, refIdxLXB, and refIdxLXC of A, B, C blocks, which are PUs adjacent to the target PU.

(1) when refIdxLXA=refIdxLXB=refIdxLXC,
    if refIdxLXA=−1, refIdxLX=0,
    in other cases, refIdxLX=refIdxLXA
(2) when refIdxLXA=refIdxLXB,
    if refIdxLXA=−1, refIdxLX=refIdxLXC,
    in other cases, refIdxLX=refIdxLXA
(3) when refIdxLXB=refIdxLXC,
    if refIdxLXB=−1, refIdxLX=refIdxLXA,
    in other cases, refIdxLX=refIdxLXB
(4) when refIdxLXA=refIdxLXC,
    if refIdxLXA=−1, refIdxLX=refIdxLXB,
    in other cases, refIdxLX=refIdxLXA
(5) when refIdxLXA=−1,
    refIdxLX=min(refIdxLXB, refIdxLXC)
(6) when refIdxLXB=−1,
    refIdxLX=min(refIdxLXA, refIdxLXC)
(7) when refIdxLXC=−1,
    refIdxLX=min(refIdxLXA, refIdxLXB)
(8) in other cases,
    refIdxLX=min(refIdxLXA, refIdxLXB, refIdxLXC)
    here, min is a function that obtains a minimum value.

In addition, the coordinates of the blocks A and B are as follows.

A: (xP−1, yP+nPSH−1)
B: (xP+nPSW−1, yP−1)

The coordinate of the block C is any of following C0, C1, and C2. When scan is performed in the order of C0 to C2, the PU corresponding to each position is available, and other than intra, the refIdxLX of the PU of the position is assumed to be refIdxLXC.

C0: (xP+nPSW−1, yP−1)
C1: (xP−1, yP+nPSH)
C2: (xP−1, yP−1)

If the refIdxL0 and refIdxL1 are derived as described above, the time merge candidate to be derived by obtaining the motion vector of L0 by using the motion compensation parameter of the position (xP+nPSW, yP+nPSH) of the reference picture indicated by the refIdxL0, and obtaining the motion vector of L1 by using the motion compensation parameter of the position (xP+nPSW, yP+nPSH) of the reference picture indicated by the refIdxL1. In other words, the motion vectors mvLXCol[0] and mvLXCol[0] for respective reference picture lists LX (X=0, X=1 or X=C) are derived from the reference pictures indicated by the LXlist and the refIdxLX. Specifically, the PU of the position (xP+nPSW, yP+nPSH) of the reference picture indicated by refIdxLX is unavailable, or an intra-prediction mode, the motion vectors mvLXCol[0] and mvLXCol[1] of LX of the time merge candidate are determined as 0. In other case, that is, when the PredFlagL0 of the PU is 0, the motion vector MvL1 of L1 of the PU is used as the motion vectors mvLXCol[0] and mvLXCol[1] of LX of the time merge candidate. In other cases, the motion vector MvL0 of L0 of the PU is used as the motion vectors mvLXCol[0] and mvLXCol[1] of LX of the time merge candidate.

Subsequently, a final time merge candidate is obtained by scaling the motion vector mvLXCol, by using the picture order count (POC) of a current frame and the POC of the reference picture. The time merge candidate derivation unit 1464C stores the derived time merge candidate in the merge candidate storage unit 1462.

(Combined Merge Candidate Derivation Unit)

Schematically, the combined merge candidate derivation unit 1464D derives a combined merge candidate by combining the motion vectors of two different derived merge candidates which have already been derived and stored in the merge candidate storage unit 1462.

The combined merge candidate derivation unit 1464D derives the combined merge candidates while increasing a combined merge candidate count combCnt from 0, until the number of elements of the merge candidate list matches the number of derived merge candidates or the combCnt exceeds a maximum value (5), and adds the derived combined merge candidates to the end of the merge candidate list.

The derivation procedure of the combined merge candidate corresponding to the specific combined merge candidate count combCnt is as follows.

First, the indexes l0CandIdx and L1CandIdx indicating the positions on the merge candidate list, of two merge candidates which are used for combination, in other words, an L0 merge candidate and an L1 merge candidate are respectively derived by referring to the merge candidate combination list as the combCnt as an index (combIdx). The example of the merge candidate combination list is shown in FIG. 14. The combined merge candidate is generated by copying the motion compensation parameters of the L0 merge candidate to the reference image list L0 and the L1 merge candidate to the reference image list L1. In addition, if any of the following conditions is satisfied, the combined merge candidate corresponding to the combCnt is not derived.

the L0 reference image list using flag of the L0 merge candidate is 0, the L1 reference image list using flag of the L1 merge candidate is 0, and the motion vectors or the reference images of the L0 merge candidate and the L1 merge candidate match.

The combined merge candidate is derived in the procedure described above. In addition, in the motion compensation parameter corresponding to the combined merge candidate, the reference image lists using flag of L0 and L1 are 1. In other words, the combined merge candidate is a merge candidate for which bi-prediction is performed. Thus, in a situation to which the bi-prediction is not applicable (for example, a PU in a P slice), the combined merge candidate is not included in the merge candidate list.

(Zero Merge Candidate Derivation Unit) FIG. 15 is a diagram illustrating an operation of the zero merge candidate derivation unit 1464E. If the number of merge candidates of the merge candidate storage unit 1462 reaches the number of derived merge candidates, the zero merge candidate derivation unit 1464E does not perform the process (the zero merge candidate is not derived). Meanwhile, if the number of merge candidates does not reach the number of derived merge candidates, the zero merge candidate derivation unit 1464E generates a merge candidate having a zero vector and adds the merge candidate to the merge candidate list until the number of merge candidates reaches the number of derived merge candidates. In other words, candidates in which the motion vector (mvL0zeroCand$_m$[0], and mvL0zeroCand$_m$[1]) of L0 and the motion vector (mvL1zeroCand$_m$[0], and mvL1zeroCand$_m$[1]) of L1 are 0 are derived by setting the index of the merge candidate to be referred as zeroCand$_m$. Here, a value obtained by adding 1 to the last index of the merge candidate list which has already been derived is used as the index zeroCand$_m$. m is an index starting from 0, and is incremented by 1 when adding the zero merge candidate to the merge candidate list.

(Flow of Merge Candidate Derivation Process)

Figure 16:
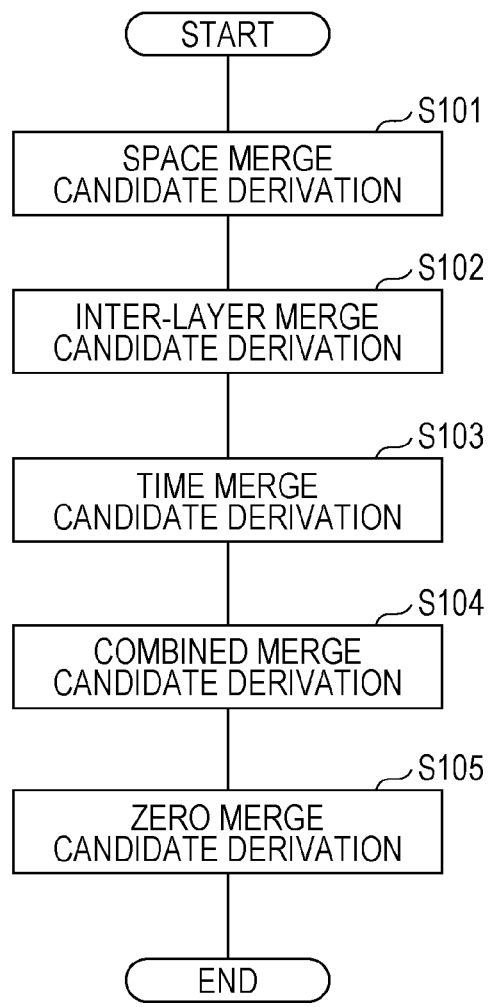
FIG. 16 is a flowchart illustrating an example of a flow of an operation of the merge candidate derivation unit.

An example of the flow of the merge candidate derivation process will be described with reference to FIG. 16. FIG. 16 is a flowchart illustrating an example of a flow of an operation of the merge candidate derivation unit 146.

As illustrated in FIG. 16, first, the space merge candidate derivation unit 1464A derives a merge candidate S0 to a merge candidate S2 (S101).

Subsequently, the inter-layer merge candidate derivation unit 1464B derives a merge candidate C0 (S102).

Subsequently, the time merge candidate derivation unit 1464C derives a merge candidate T (S103).

Subsequently, the combined merge candidate derivation unit 1464D derives a merge candidate C (S104). In addition, S104 may be configured to be performed when the slice type determination unit 1463 determines that the slice type is a B slice.

Last, the zero merge candidate derivation unit 1464E derives a merge candidate Z (S105).

(Operation and Effect)

As described above, the hierarchical moving image decoding device 1 is a hierarchical moving image decoding device 1 which decodes hierarchically encoded data DATA obtained by hierarchically encoding image information regarding images of different qualities for respective layers, restores motion information of a target layer which is a decoding target, and restores a decoded image POUT#T in the target layer by using a predicted image generated by motion compensation prediction based on the restored motion information, and is configured to include an inter-layer merge candidate derivation unit 1464B that derives motion information which is decoded in a region on the reference layer corresponding to a non-decoded region in an adjacent region including the target prediction unit, by referring to the reference layer which is a decoded layer, in a target prediction unit which is a processing target of predicted image generation in the target layer, as a candidate for estimating the motion information in the target prediction unit.

Therefore, according to the above configuration, it is possible to add the motion information on the reference region corresponding to the region which cannot be used due to non-decoding, in the same layer to the merge candidate list.

Accordingly, an effect is achieved which is capable of reducing the code amount of motion information by deriving various pieces of motion information as candidates, in the generation of a motion information candidate list of hierarchical encoding.

(Modification of Merge Candidate Derivation Unit)

A preferred modification of the merge candidate derivation unit 146 will be described later.

(Derivation of Inter-Layer Merge Candidate from Two or More Positions)

As illustrated in FIGS. 17(a) to (c), the inter-layer merge candidate derivation unit 1464B may derive the inter-layer merge candidates from two or more positions on the reference region. Hereinafter, FIGS. 17(a) to (c) will be respectively described in order.

[1] As illustrated in FIG. 17(a), the inter-layer merge candidate derivation unit 1464B may use the position C1 of the upper left part in the corresponding reference region as the target of the inter-layer merge candidate derivation, in addition to the position C0.

For example, when the position C0 is not available, the inter-layer merge candidate derivation unit 1464B uses the position C1. In other words, with respect to the priority of the merge candidate derivation of the inter-layer merge candidate derivation unit 1464B, the position C0 in the lower right part has higher priority over the position C1.

According to the modification, because the position C0 is not available, even if the motion information of the position C0 cannot be referred to, the inter-layer merge candidate derivation unit 1464B may derive the inter-layer merge candidate in some cases.

[2] As illustrated in FIG. 17(b), the inter-layer merge candidate derivation unit 1464B may use the lower right adjacent blocks C0, C2, and C3 of the corresponding reference region and the upper left position C1 in the corresponding reference region for derivation of the inter-layer merge candidate. In addition, for example, the priorities of the merge candidate derivation are in the order of positions C0, C1, C2, and C3.

When the target PU or the corresponding reference region is small, there is a possibility that the pixel corresponding to the upper left position and the pixel corresponding to the lower right position in the corresponding reference region belong to a recording unit of the same motion information.

Since the motion information of the lower right adjacent block is used, the possibility of deriving motion information from a recording unit different from the upper left part in the corresponding reference region increases.

Thus, the possibility of deriving the upper left part of the corresponding reference region and the different motion information increases.

[3] As illustrated in FIG. 17(c), the inter-layer merge candidate derivation unit 1464B may use the lower right position C0 of the corresponding reference region, the lower right adjacent block C1 of the corresponding reference region, the upper left position C1 of the corresponding reference region, and the right adjacent block C3 and the lower adjacent block C4 of the corresponding reference region for derivation of the inter-layer merge candidate.

Further, the priorities of the merge candidate derivation are in the order of positions C0, C1, C2, C3, and C4.

Further, when the motion information does not exist in respective positions C0 to C4, the inter-layer merge candidate may be added.

Further, the merge candidate derivation control unit 1461 performs match determination between respective motion compensation parameters of the positions C1 to C4 and the motion compensation parameter of the position C0, and as a result of the determination, when the motion compensation parameters do not match with each other, the inter-layer merge candidate derivation unit 1464B may derive the corresponding merge candidate.

In addition, for example, the operation of a function equalMotion(A, B) for performing matching determination of the motion compensation parameters of the block A and the block B may be defined as follows.

equalMotion(A,B)=(predFlagL0A==predFlagL0B)&&
(predFlagL1A==predFlagL1B)&&
mvL0A[0]==mvL0B[0]&&mvL0A[1]==mvL0B
[1]&&mvL1A[0]==mvL1B[0]&&mv
L1A[1]==mvL1B[1])

Here, when the reference pictures of L0 and L1 are used in the block A, predFlagL0A and predFlagL1A become 1; in other cases, predFlagL0A and predFlagL1A become 0. mvL0[0] and mvL0[1] are the horizontal motion vector and the vertical motion vector of L0, and mvL1[0] and mvL1[1] are the horizontal motion vector and the vertical motion vector of L1. In addition, in the case of the block B, A is replaced with B.

Further, the inter-layer merge candidate derivation unit 1464B derives the merge candidates in the priority order while performing the match determination, and may add the inter-layer merge candidate until the number of unique merge candidates is two.

According to the configuration of the modification, because the possibility of deriving different motion information increases, a possibility that the motion information of the encoding target is included in the merge candidate increases. As a result, it is possible to reduce the code amount of the motion information.

(Match Determination)

The merge candidate derivation control unit 1461 may perform the match determination of the motion compensation parameters of the merge candidates which are derived by respective merge candidate derivation units (hereinafter, referred to as the match determination of the merge candidate). Further, as the result of the match determination, the merge candidate derivation control unit 1461 may store only the merge candidate which is determined to be unique in the merge candidate storage unit 1462. Further, the merge candidate derivation control unit 1461 may omit the match determination between the inter-layer merge candidate which is derived by the inter-layer merge candidate derivation unit 1464B, and the merge candidate which is derived by another merge candidate derivation unit.

For example, in the flowchart illustrated in FIG. 16, after the inter-layer merge candidate derivation unit 1464B, the time merge candidate derivation unit 1464C and the combined merge candidate derivation unit 1464D derive merge candidates. Here, it is possible to omit the match determination between the time merge candidate and the combined merge candidate, and the merge candidate included in the merge candidate list.

According to the configuration of the modification, it is possible to perform the inter-layer merge candidate derivation step (S102), the time merge candidate derivation step (S103) and the combined merge candidate derivation step (S104) in parallel.

Further, when the merge candidate derivation control unit 1461 performs the match determination between the space merge candidate and the inter-layer merge candidate, it is preferable to perform the match determination only with the merge candidate S0 of the space merge candidates (first merge candidate in the merge candidate list).

Thus, it is possible to reduce the possibility of the same merge candidate being included in the candidate list while suppressing a decrease in parallelism.

(Omission of Merge Candidate Derivation Step)

Another example of the flow of the merge candidate derivation process will be described with reference to FIG.

Figure 18:
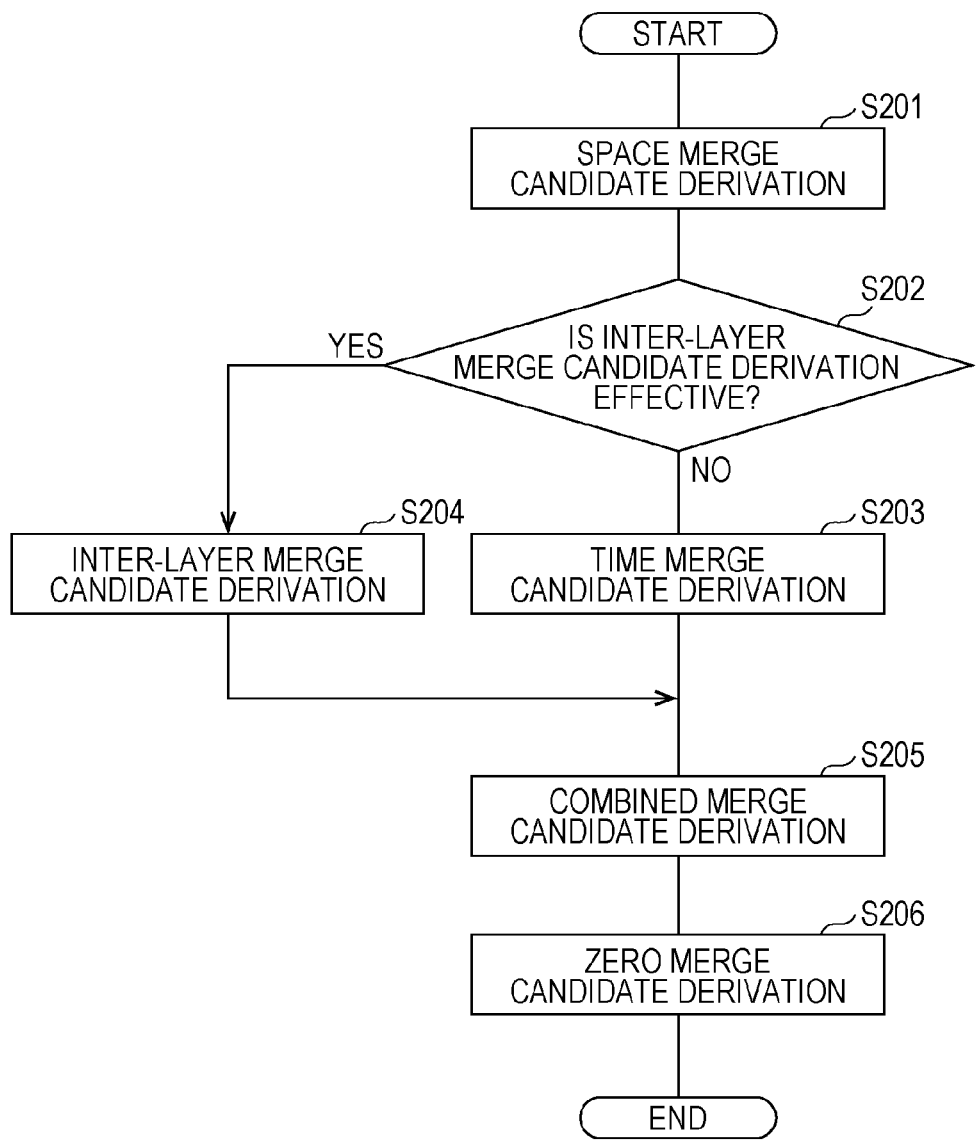
FIG. 18 is a flowchart illustrating another example of a flow of an operation of the merge candidate derivation unit.

18. FIG. 18 is a flowchart illustrating another example of the operation of the merge candidate derivation unit 146.

Hereinafter, an example of omitting the time merge candidate derivation step when the inter-layer merge candidate derivation step is performed will be descried with reference to FIG. 18.

As illustrated in FIG. 18, first, the space merge candidate derivation unit 1464A derives a merge candidate S0 to a merge candidate S2 (S201).

Next, the merge candidate derivation control unit 1461 determines whether or not the inter-layer merge candidate derivation is effective (S202). For example, in the following (A) or (B) case, the merge candidate derivation control unit 1461 can determine that the inter-layer merge candidate derivation is effective.

(A) A case where a flag included in the SPS and the PPS indicates that the inter-layer merge prediction is effective, or (B) A case where there is a reference layer corresponding to the target PU and the target PU and the reference layer are the P slice or the B slice.

Here, when the inter-layer merge candidate derivation is effective (YES in S202), the inter-layer merge candidate derivation unit 1464B derives a merge candidate C0 (S204).

Meanwhile, when the inter-layer merge candidate derivation is not effective (NO in S202), the time merge candidate derivation unit 1464C derives the merge candidate T (S203).

In other words, because the inter-layer merge candidate step (S204) and the time merge candidate derivation step (S203) are alternatively performed, when one is performed, the other is omitted.

Next, the combined merge candidate derivation unit 1464D derives a merge candidate C (S205). Last, the zero merge candidate derivation unit 1464E derives a merge candidate Z (S206).

There is no significant difference between the reduced code amount of the motion information in the case of the using both the time merge candidate and the inter-layer merge candidate and the reduced code amount of the motion information in the case of using any of them.

Therefore, in the case of using the inter-layer merge candidate, even without using the time merge candidate, the code amount is not increased so much. In other words, if the derivation of the time merge candidate is omitted, it is possible to reduce the processing load on the derivation of the time merge candidates and saving of memory resources.

According to the above configuration, in the case of using the inter-layer merge candidate, the derivation of the time merge candidates is omitted.

Accordingly, the time merge candidate is not used in the case of using the inter-layer merge candidate. Thus, it is possible to reduce the processing amount required for time merge candidate derivation and the memory amount for recording the motion vector of the reference image, while suppressing a significant increase in the code amount of the motion information.

Further, the reverse case will be described. For example, in a case of using the time merge candidate, even without using inter-layer merge candidate, the code amount is not increased so much.

According to the above configuration, in the case of using the time merge candidate, the derivation of the inter-layer merge candidate will be omitted. Accordingly, the code amount of the motion information is not increased so much, and it is possible to reduce the processing amount required for inter-layer merge candidate.

As described above, by selectively deriving any of the inter-layer merge candidate and the time merge candidate, it is possible to avoid a case of using both merge candidates of the inter-layer merge candidate and the time merge candidate. In other words, it is possible to avoid a case where both merge candidates should be processed. Thus, it is possible to intend a reduction in the worst value of the processing amount (the processing amount when the processing amount becomes the largest).

(Inter-Layer Intra-Candidate Derivation Unit)

Figure 19:
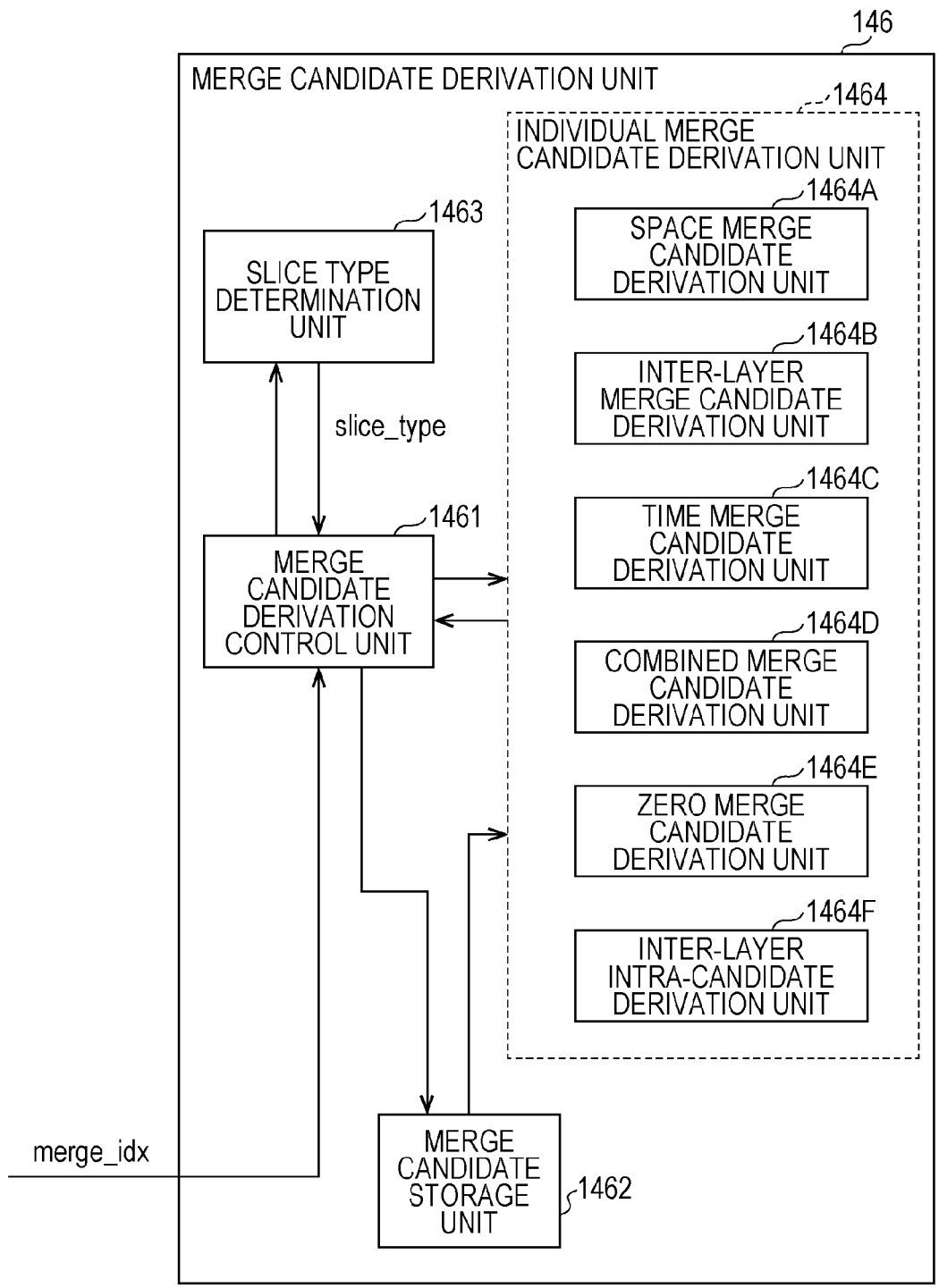
FIG. 19 is a functional block diagram illustrating a configuration according to a modification of the merge candidate derivation unit.

The modification of the merge candidate derivation unit 146 will be described with reference to FIG. 19. The individual merge candidate derivation unit 1464 may not include an inter-layer intra-candidate derivation unit 1464F.

In the present modification, the concept of the merge candidate list is extended. Specifically, the inter-layer intra-candidate derivation unit 1464F signals the inter-layer intra-prediction (texture prediction) in the merge candidate list.

In other words, the inter-layer intra-candidate derivation unit 1464F adds the inter-layer intra-candidate which is a candidate for signaling the inter-layer intra-prediction to the merge candidate list. When the inter-layer intra-candidate is selected from the merge candidate list, the inter-layer intra-prediction unit 152C of the texture prediction unit 152 generates a predicted image based on the image obtained by up-sampling decoding pixels of the reference layer.

Further, in the present modification, the merge candidate derivation control unit 1461 may add each merge candidate to the merge candidate list in the following priority order.

1) the space merge candidate, 2) the time merge candidate, 3) the inter-layer merge candidate, 4) the combined merge candidate, 5) the zero merge candidate, and 6) the inter-layer intra-candidate Further, the derivation of the merge candidate by the merge candidate derivation unit 146 can be performed by the method described below.

In other words, as one method, the merge candidates are added until the number of merge candidates reaches the maximum value of the number of derived merge candidates of the merge candidate list, in the priority order of 1) to 6).

Further, as another method, the merge candidate of the maximum value −1 of the number of derived merge candidates of the merge candidate list are added, in the priority order of 1) to 5), and 6) the inter-layer merge candidate is added as the merge candidate.

According to the above configuration, it is possible to select the inter-layer intra-prediction in the PU unit. Thus, it is possible to reduce side information as compared to a case where a selection flag (base_mode_flag) is provided for each CU.

Further, the merge candidate derivation control unit 1461 may add each merge candidate to the merge candidate list in the following priority order.

1) the space merge candidate, 2) the time merge candidate, 3) the inter-layer candidate, 4) the combined merge candidate, 5) the zero merge candidate Here, 3) the inter-layer candidate is a merge candidate regarding the inter-layer prediction, specifically, the inter-layer merge candidate or the inter-layer intra-candidate. The candidate to be added as the inter-layer candidate depending on the prediction type of the CU to which the region on the reference layer corresponding to the target PU belongs (hereinafter, referred to as a reference CU) is switched between the inter-layer merge candidate and the inter-layer intra-candidate. In addition, this switching may be controlled by the merge candidate derivation control unit 1461.

When the reference CU is the inter-CU, the inter-layer merge candidate derivation unit 1464B derives the inter-layer merge candidate as the inter-layer candidate. When the inter-layer merge candidate is selected, the inter-prediction unit 152A of the texture prediction unit 152 generates a predicted image by the motion compensation prediction.

When the reference CU is the intra-CU, the inter-layer intra-candidate derivation unit 1464F derives the inter-layer intra-candidate as the inter-layer candidate. When the inter-layer intra-candidate is selected, the inter-layer intra-prediction unit 152C of the texture prediction unit 152 generates a predicted image based on the image obtained by up-sampling the decoded pixels of the reference layer.

When the reference layer is the inter-CU, in order to achieve the reduction in the processing amount in the motion compensation process, the decoded image of the inter-CU is not used for the motion information prediction of the inter-layer prediction. Further, when the reference layer is the intra-CU, information of motion compensation does not exist in the intra-CU.

According to the above configuration, candidates are generated by using information available in the reference CU, depending on whether the reference CU is the inter-CU or the intra-CU.

Thus, in the merge candidate list, it is possible to reduce the number of merge candidates as compared to a case where the inter-layer merge candidate and the inter-layer intra-candidate are treated as separate candidates.

Further, when adding the merge candidate, it is possible to suppress an overhead in which unavailable information is referred to.

<<Details of PU Split Type Derivation Unit>>

Figure 27:
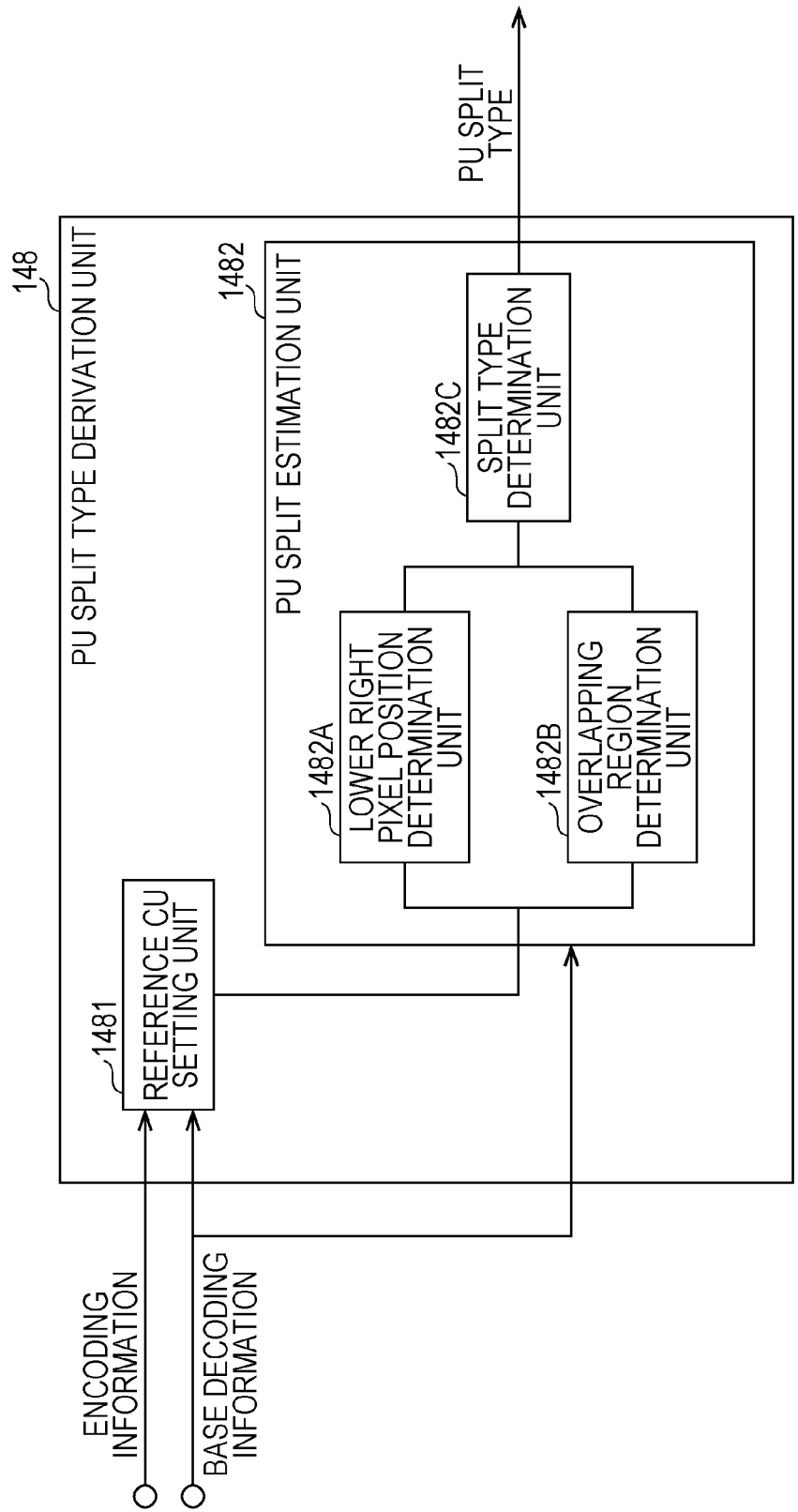
FIG. 27 is a functional block diagram illustrating a configuration of a PU split type derivation unit included in the hierarchical moving image decoding device according to the embodiment of the present invention.

Next, the detailed configuration of the PU split type derivation unit 148 will be described with reference to FIG. 27. FIG. 27 is a functional block diagram illustrating a configuration of the PU split type derivation unit 148.

As illustrated in FIG. 27, the PU split type derivation unit 148 is configured to include a reference CU setting unit 1481, and a PU split estimation unit 1482.

The reference CU setting unit 1481 sets the region on the reference layer corresponding to the target CU when decoding the target CU which is a decoding target, and sets the CU on the reference layer to be referred at the time of the PU split estimation, with the set reference region as a reference. Hereinafter, the region which is set by the reference CU setting unit 1481 is referred to as the reference region, and the CU on the reference layer is referred to as the reference CU.

The PU split estimation unit 1482 estimates the split type of the target CU of the target layer to the PU, with reference to the reference CU which is set by the reference CU setting unit 1481 (estimation of the PU split type).

More specifically, the PU split estimation unit 1482 includes a lower right pixel position determination unit 1482A, an overlapping region determination unit 1482B, and a split type determination unit 1482C.

The lower right pixel position determination unit 1482A determines the position in the reference region of the position of the lower right pixels in the reference CU.

The overlapping region determination unit 1482B determines the degree of overlap of a region in which the reference CU and the reference region overlap (hereinafter, referred to as an overlapping region). The degree of overlap of the overlapping region includes, for example, the magnitude relationship between the size of the area of the overlapping region, the shape, width and height of the overlapping region, and an inclusion relationship between the reference CU and the reference region.

The split type determination unit 1482C determines the PU split type of the target CU, in response to the determination result of the lower right pixel position determination unit 1482A or the overlapping region determination unit 1482B.

Hereinafter, the operations of the reference CU setting unit 1481 and the PU split estimation unit 1482 will be described in detail with reference to FIGS. 28 to 40.

(Operation of Reference CU Setting Unit)

An example in which the reference CU setting unit 1481 sets the reference CU for the target CU tgtCU included in the target frame tgtFR1 on the target layer will be described, with reference to FIG. 28.

Figure 28:
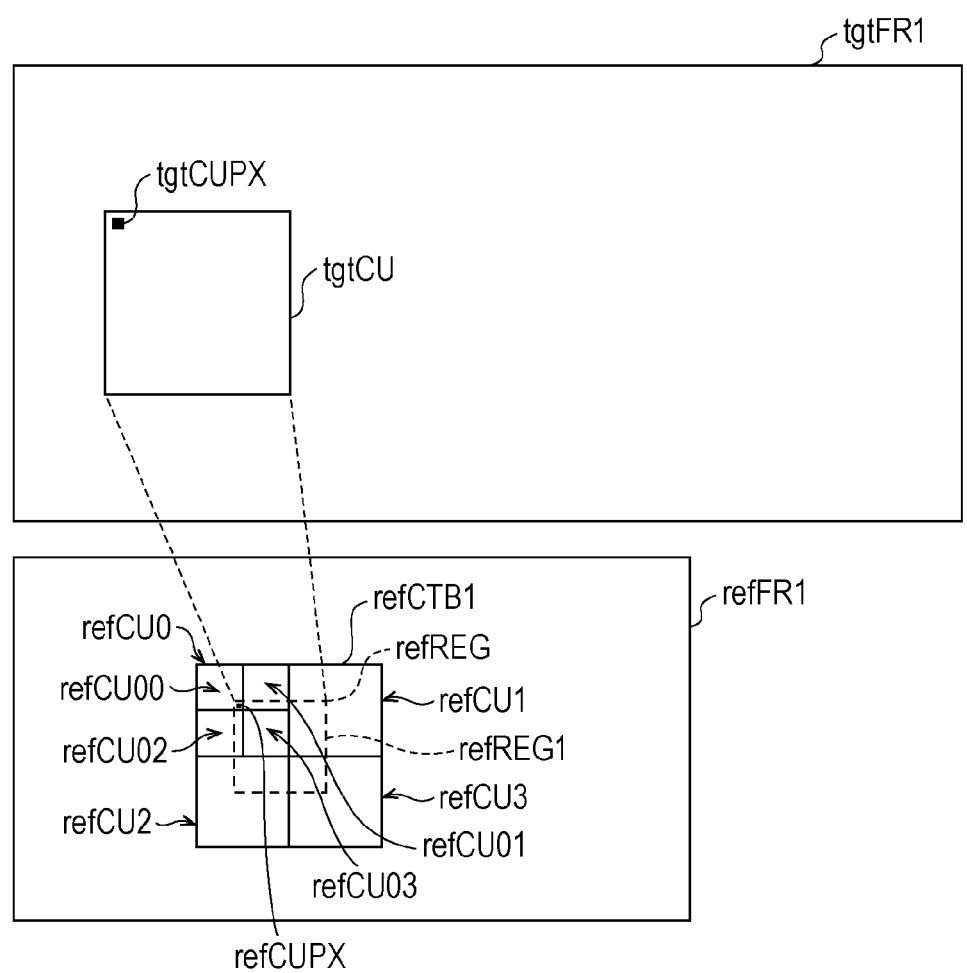
FIG. 28 is a diagram illustrating an example in which a reference CU setting unit included in the PU split type derivation unit sets a reference CU for a target CU included in a target frame on a target layer.

As illustrated in FIG. 28, first, the reference CU setting unit 1481 sets the reference region refREG on the reference layer corresponding to the target CU tgtCU, which is a CU included in the reference frame refFR1 on the reference layer.

In other words, the reference frame refFR1 is a frame on the reference layer at the same time with that of the target frame tgtFR1.

Further, here, the target CU tgtCU "corresponds" to the reference region refREG means that the spatial position of the target CU tgtCU in the target frame tgtFR1 on the target layer corresponds to the spatial position of the reference region refREG in the reference frame refFR1 on the reference layer.

Next, the reference CU setting unit 1481 sets the reference CU, with the reference region refREG as a reference.

In the example illustrated in FIG. 28, the reference region refREG is included in the coding tree block refCTB1 on the reference layer. Further, the refCU0, the refCU1, the refCU2, and the refCU3 which are CUs of hierarchical depth 1 are included in the coding tree block refCTB1. Further, the refCU00, the refCU01, the refCU02, and the refCU03 which are splitting CUs of hierarchical depth 2 are included in the refCU0.

Here, the reference region refREG may have an overlapping part with a plurality of CUs on the reference layer. In other words, the reference region refREG may overlap the plurality of CUs on the reference layer.

In the example illustrated in FIG. 28, the reference region refREG has overlapping parts with the refCU00, the refCU01, the refCU02, the refCU03, the refCU1, the refCU2, and the refCU3.

Hereinafter, an example in which the reference CU setting unit 1481 sets the CU on the reference layer including the pixel refCUPX corresponding to the upper left pixel tgtCUPX of the target CU as the reference CU will be mainly described. In other words, in the example illustrated in FIG. 28, the refCU00 becomes the reference CU.

Figure 29:
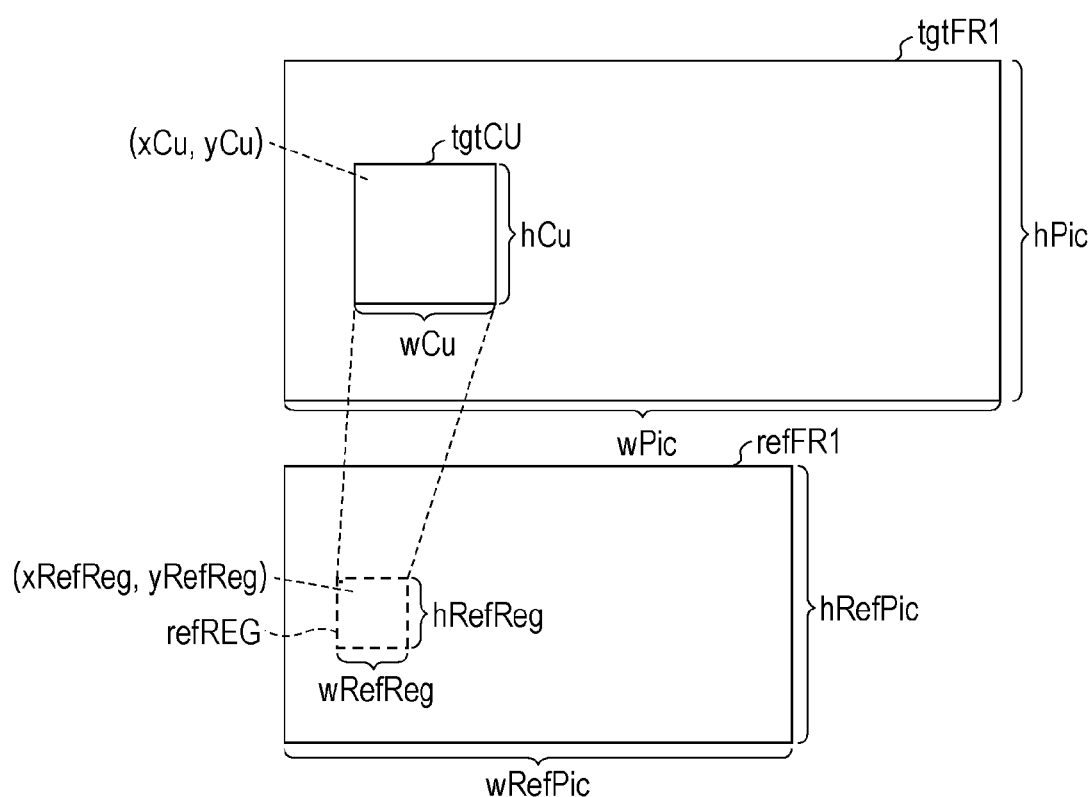
FIG. 29 is a diagram illustrating the setting of the reference CU in FIG. 28 in more detail.

The setting of the reference CU as described above will be described in more detail, with reference to FIG. 29. As illustrated in FIG. 29, the height and width of the target frame tgtFR1 on the target layer are respectively assumed to hPic and wPic. Further, the height and width of the target CU tgtCU are respectively assumed to hCu and wCu, and the representation of the coordinate in the target frame tgtFR1 of the position of the upper left pixel is assumed to (xCu, yCu). Further, the height and width of the reference frame refFR1 on the reference layer are respectively assumed to hRefPic and wRefPic.

When setting the reference CU corresponding to the upper left pixel, the reference CU setting unit 1481 sets the reference CU as follows. First, the reference CU setting unit 1481 derives the coordinate (xRefReg, yRefReg) of the reference region refREG by the following calculation. In addition, the following scaleX•scaleY is a ratio of the width and height of the target frame to the width and height of the reference frame.

$$scaleX = wPic/wRefPic$$

$$scaleY = hPic/hRefPic$$

$$xRefReg = xCu/scaleX$$

$$yRefReg = yCu/scaleY$$

Subsequently, the reference CU setting unit 1481 sets the CU including the coordinate (xRefReg, yRefReg) of the reference region refREG obtained as described above, as the reference CU.

In addition, without being limited to the above, the reference CU setting unit 1481 may set the reference CU corresponding to the center pixel as described below. First, the reference CU setting unit 1481 derives the width and the height of the reference region refREG (wRefReg, hRefReg) by the following calculation. In addition, the derivation methods of the scaleX, the scaleY, the xRefReg and the yRefReg which will be described later are as previously described.

$$wRefReg = wCu/scaleX$$

$$hRefReg = hCu/scaleY$$

At this time, the coordinate (xRefC, yRefC) of the center pixel of the reference region is obtained by $$xRefC = xRefReg + (hRefReg >> 1)$$

$$yRefC = yRefReg + (wRefReg >> 1).$$

Subsequently, the reference CU setting unit 1481 sets the CU including the coordinate (xRefC, yRefC) of the center pixel of the reference region obtained as described above, as the reference CU.

In the above example, the values of the scaleX and scaleY are calculated based on the assumption that all reference frames on the reference layer spatially correspond to all target frames on the target layer, but are not limited thereto. For example, a case is considered in which the partial region on the target layer spatially corresponds to all reference frames on the reference layer. In such a case, the values of the scaleX and the scaleY are calculated based on the position (offset from the upper left part of the target frame) of the partial region on the target layer and the size of the partial region.

(Operation of PU Split Estimation Unit)

Next, an example in which the PU split estimation unit 1482 estimates the PU split type of the target CU tgtCU will be described with reference to FIGS. 30 to 40.

[Case of Using a Single Reference CU (CU Including Upper Left Pixel of Reference Region)]

First, a case will be described in which the lower right pixel position determination unit 1482A determines whether the position of the lower right pixels refCUPX of the reference CU refCU is the position of the reference region refREG, and the split type determination unit 1482C determines the PU split type of the target CU based on the determination result. In addition, the upper left pixel of the reference region refREG is included in the reference CU refCU, as described above.

[A] Lower Right Pixel in Upper Half of Reference Region

As illustrated in FIG. 30(*a*), when it is determined that the position of the lower right pixel refCUPX of the reference CU refCU is in the position of the upper half of the reference region refREG (a region above a straight line M1), the split type determination unit 1482C estimates that the PU split type of the target CU tgtCU is the 2N×N (refer to FIG. 30(*b*)).

When the lower right pixel of the reference CU is located in the upper half of the reference region, at least a CU boundary in the horizontal direction exists in the upper half of the reference region. In general, when the CU boundary exists, two regions across the boundary are more likely to have different types of motion information as compared to the case where than when the CU boundary does not exist. Accordingly, the boundary of an object is highly likely to exist in the upper half of the reference region. Therefore, a region in the upper half in which the boundary of an object is highly likely to exist and a region in the lower half in which the presence or absence of the boundary of an object is unclear are split into different PUs, such that it is possible to increase a possibility that a PU without the boundary of the object is set increases.

[B] Lower Right Pixel in Lower Left of Reference Region

As illustrated in FIG. 31(*a*), when it is determined that the position of the lower right pixel refCUPX of the reference CU refCU is in the position of the lower left of the reference region refREG (a region located below the straight line M1 and on the left of a straight line M2), the split type determination unit 1482C estimates that the PU split type of the target CU tgtCU is the N×2N (refer to FIG. 31(*b*)).

When the lower right pixel of the reference CU is in the position of the lower left of the reference region, at least a CU boundary in the vertical direction exists in the left half of the reference region. Therefore, it is possible to increase a possibility that a PU without the boundary of the object is set increases, similar to the case [A], by using the PU split type in which the reference region is split into the left half and the right half.

[C] Lower Right Pixel in Lower Right of Reference Region

As illustrated in FIG. 32(*a*), when it is determined that the position of the lower right pixel refCUPX of the reference CU refCU is in the position of the lower right of the reference region refREG (a region located below the straight line M1 and on the right of the straight line M2), the split type determination unit 1482C estimates that the PU split type of the target CU tgtCU is the 2N×2N (refer to FIG. 32(*b*)).

When the lower right pixel of the reference CU is in the position of the lower right of the reference region, the area of the overlapping region between the reference region and the reference CU is large. Therefore, most of the reference regions are likely to be included in a single CU (reference CU), and to have uniform motion information. Therefore, it is possible to improve the coding efficiency by using the 2N×2N which is PU split most suitable to a case of having a uniform motion in the reference region.

[D] Reference CU Includes Reference Region

Figure 33:
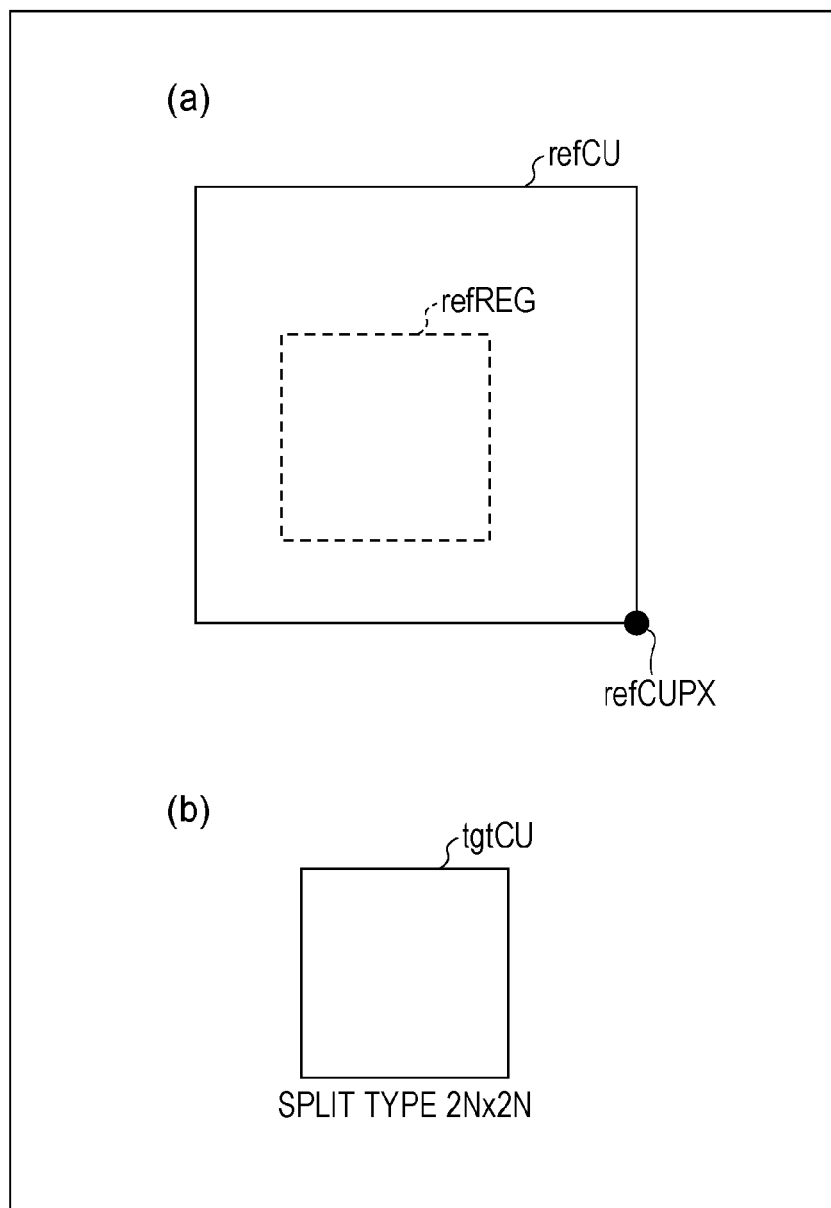
FIG. 33 is a diagram illustrating the method of setting the PU split type, by using a result obtained by determining the position in the reference region of the position of the lower right pixel of the reference CU.

As illustrated in FIG. 33(*a*), when it is determined that the position of the lower right pixel refCUPX of the reference CU refCU is in the position outside the lower right position of the reference region refREG, in other words, when the reference CU refCU includes the reference region refREG, the split type determination unit 1482C estimates the PU split type of the target CU tgtCU as the 2N×2N (refer to FIG. 32(*b*)).

When the reference CU includes the reference region, the reference region is highly likely to have uniform motion information. Therefore, it is possible to improve the coding efficiency by using the PU splitting 2N×2N which is most suitable to a case of having a uniform motion in the reference region.

As described above, it is possible to derive a PU split type by the position determination process of the lower right pixel, without deriving the exact position of the CU boundary in the reference region. Thus, it is possible to derive the PU split type with a relatively small amount of process.

A method in which the lower right pixel position determination unit 1482A determines the position of the lower right pixel refCUPX will be described in more detail with reference to FIGS. 34 and 35.

Figure 34:
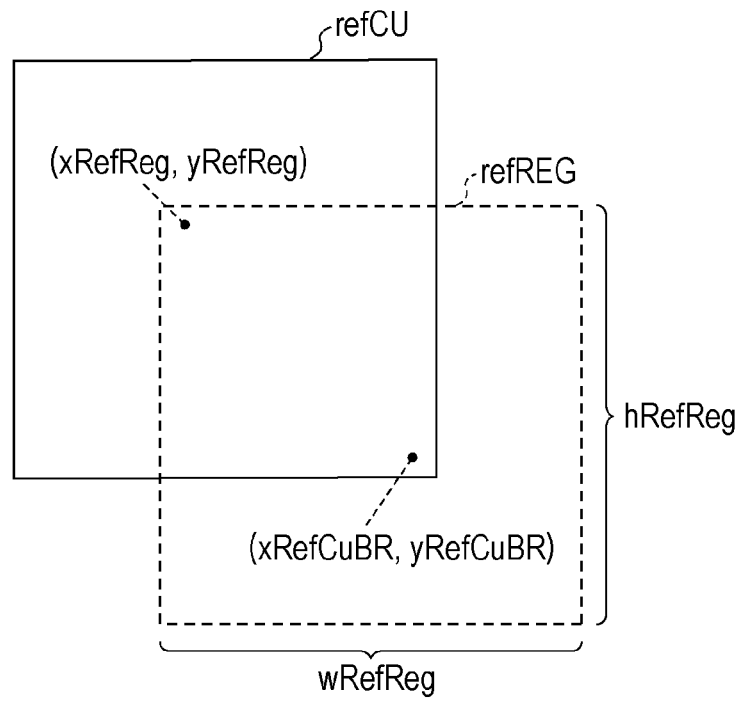
FIG. 34 is a diagram illustrating a method of determining the position of the lower right pixel in more detail.

As illustrated in FIG. 34, the position of the upper left pixel of the reference region refREG is assumed to (xRefReg, yRefReg), and the size of the reference region refREG is assumed to wRefReg×hRefReg. Further, the position of the lower right pixel refCUPX of the reference CU refCU is assumed to (xRefCUBR, yRefCUBR).

A description of the respective determination conditions [A] to [D] is as follows.

[A] Lower Right Pixels in Upper Half of Reference Region

Figure 35:
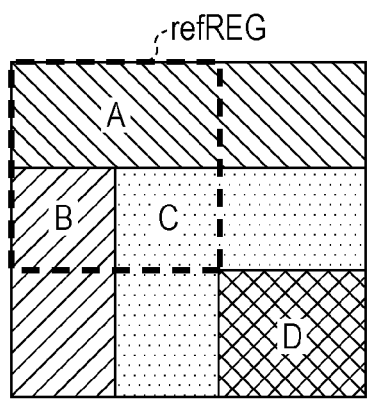
FIG. 35 is a diagram illustrating a method of determining the position of the lower right pixel in more detail.

FIG. 35 is a diagram illustrating a relationship between the position of the lower right pixel refCUPX of reference CU refCU and the determination result.

First, the lower right pixel position determination unit 1482A determines the authenticity of Equation (A1).

$$y\text{RefCuBR} < y\text{RefReg} + (h\text{RefReg} >> 1) \quad (A1)$$

In Equation (A1), it is determined whether or not the position of the lower right pixel refCUPX of the reference CU refCU is in the upper half of the reference region refREG. In other words, when Equation (A1) is true, the position of the lower right pixel refCUPX of the reference CU refCU exists in a section A illustrated in FIG. 35. In addition, labels A to D attached to respective section illustrated in FIG. 35 correspond to determination conditions [A] to [D]. For example, the position satisfying the determination condition "[A] lower right pixel in upper half of reference region" corresponds to the section A.

[B] Lower Right Pixel in Lower Left of Reference Region

When Equation (A1) is false, the lower right pixel position determination unit 1482A also determines the authenticity of Equation (A2).

$$x\text{RefCuBR} < x\text{RefReg} + (w\text{RefReg} >> 1) \quad (A2)$$

In Equation (A2), it is determined whether or not the position of the lower right pixel refCUPX of the reference CU refCU is in the lower left of the reference region refREG. In other words, when Equation (A2) is true, the position of the lower right pixel refCUPX of the reference CU refCU exists in a section B illustrated in FIG. 35.

[C] Lower Right Pixel in Lower Right of Reference Region

When Equation (A2) is false, the lower right pixel position determination unit 1482A also determines the authenticity of Equation (A3).

$$x\text{RefCuBR} < x\text{RefReg} + w\text{RefReg} \| x\text{RefCuBR} < y\text{RefReg} + h\text{RefReg} \quad (A3)$$

In Equation (A3), it is determined whether or not the position of the lower right pixel refCUPX of the reference CU refCU is in the lower right of the reference region refREG. In other words, when Equation (A3) is true, the position of the lower right pixel refCUPX of the reference CU refCU exists in a section C illustrated in FIG. 35.

[D] Reference CU Including Reference Region

When Equation (A3) is false, the lower right pixel position determination unit 1482A also determines the authenticity of Equation (A4).

$$(x\text{RefCuBR} >= x\text{RefReg} + w\text{RefReg} \&\& y\text{RefCuBR} >= y\text{RefReg} + h\text{RefReg}) \quad (A4)$$

In Equation (A4), it is determined whether or not the reference CU refCU includes the reference region refREG. In other words, when Equation (A4) is true, the position of the lower right pixel refCUPX of the reference CU refCU exists in a section D illustrated in FIG. 35.

[Determination by Degree of Overlap of Region in which Reference CU and Reference Region Overlap (Overlapping Region)]

Next, an example will be described in which the overlapping region determination unit 1482B determines the degree of overlap of the overlapping region between the reference CU refCU and the reference region refREG, and the split type determination unit 1482C determines the PU split type of the target CU based on the determination result.

Figure 36:
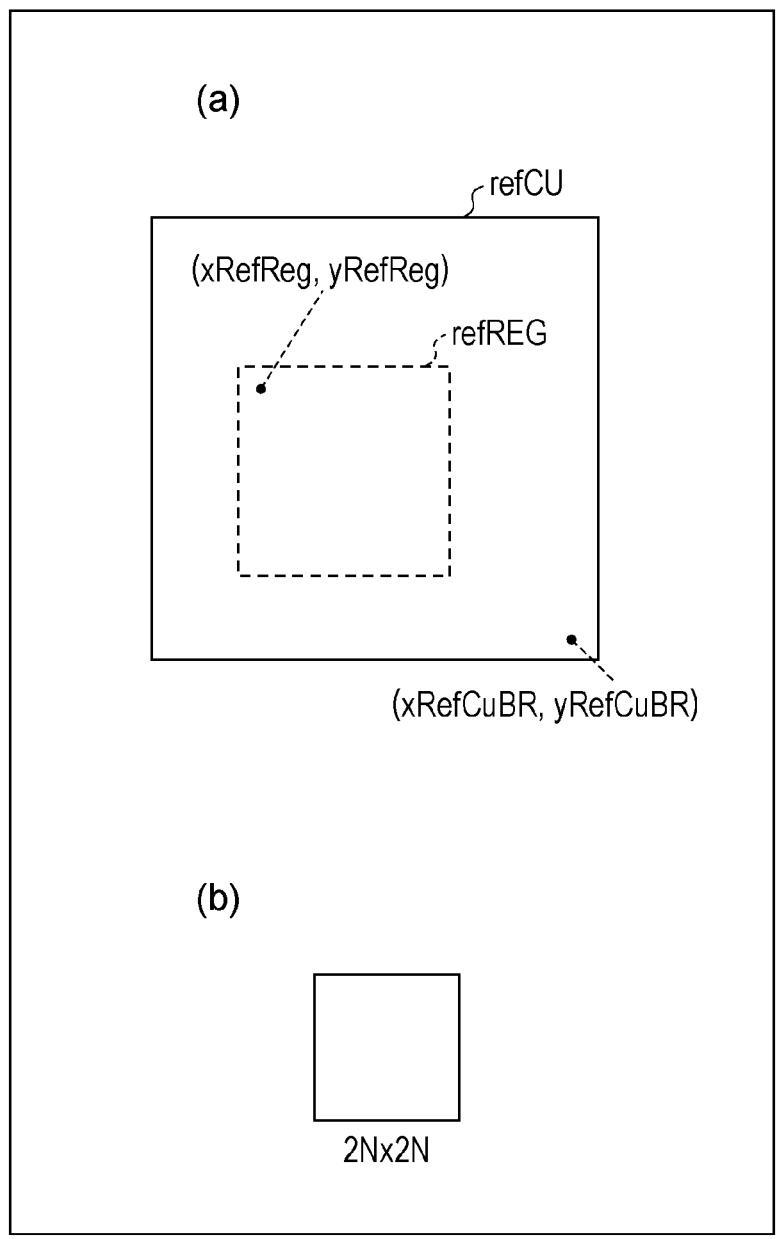
FIG. 36 is a diagram illustrating a method of determining the PU split type, by using a result of determining a degree of overlap of the overlapping region between the reference CU and the reference region.
Figure 37:
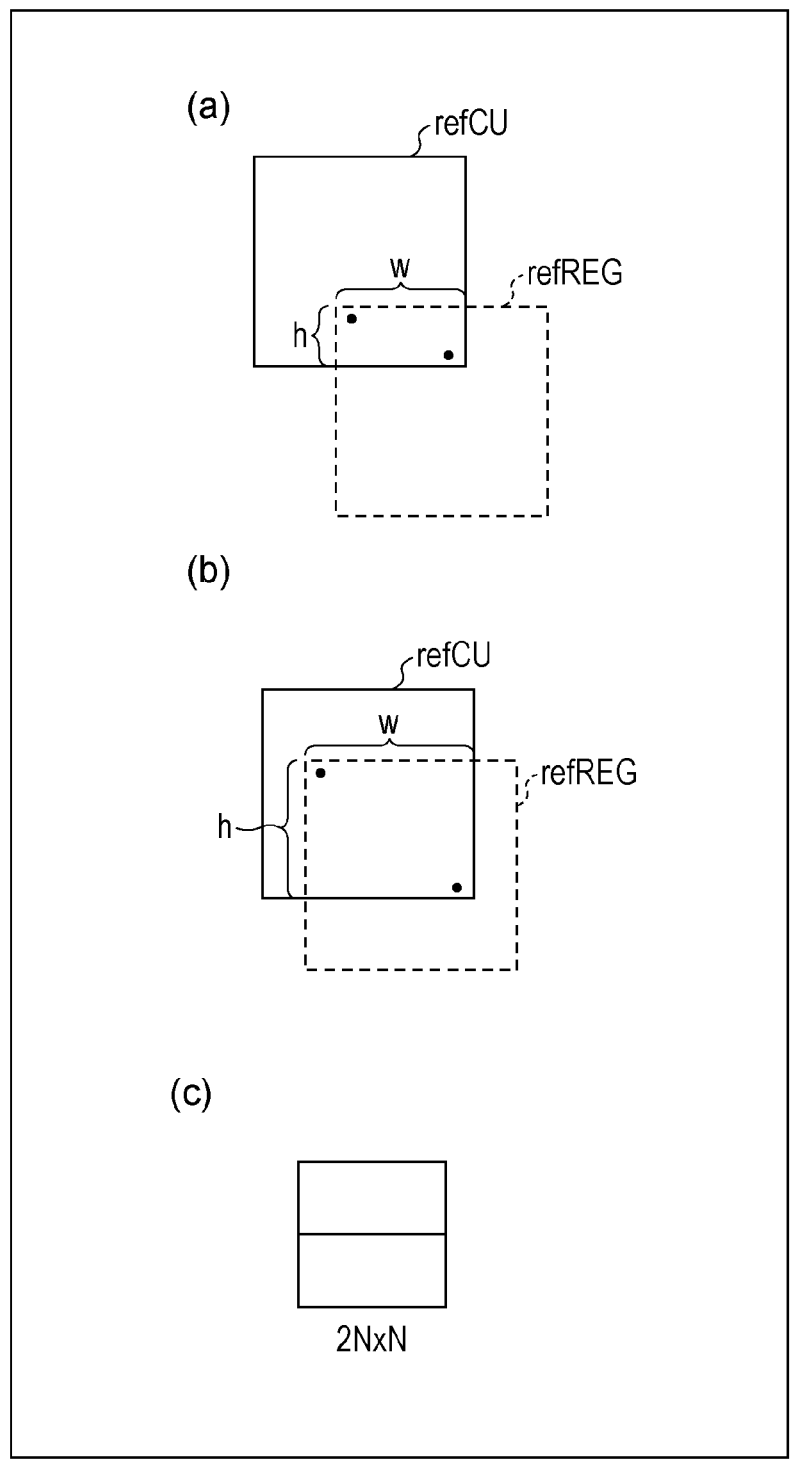
FIG. 37 is a diagram illustrating a method of determining the PU split type, by using a result of determining the degree of overlap of the overlapping region between the reference CU and the reference region.
Figure 38:
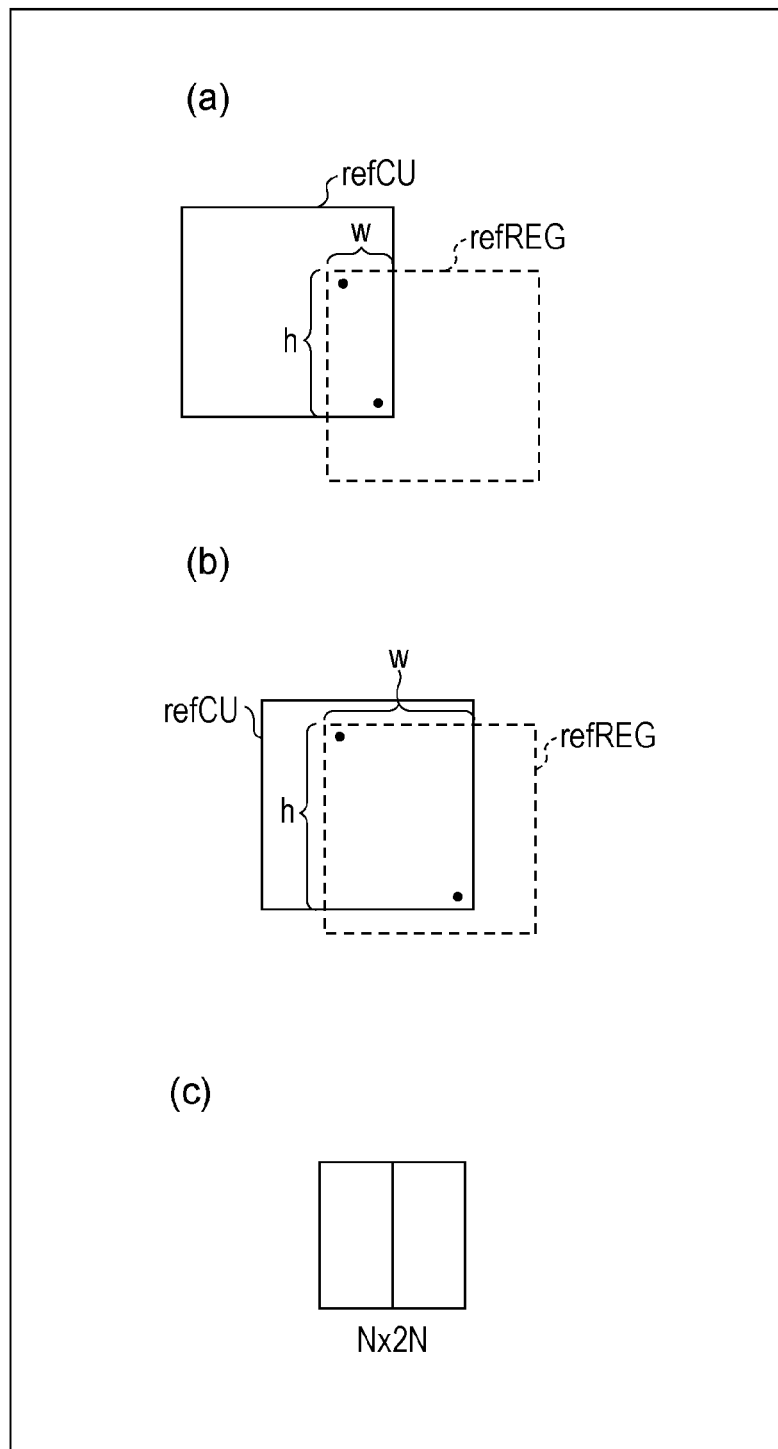
FIG. 38 is a diagram illustrating a method of determining the PU split type, by using a result of determining a degree of overlap of the overlapping region between the reference CU and the reference region.
Figure 39:
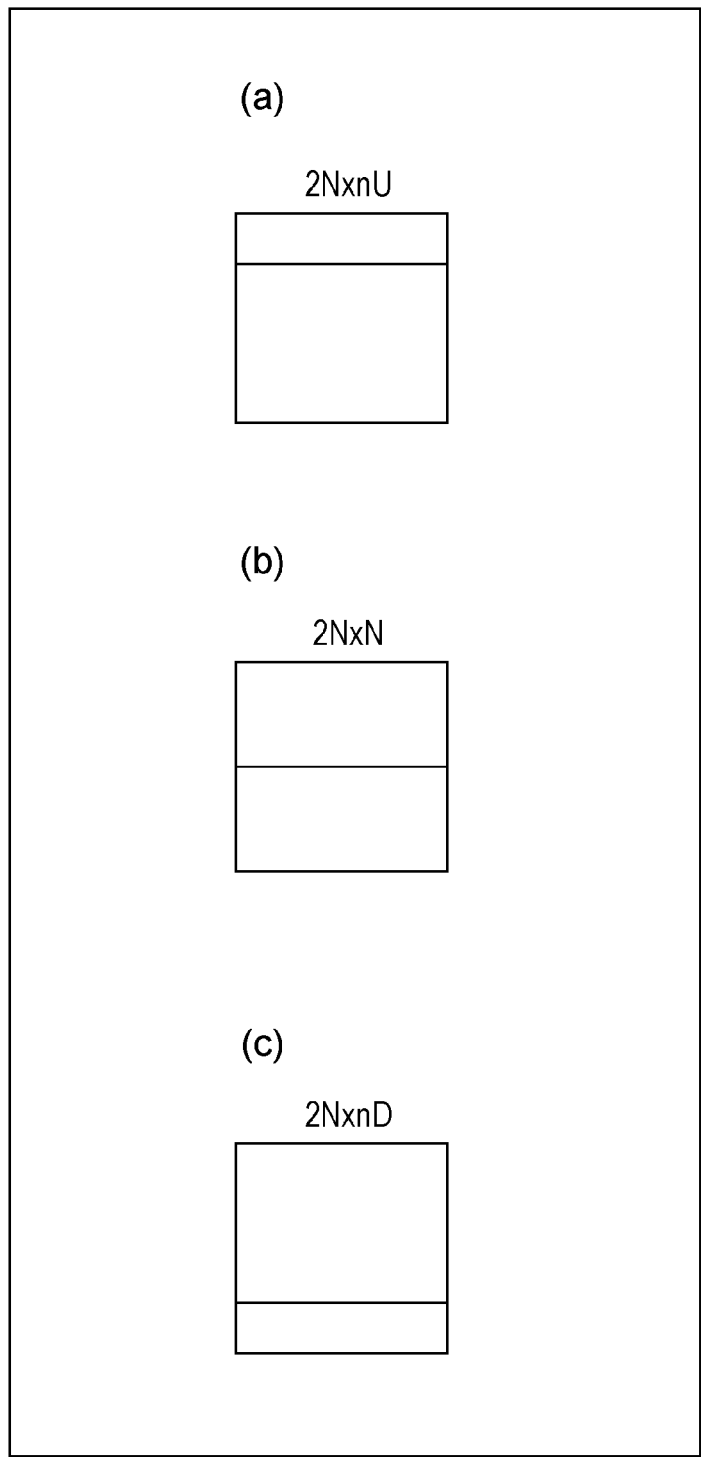
FIG. 39 is a diagram illustrating the determination of the degree of overlap of the overlapping region in more detail.

In addition, even in FIG. 36, similar to FIG. 34, the position of the upper left pixel of the reference region refREG is assumed to (xRefReg, yRefReg). Further, the position of the lower right pixel refCUPX of the reference CU refCU is assumed to (xRefCUBR, yRefCUBR). Further, the position of the lower right pixel of the reference region refREG is assumed to (xRefRegBR, yRefRegBR), and the position of the upper left pixel of the reference CU refCU is assumed to (xRefCU, yRefCU).

[A'] Case where Reference CU refCU Includes Reference Region refREG

As illustrated in FIG. 36(a), when it is determined that the reference CU refCU includes the reference region refREG (when the reference region refREG matches the overlapping region), the split type determination unit 1482C estimates the PU split type of the target CU tgtCU as 2N×2N (refer to FIG. 36(b)). In addition, the determination can be performed by, for example, comparing the position of the upper left pixels of the reference CU refCU and the position of the upper left pixel of the reference region refREG, and comparing the width and the height of the reference CU refCU and the width and the height of the reference region refREG.

Further, the width (wOver) of the overlapping region and the width (hOver) of the overlapping region are calculated, and the determination may be performed by the values. The wOver and hOver can be respectively calculated as follows.

$$w\text{Over} = \text{Min}(x\text{RefRegBR}, x\text{RefCuBR}) - \text{Max}(x\text{RefReg}, x\text{RefCu})$$

$$h\text{Over} = \text{Min}(y\text{RefRegBR}, y\text{RefCuBR}) - \text{Max}(y\text{RefReg}, y\text{RefCu})$$

Here, when the reference CU refCU includes the reference region refREG, the overlapping region and the reference region refREG match, and the following relationship is established.

$$w\text{Over} == w\text{RefReg} \&\& h\text{Over} == h\text{RefReg}$$

In addition, when there is a specific restriction in the positional relationship between the reference CU refCU and the reference region refREG, the values of wOver and hOver can be calculated by more simplified calculation. For example, when the reference CU refCU includes the upper left pixel of the reference region refREG, the upper left pixels of the reference CU refCU are always located in the upper left than the upper left pixel of the reference region refREG. Accordingly, in such a case, the values of wOver and hOver can be calculated by the following equations.

wOver=Min(xRefRegBR,xRefCuBR)−xRefReg hOver=Min(yRefRegBR,yRefCuBR)−yRefReg

[B'] Case where Width of Overlapping Region is Height or More

In a case which is not the case [A'] and where it is determined that the width of the overlapping region between the reference CU refCU and the reference region refREG is the height of the overlapping region or more, as illustrated in FIG. 37(a) or (b), the split type determination unit 1482C estimates the PU split type of the target CU tgtCU is 2N×N (refer to FIG. 37(c)). In addition, in FIGS. 37(a) and (b), the wOver is abbreviated as "w", and the hOver is abbreviated as "h", respectively.

Specifically, the overlapping region determination unit 1482B determines the authenticity of Equation (B1).

wOver>=hOver                                                                        (B1)

If Equation (B1) is true, it is determined that the width of the overlapping region is the height or more.

[C'] Case where Width of Overlapping Region is Less than Height

In a case which is other cases (which is not the cases [A'] and [B']) and where it is determined that the width of the overlapping region between the reference CU refCU and the reference region refREG is less than the height of the overlapping region, as illustrated in FIG. 38(a) or (b), the split type determination unit 1482C estimates the PU split type of the target CU tgtCU is N×2N (refer to FIG. 38(c)).

When Equation (B1) is false, the overlapping region determination unit 1482B may determine that the width of the overlapping region is less than the height.

In addition, in the above description, the position (xRefReg, yRefReg) of the upper left pixel of the reference region refREG and the position (xRefCUBR, yRefCUBR) of the lower right pixel refCUPX of the reference CU refCU are assumed as targets of comparison of determination. However, without being limited thereto, the above determination is applicable to the case of using the reference CU corresponding to the pixel position other than the upper left pixel of the reference region refREG.

(Operation and Effect)

As described above, the hierarchical moving image decoding device 1 is a hierarchical moving image decoding device 1 which decodes hierarchically encoded data obtained by hierarchically encoding image information regarding images of different qualities for respective layers, and restores an image of a target layer which is a decoding target, and is configured to include a reference CU setting unit 1481 that sets a reference CU for which a degree of overlap with the reference region is to be determined, based on a CU having an overlapping part with the reference region corresponding to the target CU of the reference layer, in the target CU of the target layer; and a PU split estimation unit 1482 that determines a PU split type for the target CU, according to the degree of overlap between the reference region and the reference CU.

Accordingly, there is an effect capable of reducing the processing amount of the process of deriving the PU split type.

(Modification of PU Split Type Derivation Unit)

A preferred modification of the PU split type derivation unit 148 will be described later.

(Determination Using PU Split Type of Reference CU)

The split type determination unit 1482C may be configured to perform the determination using the PU split type of the reference CU, according to the determination by the lower right pixel position determination unit 1482A.

[Case of Omitting Exact Calculation]

Specifically, when it is determined that a situation corresponds to [A] to [C] which are described in the "case using a single reference CU", the operations as described above. In other words, when it is determined that the lower right pixels refCUPX of the reference CU refCU is included in the reference region refREG, the split type determination unit 1482C determines the PU split type of the target CU without using the PU split type of the reference CU.

Meanwhile, when it is determined that a situation corresponds to the [D], the split type determination unit 1482C determines the PU split type of the target CU, by using the PU split type of the reference CU as follows. In other words,

[D1] when the PU Split Type of the Reference CU is 2N×2N:

The split type determination unit 1482C determines the PU split type of the target CU as the 2N×2N.

[D2] when the PU Split Type of the Reference CU is 2N×N, 2N×nU, or 2N×nD:

The split type determination unit 1482C determines the PU split type of the target CU as the 2N×N.

[D3] when the PU Split Type of the Reference CU is N×2N, nL×2N, or nR×2N:

The split type determination unit 1482C determines the PU split type of the target CU as the N×2N.

According to the above configuration, when there is no partition boundary (PU boundary) in the reference CU, the 2N×2N which is the PU split type without the partition boundary is determined as the PU split type of the target CU (case [D1]).

Further, when there is a possibility that the Pu boundary exists in the reference CU (case of [D2] or [D3]), the PU split type of the target CU is determined by determining only a boundary in any of the vertical direction or the horizontal direction, while the exact calculation of the position of the PU boundary of the reference CU is omitted.

In addition, in the case of "determination by the degree of overlap of the region in which the reference CU and the reference region overlap", the determination of the [D1] to [D3] may be performed in the [A'] case.

[Case of Performing Exact Calculation]

The configuration of the case of omitting the exact calculation is as described above, but a split type determination unit 1482C exactly determines the PU split type of the target CU by exactly calculating the position of the PU boundary of the reference CU. Hereinafter, the configuration example of such a split type determination unit 1482C will be described.

When it is determined as the [A] to [C] which are described in the "case using a single reference CU", operations are as described above.

Meanwhile, when it is determined as the [D], the split type determination unit 1482C determines the PU split type of the target CU by using the PU split type of the reference CU as follows. In other words,

[D1] Case where the PU Split Type of the Reference CU is the 2N×2N:

the split type determination unit 1482C determines the PU split type of the target CU as 2N×2N.

[D2] Case where the PU Split Type of the Reference CU is 2N×N or 2N×nU or 2N×nD:

As illustrated in FIGS. 39(a), (b) and (c), when the PU split type of the reference CU is 2N×N, 2N×nU, or 2N×nD, the split type determination unit 1482C exactly calculates the position of the PU boundary of the reference CU by the following calculation (in other words, the position of the horizontal PU boundary).

Here, as illustrated in FIG. 40, the position of the upper left pixel of the reference CU refCU is assumed to (xRefCu, yRefCu), and the height and the width of the reference CU refCU are respectively assumed to hRefCu, and wRefCu. Further, the position which is the reference of the PU boundary of the reference CU refCU is assumed to the position (xRefCu, yPub) in which the left side of the reference CU and the PU boundary intersect (yPub is the position of the vertical PU boundary). Further, the position of the upper left pixel of the reference region refREG is assumed to (xRefReg, yRefReg), and the height and the width of the reference region are respectively set to hRefReg, and wRefReg.

[1] The split type determination unit 1482C derives the position yPub in the y direction of the horizontal PU boundary as follows.

$$yPub = yRefCu + (hRefCu * bPos)$$

$$bPos = 0.25 \text{(case of } 2N \times nU)$$

$$0.5 \text{(case of } 2N \times N)$$

$$0.75 \text{(case of } 2N \times nD)$$

[2] The split type determination unit 1482C determines the PU split type according to the position in the reference region refREG of yPub as follows. Hereinafter, it is assumed that d=yPub−yRefReg. In other words, here, the split type determination unit 1482C determines the PU split type according to the position of the reference region refREG of the horizontal PU boundary of the reference CU refCU.

[2-1] Case where d≤0 or d≥hRefReg

This is a case where the reference region refREG is included in any partition of the reference CU refCU. The split type determination unit 1482C determines the PU split type as 2N×2N.

[2-2] Case where 0<d<0.25*hRefReg

This is a case where the PU boundary of the reference CU refCU crosses the position of the upper ¼ or more of the reference region refREG. The split type determination unit 1482C determines the PU split type as 2N×nU.

[2-3] Case where 0.25*hRefReg≤d<0.75*hRefReg

This is a case where the PU boundary of the reference CU refCU crosses the vicinity of the reference region refREG (position of the upper ¼ to the lower ¼). The split type determination unit 1482C determines the PU split type as 2N×N.

[2-4] Case where 0.75*hRefReg≤d<hRefReg

This is a case where the PU boundary of the reference CU refCU crosses the position of the lower ¼ or more of the reference region refREG. The split type determination unit 1482C determines the PU split type as 2N×nD.

[D3] Case where the PU split type of the reference CU is N×2N, nL×2N, or nR×2N:

The split type determination unit 1482C exactly calculates the position of the PU boundary of the reference CU (in other words, position of vertical PU boundary). The calculation method can use the application of the calculation method described by using FIG. 40 to the vertical PU boundary, and thus the detailed description will be omitted.

(Determination when Resolution Ratio is Small)

When the ratio of the resolution of the target layer to the resolution of the reference layer is a predetermined value or less (for example, when the ratio is 1.5 or less), the split type determination unit 1482C may determine the PU split type according to the magnitude relationship between the size of the reference CU and the size of the target CU.

For example, when the size of the reference CU is greater than the size of the target CU, the split type determination unit 1482C may determine the PU split type as 2N×2N.

Further, for example, when the size of the reference CU is equal to or greater than the size of the target CU, the split type determination unit 1482C may use the PU split type of the reference CU as the PU split type.

According to the above configuration, the determination process can be simplified.

(Restriction According to Block Size)

It is preferable to suppress the generation of a PU of a small size through PU splitting. Accordingly, the split type determination unit 1482C may also be configured to always use 2N×2N as the PU split type, in the CU of a predetermined size (for example, an 8×8 CU). In other words, the split type determination unit 1482C may prohibit splitting in the CU of a predetermined size.

According to the above configuration, it is possible to reduce the rate of the inter-CU of the PU of a small size which is a bottleneck of the process, thereby reducing an average processing amount.

In addition, the split type determination unit 1482C may derive only symmetrical partition as the PU split type, in the CU of a predetermined size. Further, the split type determination unit 1482C may be restricted to derive N×N as the PU split pattern.

(Restriction of Asymmetric Partition)

In a case of determining the PU split type from the reference layer, the split type determination unit 1482C may be configured not to derive an asymmetric partition as the PU split type. For example, in a case of estimating the PU split type of the target CU from the PU split type of the reference CU, the split type determination unit 1482C may be configured to derive a symmetric partition according to the directivity of a boundary as the PU split type.

In other words, the determination using the PU split type of the reference CU described above, without being limited to the [D] case, is applicable to the [A] to [C]. Further, when the determination using the PU split type of the reference CU described above is also applied to [A] to [C], the split type determination unit 1482C may derive the symmetric partition as the PU split type.

According to the above configuration, since the determination is made without determining the exact position in the vertical or horizontal boundary, the process can be simplified.

(Selection and Setting of Reference CU)

In the above description, the description has been given of the configuration in which the reference CU setting unit 1481 sets the CU including the upper left pixel of the target CU as the reference CU, among a plurality of CUs with an overlapping part with the reference region refREG.

However, the present invention is not limited to the above configuration. More generally, the reference CU setting unit 1481 may be configured to set a single reference CU, according to a predetermined reference, among a plurality of CUs having an overlapping part with the reference region refREG.

For example, the reference CU setting unit 1481 may set the CU on the reference layer including a pixel corresponding to a pixel located in a predetermined position included in the target CU, among the plurality of CUs, as the reference CU. As a specific example, the reference CU setting unit 1481 may set the CU on the reference layer including a pixel corresponding to a center pixel included in the target CU, as the reference CU.

Further, in another specific example, the reference CU setting unit 1481 may use a CU having a maximum area, among a plurality of CUs having an overlapping part with the reference region refREG, as the reference CU.

According to the above configuration, since there is a high possibility that the CU on the reference layer including the pixel corresponding to the center pixel included in the target CU, and the CU having a maximum area, among the plurality of CUs have the same PU split type as that of the target CU, it is possible to improve the estimation accuracy.

Further, the reference CU setting unit 1481 may generate a virtual single CU from the plurality of CUs having the overlapping part with the reference region refREG. Specifically, the reference CU setting unit 1481 extracts a representative property of the plurality of CUs from the CUs in the vicinity of the reference region, and generates a virtual single CU based on the extracted property so as to use the generated virtual signal CU as the reference coding unit. For example, the reference CU setting unit 1481 can generate a virtual single CU based on the sizes and shapes of the plurality of CUs or the combination of these pieces of information. In addition, the virtual single coding unit is generated as a region that overlaps the reference region.

Further, the reference CU setting unit 1481 may use the plurality of CUs having the overlapping part with the reference region refREG as the reference CU list.

(Supplement of PU Split Estimation Unit)

In the description of the PU split estimation unit 1482 of FIG. 27, it has been described that the PU split estimation unit 1482 is configured to include both the lower right pixel position determination unit 1482A and the overlapping region determination unit 1482B, but in a configuration of always using one determination unit, the PU split estimation unit 1482 may be configured to include any of the lower right pixel position determination unit 1482A and the overlapping region determination unit 1482B.

(Other Modifications)

Hereinafter, the other modifications will be described.

(Configuration Example of Syntax Table)

Hereinafter, a configuration example of syntax for encoding a base skip CU will be described. The overview of the configuration is as follows. First, a base mode flag (base_mode_flag) regarding whether or not information of reference layer is used is encoded. Further, when the base mode flag is "true", the estimation the PU split type by the PU split type derivation unit 148 described above is used for derivation of PartMode.

In addition, estimation other than the PU split type (for example, pred_mode) may be performed as a method of constituting a syntax configuration.

[Configuration of Encoding base_mode_flag in coding_unit]

The configuration example of encoding the base_mode_flag in a coding_unit will be described with reference to FIGS. 41 and 42.

FIG. 42 illustrates the configuration example of a syntax in a case of encoding the base_mode_flag in a coding_unit.

As illustrated in FIG. 42, in the coding_unit, the base_mode_flag may be encoded immediately after the skip_flag (SYN11). In addition, hereinafter, the omission and derivation of a prediction mode pred_mode, and a PU split type part_mode will be studied as technical matters related to the encoding of the base_mode_flag will be considered together.

If more specific description will be given with reference to FIG. 42, in the configuration of the encoded data, the base mode flag (base_mode_flag) is disposed after the skip flag (skip_flag) and before the prediction mode flag (pred_mode_flag).

Further, when the base mode flag (base_mode_flag) is "true", the prediction mode flag (pred_mode_flag) and the split type (part_mode) are not disposed (respectively, corresponding to SYN12 and SYN13).

According to the syntax configuration example illustrated in FIG. 42, the decoding of the base skip CU (decoding regarding the base_mode_flag) is performed as follows.

(1) The hierarchical moving image decoding device 1 decodes the base_mode_flag.

(2) When the base_mode_flag is "true", the hierarchical moving image decoding device 1 derives the PredMode and the PartMode by estimation (infer).

(3) In contrast, when the base_mode_flag is "false", the hierarchical moving image decoding device 1 decodes the syntax element values of the pred_mode_flag and the part_mode by encoded data, derives the PredMode and the PartMode based on the decoded syntax value.

If the above decoding process is represented in a tabular form, it is as illustrated in FIG. 41. FIG. 41 is a table illustrating a relationship between the syntax element value and the CU type. In FIG. 41, "-" indicates a syntax element which may not be decoded in the CU type.

According to the above syntax configuration, as illustrated in FIG. 41, since the pred_mode_flag and the part_mode are not decoded in the case of the base skip CU, a coding efficiency is improved.

(Derivation of Prediction Mode (PredMode))

A derivation method of the prediction mode (PredMode) will be described later.

[Derivation Method 1]

When a base layer is an I slice, the hierarchical moving image decoding device 1 may always use the intra-prediction (MODE_INTRA) in the target CU.

Meanwhile, when the base layer is not the I slice, the hierarchical moving image decoding device 1 may always use the PredMode of the reference CU. In addition, in the reference CU, it is possible to use, for example, the CU on the reference layer including the upper left pixels of the target CU.

[Derivation Method 2]

When the base layer is the I slice, the hierarchical moving image decoding device 1 may always use the intra-prediction (MODE_INTRA) in the target CU.

Meanwhile, when the base layer is not the I slice, the hierarchical moving image decoding device 1 uses the inter-prediction (MODE_INTER).

In addition, in the derivation methods 1 and 2, the condition of "the case where the base layer is not the I slice" may be the condition of "the case where the base layer is an instantaneous decoding refresh (IDR)". The IDR is the initialization of a reference picture, and an IDR picture is a picture in which a reference is reset. In other words, the picture after the IDR picture can be correctly decoded, without referring to information (slice) before the IDR picture.

(Derivation of merge_flag)

A configuration example in which the merge_flag is encoded according to the determination of the base_mode_flag in the prediction unit will be described with reference to FIG. 43.

FIG. 43 illustrates a configuration example of a syntax in the case of encoding the merge_flag after performing the determination of the base_mode_flag in the prediction_unit.

As illustrated in FIG. 43, the base_mode_flag may be determined immediately before the mereg_flag in the prediction unit (SYN21). Further, when the base_mode_flag is "true", the merge_flag may not be disposed.

In other words, in each PU included in the base skip CU in which the base_mode_flag is "true", a configuration always using the merge mode (merge_flag=true) may be used.

According to the above configuration, three flags of a pred_mode, a part_mode, and a merge_flag can be omitted. Thus, it is possible to reduce the code amount of the three flags, and thus the encoding efficiency is improved.

(Flow of CU Decoding Process in Hierarchical Moving Image Decoding Device)

Figure 44:
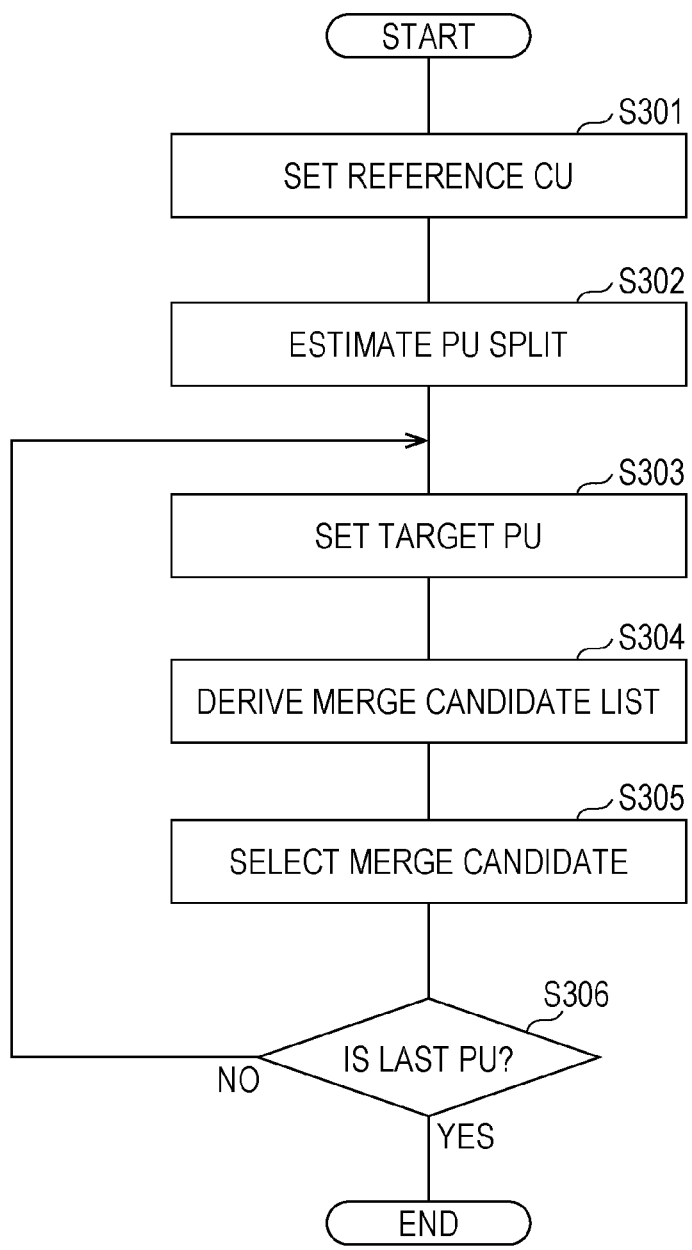
FIG. 44 is a flowchart illustrating an example of a flow of a base skip CU decoding process in the hierarchical moving image decoding device.
Figure 45:
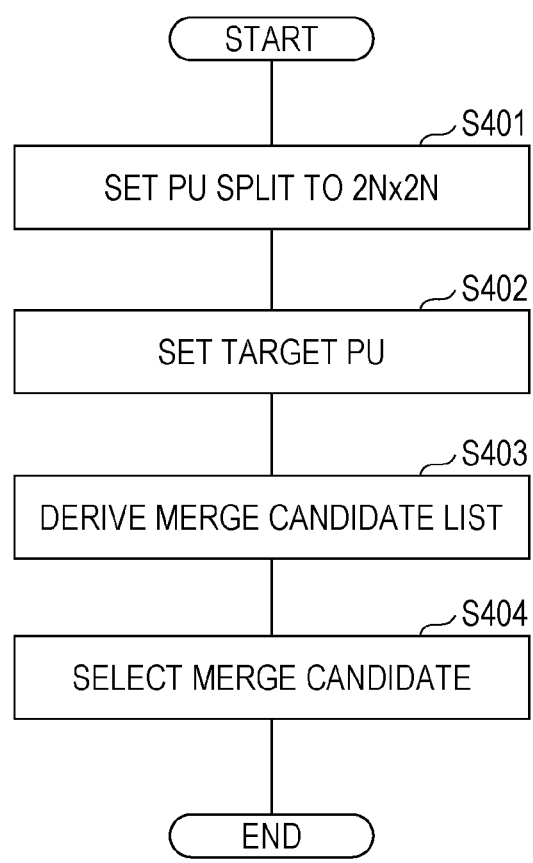
FIG. 45 is a flowchart illustrating an example of a flow of a skip CU decoding process in the hierarchical moving image decoding device.
Figure 46:
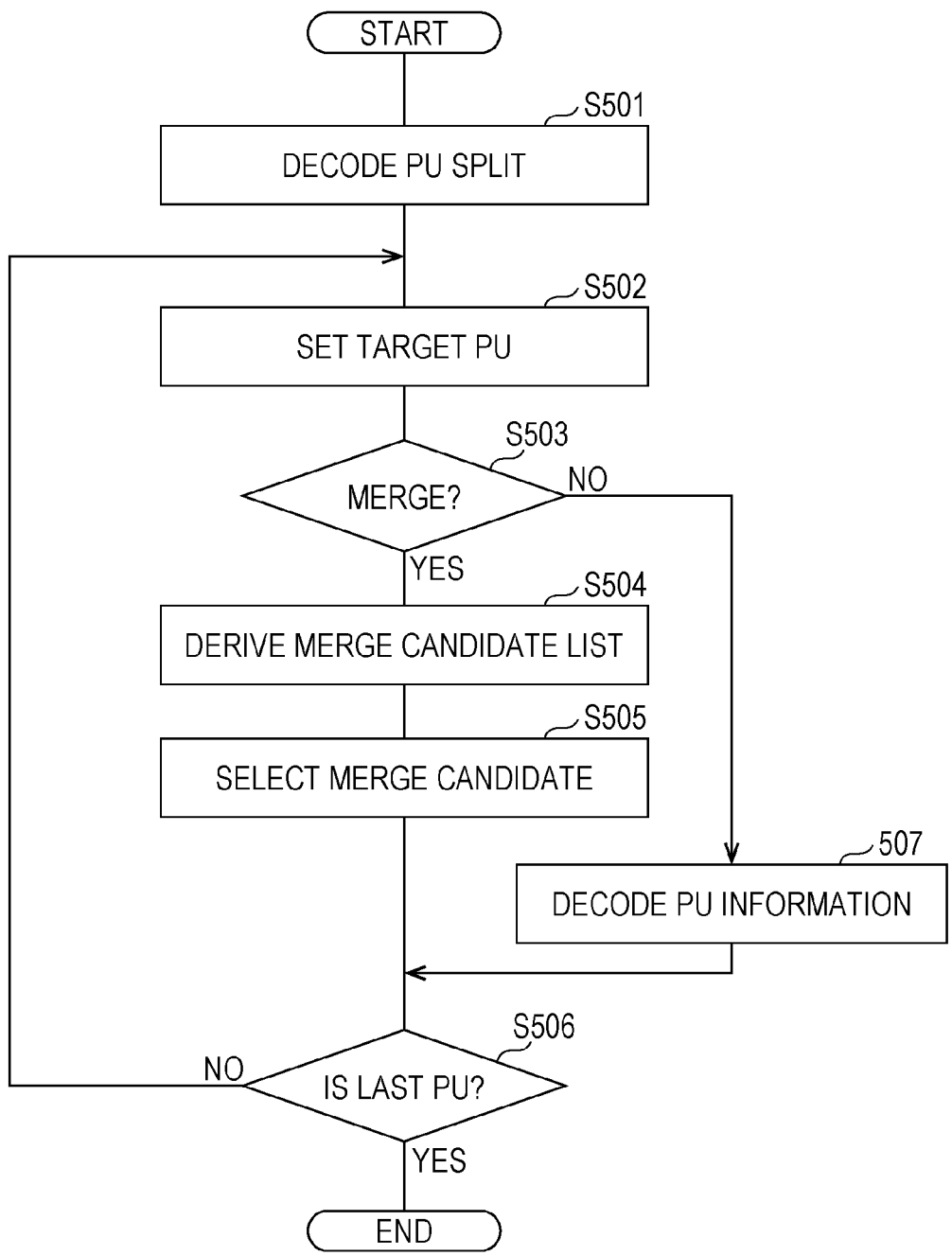
FIG. 46 is a flowchart illustrating an example of a flow of an inter-CU decoding process in the hierarchical moving image decoding device.

An example of a flow of a CU decoding process relating to the prediction parameter in the hierarchical moving image decoding device 1 will be described with reference to FIGS. 44, 45, and 46. FIGS. 44, 45, and 46 are flowcharts illustrating examples of the flows of the decoding processes relating to the prediction parameters of the base skip CU, the skip CU, and the inter-CU.

First, an example of a flow of a base skip CU decoding process in the hierarchical moving image decoding device 1 will be described with reference to FIG. 44.

When the target CU is the base skip CU, the reference CU setting unit 1481 sets the reference CU corresponding to the target CU (S301).

Subsequently, the PU split estimation unit 1482 estimates the PU split type of the target CU by the inter-layer prediction (S302). Specifically, the estimation of the PU split type is performed by the split type determination unit 1482C, based on the determination result by the lower right pixel position determination unit 1482A and the determination result by the overlapping region determination unit 1482B.

Subsequently, if the PU is split and the target PU is set according to the estimated PU split type (S303), the merge candidate derivation unit 146 derives a merge candidate list for the target PU (S304). In addition, the merge candidate derivation unit 146 illustratively derives an inter-layer merge candidate in the derivation of the merge candidate list. However, it is possible to arbitrarily set a degree of the inter-layer prediction. For example, in the base skip CU, only the PU split type may be the target of the inter-layer prediction. In other words, in S304, a configuration of deriving only the intra-layer merge candidate may be employed. Further, in the base skip CU, instead of processes of S301 "setting of reference CU" and S302 "estimation of PU split", the process of S401 "set PU split as 2N×2N" to be described later may be performed. Further, estimation of PU split may be performed in the CU other than the base skip CU.

Subsequently, the merge information restoration unit 147 selects the merge candidate from the derived merge candidate list (S305).

Here, if the target PU is not the last PU in the process order of the target CU (NO in S306), the processes of S303 to S305 are repeatedly performed.

Then, if the process is completed until the last PU in the process order of the target CU (YES in S306), the base skip CU decoding process is ended.

Next, an example of a flow of a skip CU decoding process in the hierarchical moving image decoding device 1 will be described with reference to FIG. 45.

When the target CU is the skip CU, in the prediction parameter restoration unit 14, the PU split type is set to 2N×2N (in other words, no PU split) (S401), and the target PU is set (S402).

Subsequently, the merge candidate list derivation unit 146 derives a merge candidate list for the target PU (S403). Further, the merge information restoration unit 147 selects a merge candidate from the derived merge candidate list (S404), and thereafter, the skip CU decoding process is ended.

Next, an example of a flow of an inter-CU decoding process in the hierarchical moving image decoding device 1 will be described with reference to FIG. 46.

When the target CU is the inter-CU, the PU split type is decoded from the encoded data (S501). Further, a partition of the target CU to the PU is set according to the decoded PU split type, and the target PU is set (S502).

Subsequently, it is determined whether or not the target PU is the merge PU (S503). When the target PU is the merge PU (YES in S503), the merge candidate derivation unit 146 derives the merge candidate list (S504), and the merge information restoration unit 147 selects the merge candidate from the merge candidate list (S505).

Meanwhile, when the target PU is not the merge PU (NO in S503), the PU information is decoded from the encoding parameter (S507).

After the process of S505 or S507, if the target PU is the last PU on the process order of the target CU (No in S506), the process of S502 to S507 is repeatedly performed.

Thereafter, if the process is completed until the last PU on the process order of the target CU (YES in S506), the inter-CU decoding process is ended.

[Hierarchical Moving Image Encoding Device]

Hereinafter, the configuration of the hierarchical moving image encoding device 2 according to the present embodiment will be described with reference to FIGS. 22 to 24.

(Configuration of Hierarchical Moving Image Encoding Device)

Figure 22:
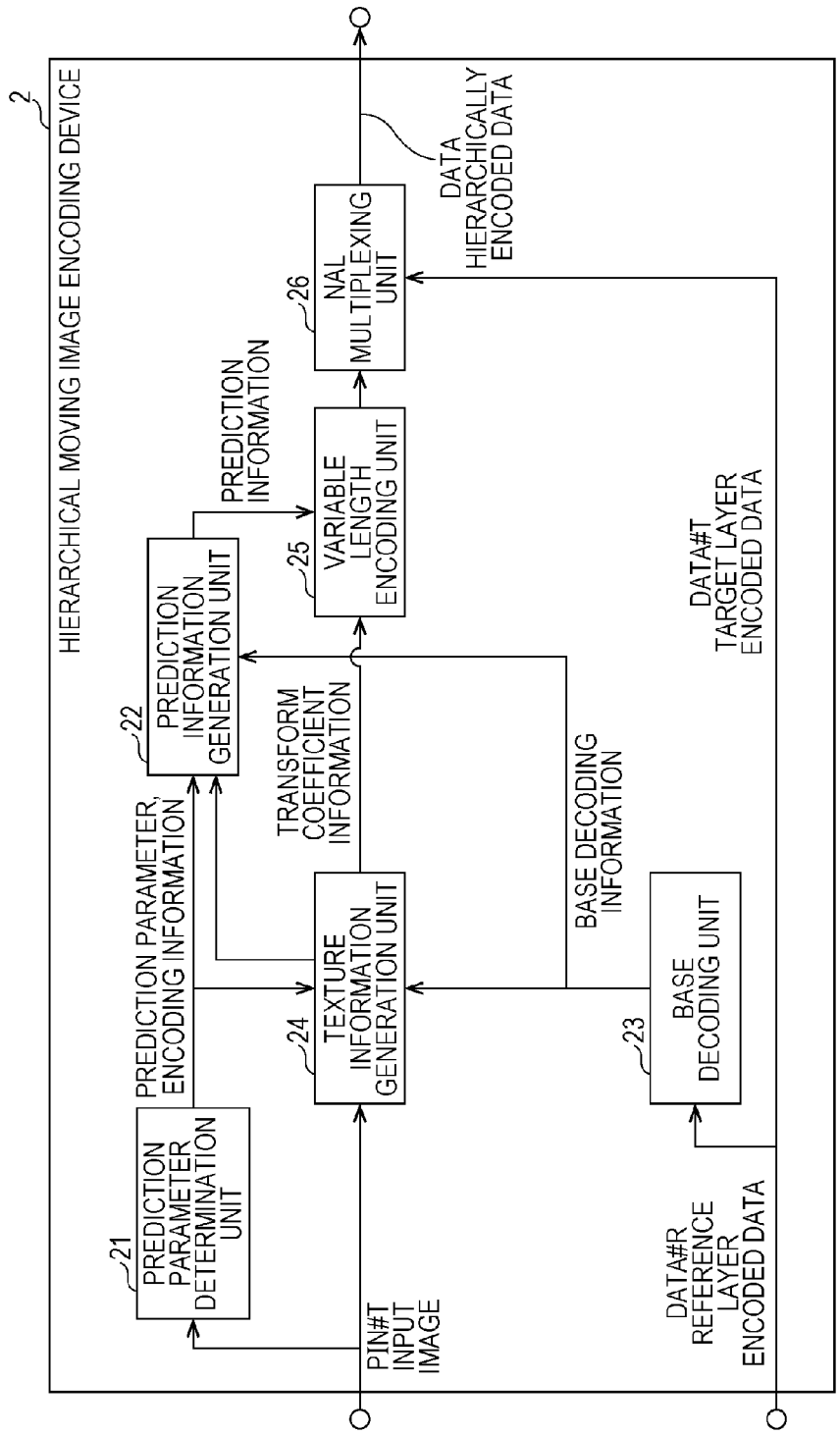
FIG. 22 is a functional block diagram illustrating a schematic configuration of a hierarchical moving image encoding device according to an embodiment of the present invention.

The description of the schematic configuration of the hierarchical moving image encoding device 2 by using FIG. 22 is as follows. FIG. 22 is a functional block diagram illustrating a schematic configuration of the hierarchical moving image encoding device 2. The hierarchical moving image encoding device 2 generates the hierarchically encoded data DATA of the target layer, by encoding the input image PIN#T of the target layer while referring to the reference layer encoded data DATA#R. In addition, it is assumed that the reference layer encoded data DATA#R has been encoded by the hierarchical moving image encoding device corresponding to the reference layer.

As illustrated in FIG. 22, the hierarchical moving image encoding device 2 includes a prediction parameter determination unit 21, a prediction information generation unit 22, a base decoding unit 23, a texture information generation unit 24, a variable length encoding unit 25, and an NAL multiplexing unit 26.

The prediction parameter determination unit 21 determines the prediction parameter and the other encoding setting which are used for prediction of the predicted image, based on the input image PIN#T.

The prediction parameter determination unit 21 performs the setting of encoding as well as the prediction parameter as follows.

First, the prediction parameter determination unit 21 generates the CU image for the target CU, by sequentially splitting the input image PIN#T into the slice unit, the tree block unit, and the CU unit.

Further, the prediction parameter determination unit 21 generates the encoding information (referred to as header information), based on the result of the split process. The encoding information includes (1) tree block information which is information regarding the size and shape of the tree block belonging to the target slice and the position of the tree block in the target slice, and (2) CU information which is information regarding the size and shape of the CU belonging to each tree block and the position of the CU in the target tree block.

Further, the prediction parameter determination unit 21 derives the prediction type of the target CU, the split information of the target CU to the PU, and the prediction parameter, by referring to the CU image, the tree block information, and the CU information (when the target CU is the intra-CU, the intra-prediction mode; when the target CU is the inter-CU, the motion compensation parameter of each PU).

The prediction parameter determination unit 21 calculates the cost for a combination of all of (1) the prediction type of the target CU, (2) the available splitting pattern of the target CU to each PU, and (3) the prediction mode which can be assigned to each PU (in the case of the intra-CU, the intra-prediction mode; in the case of the inter-CU, the motion compensation parameter), and determines the prediction type, the split pattern, and the prediction mode of the lowest cost.

The prediction parameter determination unit 21 supplies the encoding information and the prediction parameter to the prediction information generation unit 22 and the texture information generation unit 24. In addition, although not shown for convenience of explanation, the setting of the encoding which is determined in the prediction parameter determination unit 21 can be referred in each unit of the hierarchical moving image encoding device 2.

The prediction information generation unit 22 generates prediction information including a syntax value regarding the prediction parameter, based on the prediction parameter supplied from the prediction parameter determination unit 21 and the reference layer encoded data DATA#R. The prediction information generation unit 22 supplies the generated prediction information to the variable length encoding unit 25. In addition, when the prediction parameter is restored, the prediction information generation unit 22 can refer to the motion information stored in the frame memory 244 (described later) included in the texture information generation 24.

Since the base decoding unit 23 is the same as the base decoding unit 16 of the hierarchical moving image decoding device 1, here, the description thereof will be omitted.

The texture information generation unit 24 generates the transform coefficient information including the transform coefficient by performing orthogonal transform and quantization on the prediction residual obtained by subtracting the predicted image from the input image PIN#T. The texture information generation unit 24 supplies the generated transform coefficient information to the variable length encoding unit 25. In addition, information regarding the decoded image which is restored is stored in the frame memory 244 (described later) included in the inside of the texture information generation 24.

The variable length encoding unit 25 generates target layer encoded data DATA#T by variable length encoding the prediction information supplied from the prediction information generation unit 22 and the transform coefficient information supplied from the texture information generation unit 24. The variable length encoding unit 25 supplies the generated target layer encoded data DATA#T to the NAL multiplexing unit 26.

The NAL multiplexing unit 26 generates hierarchical moving image encoded data DATA that is NAL multiplexed by storing the target layer encoded data DATA#T supplied from the variable length encoding unit 25 and the reference layer encoded data DATA#R in the NAL unit, and outputs it to the outside.

Hereinafter, the prediction information generation unit 22 and the texture information generation unit 24 are respectively described in detail.

(Prediction Information Generation Unit)

A detailed configuration of the prediction information generation unit 22 will be described by using FIG. 23. FIG. 23 is a functional block diagram illustrating the configuration of the prediction information generation unit 22.

Figure 23:
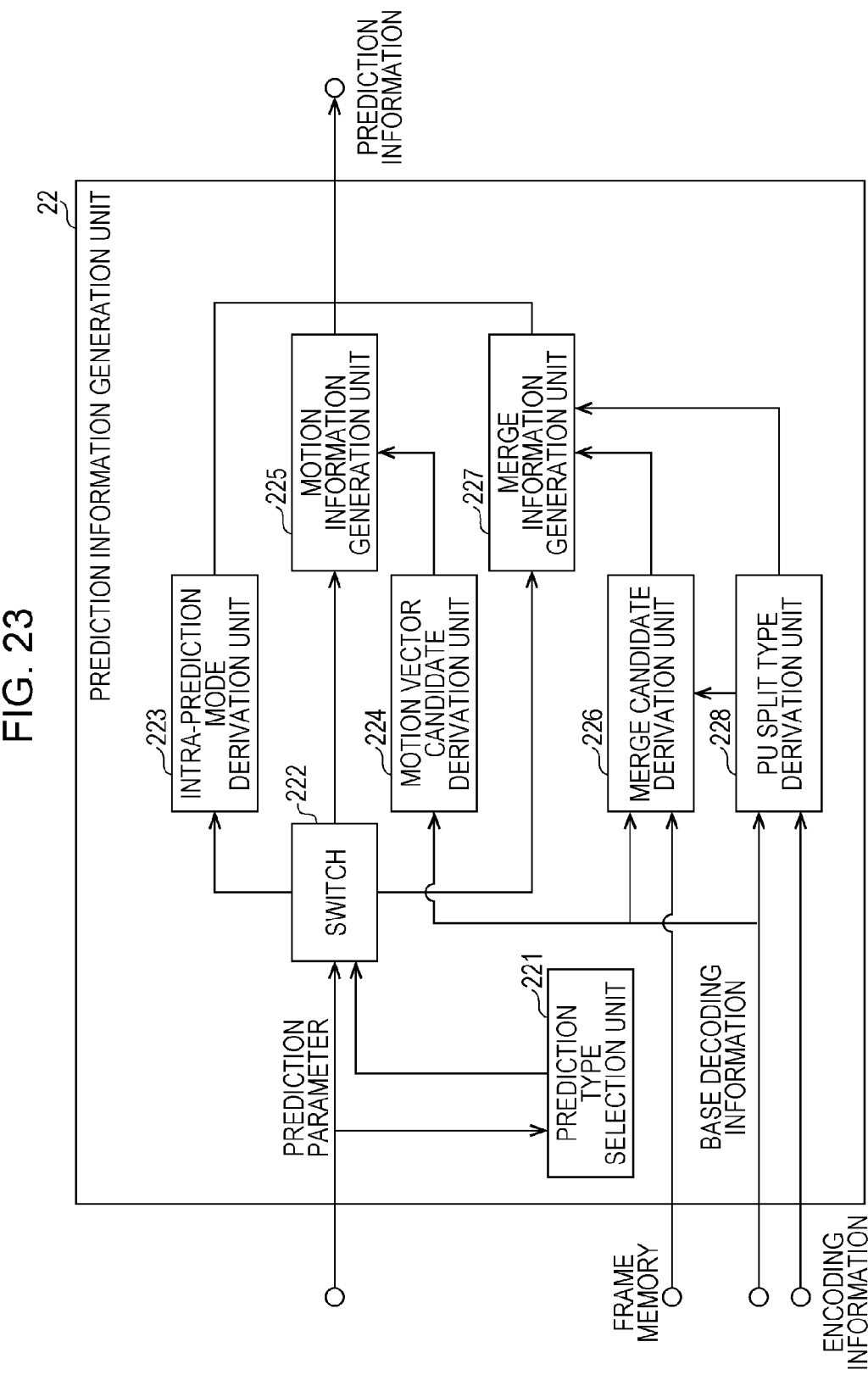
FIG. 23 is a functional block diagram illustrating a schematic configuration of a prediction parameter restoration unit included in the hierarchical moving image encoding device.

As illustrated in FIG. 23, the prediction information generation unit 22 includes a prediction type selection unit 221, a switch 222, an intra-prediction mode derivation unit 223, a motion vector candidate derivation unit 224, a motion information generation unit 225, a merge candidate derivation unit (inter-layer candidate derivation means) 226, a merge information generation unit 227, and a PU split type derivation unit 228.

The prediction type selection unit 221 controls the derivation process of the prediction parameter by sending a switching instruction to the switch 222 depending on the CU type or the PU type. Specifically, the operations are as follows.

When the intra-CU or the intra-PU is specified, the prediction type selection unit 221 controls the switch 222 so as to derive the prediction information by using the intra-prediction mode derivation unit 223.

When either the inter-CU (no merge) or the inter-PU (no merge) is specified, the prediction type selection unit 221 controls the switch 222 so as to derive the prediction parameter by using the motion information generation unit 225.

When any of the base skip CU, the base merge PU, the skip CU and the merge PU is specified, the prediction type selection unit 221 controls the switch 222 so as to derive the prediction parameter by using the merge information generation unit 227.

The switch 222 supplies the prediction parameter to any of the intra-prediction mode derivation unit 223, the motion information generation unit 225, and the merge information generation unit 227, in response to an instruction of the prediction type selection unit 221. The prediction parameter is derived in the supply destination of the prediction information.

The intra-prediction mode derivation unit 223 derives a syntax value regarding the intra-prediction mode. In other words, the value that is generated by the intra-prediction mode restoration unit 143 as the prediction information is a syntax value regarding the prediction mode.

The motion vector candidate derivation unit 224 derives a candidate of the estimated motion vector, by the intra-layer motion estimation process or the inter-layer motion estimation process, by using the base decoding information. The motion vector candidate derivation unit 224 supplies the derived candidate of the motion vector to the motion information generation unit 225.

The motion information generation unit 225 generates the syntax value regarding the motion information of each inter-prediction partition for which the merging is not performed. In other words, the value that is generated by the motion information restoration unit 145 as the prediction information is the syntax value regarding the motion information. Specifically, the motion information generation unit 225 derives an inter_pred_flag, an mvd, an mvp_idx, and a refIdx which are a corresponding syntax element value, from the motion compensation parameter of each PU.

Specifically, when the target PU is the base merge PU, the motion information generation unit 225 derives the syntax value, based on the candidate of the motion vector supplied from the motion vector candidate derivation unit 224.

Meanwhile, when the target CU (PU) is the inter-CU (inter-PU) for which the merging is not performed, the motion information restoration unit 145 derives the syntax value, based on the motion information included in the prediction parameter.

The merge candidate derivation unit 226 derives the merge candidate having the motion compensation parameter similar to the motion compensation parameter of each PU, by using the decoded motion information supplied from the frame memory 155 described later and/or the base decoding information supplied from the base decoding unit 23. The merge candidate derivation unit 226 supplies the derived merge candidate to the merge information generation unit 227. Since the configuration of the merge candidate derivation unit 226 is the same as the configuration of the merge candidate derivation unit 146 included in the hierarchical moving image decoding device 1, the description thereof will be omitted.

The merge information generation unit 227 generates a syntax value regarding motion information regarding each inter-prediction partition for which merging is performed. In other words, the value that is generated by the merge information generation unit 227 as the prediction information is a syntax value regarding the motion information. Specifically, the merge information generation unit 227 outputs the syntax element value merge_idx for designating the merge candidate having the motion compensation parameter similar to the motion compensation parameter of each PU.

The PU split type derivation unit 228 estimates the PU split type of the target CU of the target layer to the PU by using the encoding information and base decoding information. Since the configuration of the PU split type derivation unit 228 is the same as the configuration of the PU split type derivation unit 148 included in the hierarchical image decoding device 1, the detailed description thereof will be omitted.

(Texture Information Generation Unit)

The detailed configuration of the texture information generation unit 24 will be described with reference to FIG. 24. FIG. 24 is a functional block diagram illustrating a configuration of the texture information generation unit 24.

Figure 24:
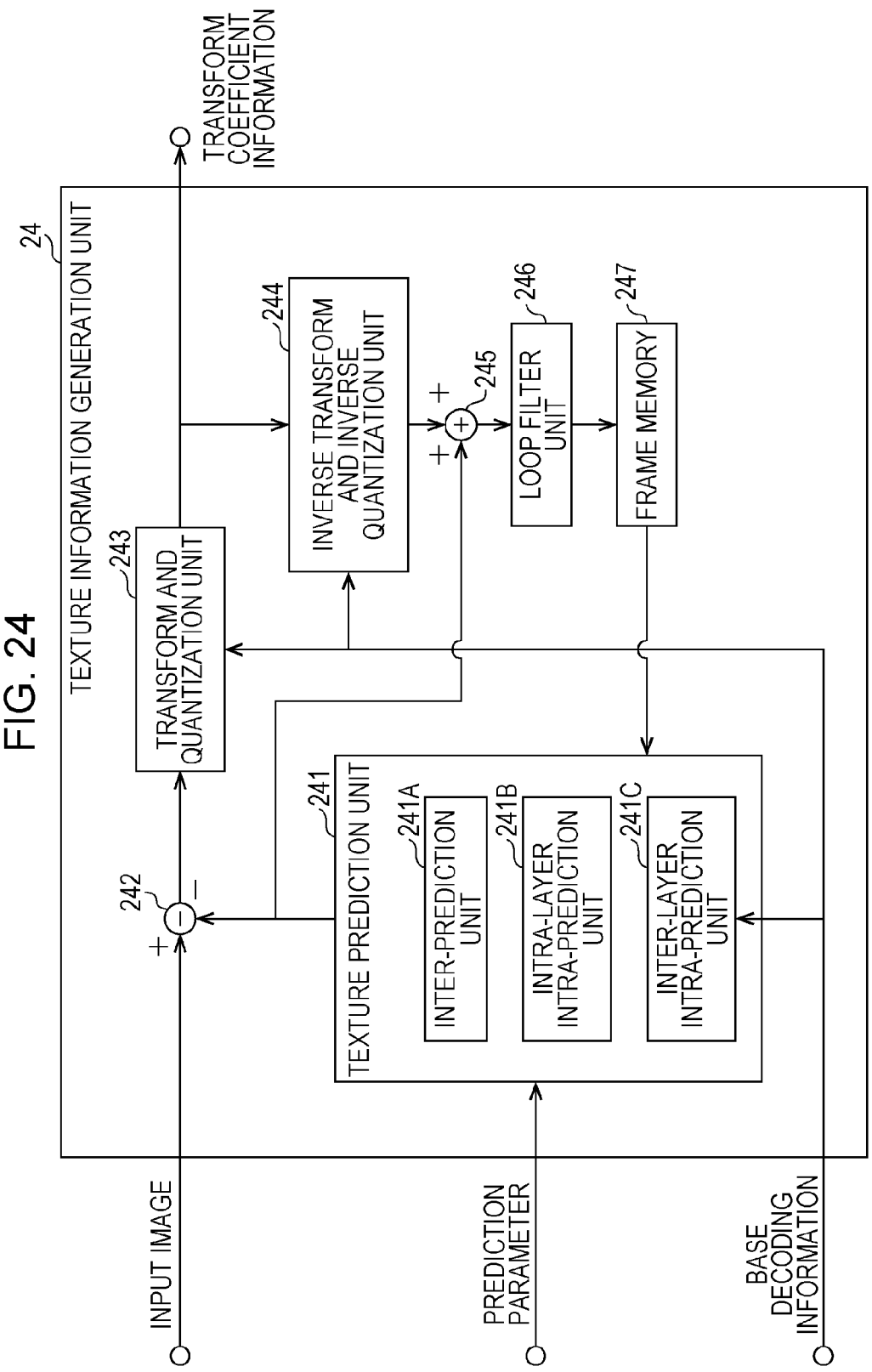
FIG. 24 is a diagram illustrating a direction of an available intra-prediction in the hierarchical moving image encoding device.

As illustrated in FIG. 24, the texture information generation unit 24 includes a texture prediction unit 241, a subtractor 242, an orthogonal transform and quantization unit 243, an inverse orthogonal transform and inverse quantization unit 244, an adder 245, a loop filter unit 246, and a frame memory 247.

The subtractor 242 generates a prediction residual D by subtracting the predicted image supplied from the texture prediction unit 241, from the input image PIN#T. The subtractor 242 supplies the generated prediction residual D to the transform and quantization unit 243.

The orthogonal transform and quantization unit 243 generates the quantized prediction residual by performing the orthogonal transform and quantization on the prediction residual D. In addition, here, the orthogonal transform means the orthogonal transform from the pixel region to the frequency region. Further, examples of the orthogonal transform include discrete cosine transform (DCT transform), discrete sine transform (DST transform), and the like. Further, a specific quantization process is as described already, and thus the description thereof will be omitted here. The orthogonal transform and quantization unit 243 supplies the transform coefficient information including the quantized prediction residual which is generated to the inverse transform and inverse quantization unit 244 and the variable length encoding unit 25.

Since the texture prediction unit 241, the inverse orthogonal transform and inverse quantization unit 244, the adder 245, the loop filter unit 246, and the frame memory 247 are respectively the same as the texture prediction unit 152, the inverse orthogonal transform and inverse quantization unit 151, the adder 153, the loop filter unit 154, and the frame memory 155 which are included in the hierarchical moving image decoding device 1, the description thereof will be omitted here. Here, the texture prediction unit 241 supplies the predicted image not only to the adder 245 but also to the subtractor 242.

(Application Example to Another Hierarchical Moving Image Encoding/Decoding System)

The hierarchical moving image encoding device 2 and the hierarchical moving image decoding device 1 which are described above can be used by being mounted in various devices that perform transmission, reception, recording, and playing of the moving image. In addition, the moving image may be a natural moving image which is captured by a camera and the like, or an artificial moving image (including a CG and a GUI) which is generated by a computer or the like.

First, a fact that the hierarchical moving image encoding device 2 and the hierarchical moving image decoding device 1, which are described above, can be used for transmitting and receiving a moving image will be described with reference to FIG. 25.

Figure 25:
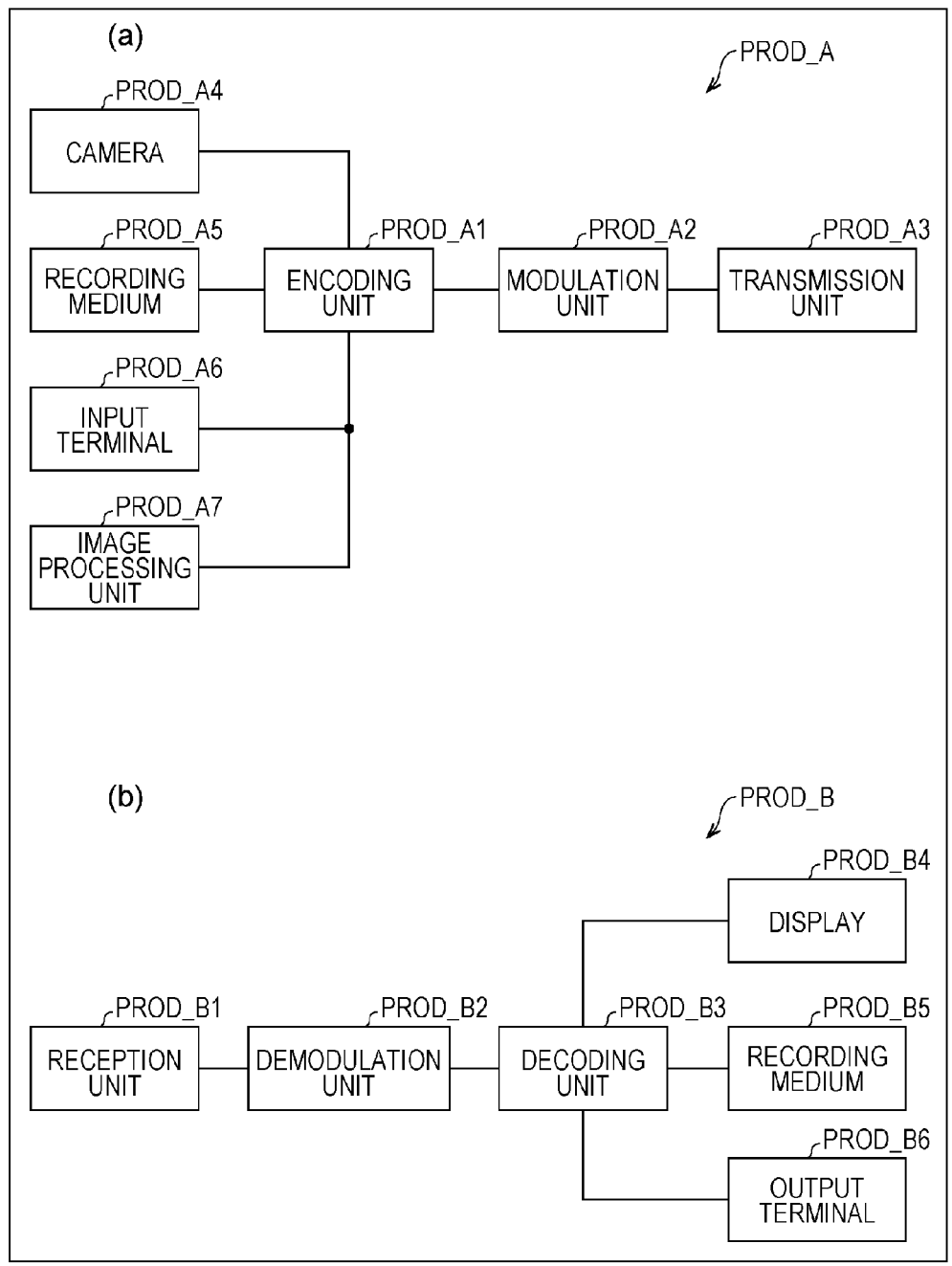
FIG. 25 is a diagram illustrating configurations of a transmission device equipped with the hierarchical moving image encoding device and a reception device equipped with the hierarchical moving image decoding device. (a) illustrates the transmission device equipped with the hierarchical moving image encoding device. (b) illustrates the reception device equipped with the hierarchical moving image decoding device.

FIG. 25(*a*) is a block diagram illustrating a configuration of a transmission device PROD_A equipped with the hierarchical moving image encoding device 2. As illustrated in FIG. 25(*a*), the transmission device PROD_A includes an encoding unit PROD_A1 that obtains encoded data by encoding a moving image, a modulation unit PROD_A2 that obtains a modulation signal by modulating a carrier with the encoded data obtained by the encoding unit PROD_A1, and a transmission unit PROD_A3 that transmits the modulation signal obtained by the modulation unit PROD_A2. The hierarchical moving image encoding device 2 described above is used as the encoding unit PROD_A1.

The transmission device PROD_A may further include a camera PROD_A4 that captures a moving image, as a source of a moving image to be input to the encoding unit PROD_A1, a recording medium PROD_A5 that records a moving image, an input terminal PROD_A6 for inputting a moving image from an outside, and an image processing unit A7 that generates and processes an image. FIG. 25(*a*) illustrates a configuration in which the transmission device PROD_A includes all these, but some parts may be omitted.

In addition, the recording medium PROD_A5 may record the moving image which is not encoded, or may record a moving image which has been encoded by a coding scheme for recording different from the coding scheme for transmission. In the latter case, a decoding unit (not shown) that decodes the encoded data which is read from the recording medium PROD_A5 according to the coding scheme for recording may be interposed between the recording medium PROD_A5 and the encoding unit PROD_A1.

FIG. 25(b) is a block diagram illustrating a configuration of a reception device PROD_B equipped with the hierarchical moving image decoding device 1. As illustrated in FIG. 25(b), the reception device PROD_B includes a reception unit PROD_B1 that receives a modulation signal, a demodulation unit PROD_B2 that obtains encoded data by demodulating the modulation signal received by the reception unit PROD_B1, and a decoding unit PROD_B3 that obtains a moving image by decoding the encoded data obtained by the demodulation unit PROD_B2. The hierarchical moving image decoding device 1 described above is used as the decoding unit PROD_B3.

The reception device PROD_B may further include a display PROD_B4 that displays a moving image, as a source of the moving image that is output by the decoding unit PROD_B3, a recording medium PROD_B5 that records the moving image, and an output terminal PROD_B6 for outputting the moving image to the outside. FIG. 25(b) illustrates a configuration in which the reception device PROD_B includes all these, but some parts may be omitted.

In addition, the recording medium PROD_B5 may record the moving image which is not encoded, or may be a moving image which has been encoded by a coding scheme for recording different from the coding scheme for transmission. In the latter case, an encoding unit (not shown) that encodes the moving image which is acquired from the decoding unit PROD_B3 according to the coding scheme for recording may be interposed between the decoding unit PROD_B3 and the recording medium PROD_B5.

In addition, the transmission medium for transmitting the modulation signal may be a wireless transmission medium, and a wired transmission medium. Further, the transmission mode for transmitting the modulation signal may be broadcasting (here, indicating a transmission mode in which a transmission destination is not specified in advance) and communication (here, indicating a transmission mode in which a transmission destination is not specified in advance). In other words, the transmission of the modulation signal may be realized by any of wireless broadcasting, wired broadcasting, wireless communication, and wireless communication.

For example, a broadcasting station (such as broadcasting equipment)/a receiving station (such as a television receiver) of terrestrial digital broadcasting are an example of the transmission device PROD_A/the reception device PROD_B that respectively transmits and receives a modulation signal in radio broadcasting. Further, a broadcasting station (such as broadcasting equipment)/a receiving station (such as a television receiver) of cable television broadcasting are an example of the transmission device PROD_A/the reception device PROD_B that respectively transmits and receives a modulation signal in wired broadcasting.

A server (such as a workstation)/a client (a television receiver, a personal computer, a smart phone, and the like) of a video on demand (VOD) service and a moving image sharing service using an inter-network are an example of the transmission device PROD_A/the reception device PROD_B that respectively transmits and receives a modulation signal in communication (typically, either wired or wireless is used as a transmission medium in a LAN, and a wired can be used as a transmission medium in a WAN). Here, examples of the personal computer include a desktop PC, a laptop PC, and a tablet PC. Further, examples of the smart phone include a multi-functional mobile phone terminal.

In addition, the client of the moving image sharing service has a function of encoding a moving image which has been captured by a camera and uploading the image to the server, in addition to a function of decoding encoded data which has been downloaded from the server and displays the data on a display. In other words, the client of the moving image sharing service functions as both the transmission device PROD_A and the reception device PROD_B.

Figure 26:
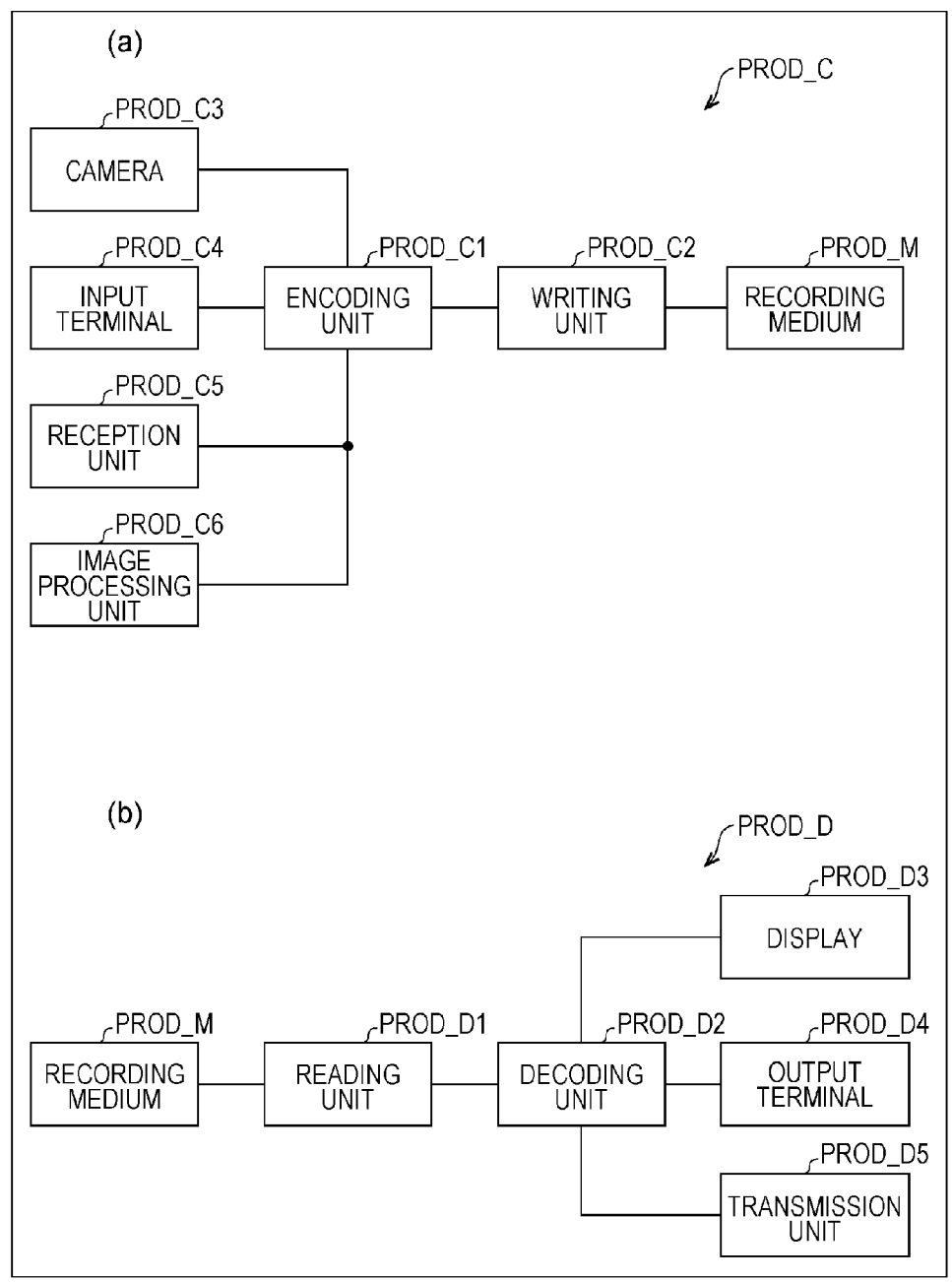
FIG. 26 is a diagram illustrating configurations of a recording device equipped with the hierarchical moving image encoding device and a playback device equipped with the hierarchical moving image decoding device. (a) illustrates the recording device equipped with the hierarchical moving image encoding device. (b) illustrates the playback device equipped with the hierarchical moving image decoding device.

Next, the recording and playback of a moving image by the hierarchical moving image encoding device 2 and the hierarchical moving image decoding device 1 that are described above will be will be described with reference to FIG. 26.

FIG. 26(a) is a block diagram illustrating a configuration of the recording device PROD_C equipped with the hierarchical moving image encoding device 2 described above. As illustrated in FIG. 26(a), the recording device PROD_C includes the encoding unit PROD_C1 that obtains encoded data by encoding a moving image, and the writing unit PROD_C2 that writes the encoded data obtained by the encoding unit PROD_C1 to the recording medium PROD_M. The hierarchical moving image encoding device 2 described above is used as the encoding unit PROD_C1.

In addition, the recording medium PROD_M, (1) may be a type incorporated in the recording device PROD_C, such as the hard disk drive (HDD) and a solid state drive (SDD), (2) may also be a type that is connected to the recording device PROD_C, such as an SD memory card, and a universal serial bus (USB) flash memory, or (3) may be mounted on a drive device (not shown) incorporated in the recording device PROD_C, such as a digital versatile disc (DVD) or a Blu-ray Disc (BD (registered trademark)).

Further, the recording device PROD_C may further include a camera PROD_C3 capturing a moving image, an input terminal PROD_C4 inputting a moving image from the outside, the reception unit PROD_C5 receiving a moving image, and the image processing unit C6 generating or processing an image, as a source of a moving images to be input to the encoding unit PROD_C1. In FIG. 26(a), all these are exemplified as components included in the recording device PROD_C, but some may be omitted.

In addition, the reception unit PROD_C5 may receive a moving image that has not been encoded, and may receive encoded data which has been encoded in a transmission coding scheme different from a recording coding scheme. In the latter case, a transmission decoding unit (not shown) that decodes the encoded data in the transmission coding scheme may be interposed between the reception unit PROD_C5 and the encoding unit PROD_C1.

Examples of the recording device PROD_C include, for example, a DVD recorder, a BD recorder, and a hard disk drive (HDD) recorder (in this case, the input terminal PROD_C4 or the reception unit PROD_C5 are the main source of a moving image). Further, a camcorder (in this case, the camera PROD_C3 is the main source of a moving image), a personal computer (in this case, the reception unit PROD_C5 or the image processing unit C6 are the main source of a moving image), a smart phone (in this case, the camera PROD_C3 or the reception unit PROD_C5 are the main source of the moving image) and the like are the examples of the recording device PROD_C.

FIG. 26(b) is a block diagram illustrating a configuration of a playback device PROD_D equipped with the hierarchical moving image decoding device 1 described above. As illustrated in FIG. 26(b), the playback device PROD_D includes a reading unit PROD_D1 that reads encoded data that is written in the recording medium PROD_M, and a decoding unit PROD_D2 that obtains a moving image by decoding the encoded data that is read by the reading unit PROD_D1. The hierarchical moving image decoding device 1 described above is used as the decoding unit PROD_D2.

In addition, the recording medium PROD_M (1) may be a type incorporated in the playback device PROD_D such as a HDD or an SSD, (2) may also be a type that is connected to the playback device PROD_D, such as an SD memory card, or a USB flash memory, or (3) may be mounted on a drive device (not shown) incorporated in the playback device PROD_D, such as a DVD or a BD.

Further, the playback device PROD_D may further include a display PROD_D3 displaying a moving image, an output terminal PROD_D4 outputting a moving image to the outside, and a transmission unit PROD_D5 transmitting a moving image, as a source of a moving image that is output by the decoding unit PROD_D2. In FIG. 26(b), all these are exemplified as components included in the playback device PROD_D, but some may be omitted.

In addition, the transmission unit PROD_D5 may transmit a moving image that has not been encoded, and may transmit encoded data which has been encoded in a transmission coding scheme different from a recording coding scheme. In the latter case, an encoding unit (not shown) that encodes a moving image in the transmission coding scheme may be interposed between the decoding unit PROD_D2 and the transmission unit PROD_D5.

Examples of the playback device PROD_D includes, for example, a DVD player, a BD player, a HDD player, and the like (in this case, the output terminal PROD_D4 connected to a television receiver or the like is the main source of a moving image). Further, a television receiver (in this case, the display PROD_D3 is the main source of a moving image), a digital signage (also referred to as a digital signage and an electronic bulletin board, and the display PROD_D3 or the transmission unit PROD_D5 are the main destination of a moving image), a desktop PC (in this case, the output terminal PROD_D4 or the transmission unit PROD_D5 is the main destination of a moving image), a laptop or tablet PC (in this case, the display PROD_D3 or the transmission unit PROD_D5 is the main destination of a moving image), a smartphone (in this case, the display PROD_D3 or the transmission unit PROD_D5 is the main destination of a moving image) are the examples of the playback device PROD_D.

(Hardware Realization and Software Realization)

Finally, respective blocks of the hierarchical moving image decoding device 1 and the hierarchical moving image encoding device 2 may be implemented in hardware by a logic circuit formed on an integrated circuit (IC chip), or may be implemented in software using a central processing unit (CPU).

In the latter case, the respective devices include a CPU that executes instructions of a control program for realizing each function, a read only memory (ROM) that stores the program, a random access memory (RAM) that deploys the program, and a memory (recording medium) that stores the program and various data. Then, the object of the present object may be realized by supplying a recording medium in which recording program codes of the control programs of the respective devices, which are software for realizing the functions described above (an executable program, an intermediate code program, and a source program), are recorded in a readable manner by the computer, to the respective devices, and by the computer (or a CPU or a micro processing unit (MPU)) reading and executing the program codes which are recorded on the recording medium.

As the recording medium, for example, tapes such as a magnetic tape or a cassette tape, disks including magnetic disk such as a floppy (registered trademark) disk/a hard disk, or an optical disk such as a compact disc read-only memory (CD-ROM)/a magneto-optical (MO)/a mini disc (MD)/a digital versatile disk (DVD)/a CD recordable (CD-R), cards such as an IC card (including a memory card)/an optical card, semiconductor memories such as a mask ROM/an erasable programmable read-only memory (EPROM)/an electrically erasable and programmable read-only memory (EEPROM (registered trademark))/a flash ROM, or logic circuits such as a programmable logic device (PLD) and a field programmable gate array (FPGA) can be used.

Further, the respective devices are configuration to be connected to a communication network, and the program codes may be supplied over the communications network. As long as any communication network is capable of transmitting the program codes, it is not particularly limited. For example, an inter-network, an intra-network, an extranet, a local area network (LAN), an integrated services digital network (ISDN), a value-added network (VAN), a community antenna television (CATV) communication network, a virtual private network, a telephone network, a mobile communication network, a satellite communication network and the like are available. Further, transmission media constituting the communication networks may be any medium capable of transmitting the program codes, and there is no restriction in a specific configuration or a type. For example, a wired medium such as the institute of electrical and electronic engineers (IEEE) 1394, a USB, a power-line carrier, a cable TV line, a telephone line, and an asymmetric digital subscriber line (ADSL) line, or a wireless medium such as an infrared ray such as an infrared data association (IrDA) or a remote control, Bluetooth (registered trademark), IEEE802.11 wireless, high data rate (HDR), near field communication (NFC), digital living network alliance (DLNA), a mobile telephone network, a satellite connection, a terrestrial digital network are available. In addition, the present invention may be realized in the form of a computer data signal embedded in a carrier wave, in which the program codes are embodied by electronic transmission.

The present invention is not limited to the embodiments described above, various variations are possible in the scope of claims, and embodiments obtained by appropriately combining technical means disclosed in the embodiments are also included in the technical scope of the present invention.

INDUSTRIAL APPLICABILITY

The present invention is applicable to a hierarchical moving image decoding device that decodes encoded data in which image data is hierarchically encoded, and a hierarchical moving image encoding device that generates encoded data in which image data is hierarchically encoded. Further, the present invention is suitably applicable to a data structure of the hierarchically encoded data which is generated by the hierarchical moving image encoding device and is referred to by the hierarchical moving image decoding device.

REFERENCE SIGNS LIST

1 HIERARCHICAL MOVING IMAGE DECODING DEVICE (IMAGE DECODING DEVICE)
11 NAL DEMULTIPLEXING UNIT

12 VARIABLE LENGTH DECODING UNIT (FLAG DECODING MEANS)
13 BASE DECODING UNIT
14 PREDICTION PARAMETER RESTORATION UNIT
15 TEXTURE RESTORATION UNIT
146 MERGE CANDIDATE DERIVATION UNIT
148 PU SPLIT TYPE DERIVATION UNIT
1461 MERGE CANDIDATE DERIVATION CONTROL UNIT (DETERMINATION MEANS)
1462 MERGE CANDIDATE STORAGE UNIT
1463 SLICE TYPE DETERMINATION UNIT
1464 INDIVIDUAL MERGE CANDIDATE DERIVATION UNIT
1464A SPACE MERGE CANDIDATE DERIVATION UNIT (TARGET LAYER CANDIDATE DERIVATION MEANS, SPATIAL MOTION INFORMATION CANDIDATE DERIVATION MEANS)
1464B INTER-LAYER MERGE CANDIDATE DERIVATION UNIT (INTER-LAYER CANDIDATE DERIVATION MEANS)
1464C TIME MERGE CANDIDATE DERIVATION UNIT (TARGET LAYER CANDIDATE DERIVATION MEANS, TIME MOTION INFORMATION CANDIDATE DERIVATION MEANS)
1464D COMBINED MERGE CANDIDATE DERIVATION UNIT (TARGET LAYER CANDIDATE DERIVATION MEANS)
1464E ZERO MERGE CANDIDATE DERIVATION UNIT (TARGET LAYER CANDIDATE DERIVATION MEANS)
1464F
1481 REFERENCE CU SETTING UNIT (REFERENCE CODING UNIT SETTING MEANS)
1482 PU SPLIT ESTIMATION UNIT (SPLITTING PATTERN SETTING MEANS)
1482A LOWER RIGHT PIXEL POSITION DETERMINATION UNIT
1482B OVERLAPPING REGION DETERMINATION UNIT
2 HIERARCHICAL MOVING IMAGE ENCODING DEVICE (IMAGE ENCODING DEVICE)
21 PREDICTION PARAMETER DETERMINATION UNIT
22 PREDICTION INFORMATION GENERATION UNIT
23 BASE DECODING UNIT
24 TEXTURE INFORMATION GENERATION
25 VARIABLE LENGTH ENCODING UNIT
26 NAL DEMULTIPLEXING UNIT
226 MERGE CANDIDATE DERIVATION UNIT (INTER-LAYER CANDIDATE DERIVATION MEANS)

The invention claimed is:

1. An image decoding device which decodes hierarchically encoded data, restores motion information of a decoding target layer, and restores an image of the target layer by using a predicted image generated by motion compensation prediction based on the restored motion information, comprising:
a merge candidate derivation circuit configured to derive a plurality of merge candidates in a target prediction unit for generating the predicted image on the target layer,
wherein the merge candidate derivation circuit includes, as one of individual merge candidate derivation means, an inter-layer candidates derivation circuit configured to derive a merge candidate called an inter-layer merge candidate, by using a motion information which is decoded and associated with a predetermined region on a reference layer,
wherein the predetermined region is a position corresponding to a lower right position derived by adding an offset, having a lower right direction, to a pixel position on a reference layer calculated by referring to a top-left pixel position of the target prediction unit,
wherein the merge candidate derivation circuit further includes, as one of the individual merge candidate derivation means, a spatial merge candidate derivation circuit configured to derive a merge candidate called a spatial merge candidate, by using motion information of positions of an upper right part, a lower left part, and an upper left part of the target prediction unit,
wherein a plurality of merge candidates derived by the merge candidate derivation circuit include the inter-layer merge candidate and the spatial merge candidate,
wherein a recording position of the motion information, which is decoded and associated to the predetermined position, is represented by $((xC0//N)*N, (yC0//N)*N)$, where $(xC0, yC0)$ is the predetermined position and N is positive integer value.

2. The image decoding device according to claim 1, wherein the inter-layer candidate derivation circuit derives an inter-layer merge candidate by referring motion information which is decoded and associated with a first position on a reference layer when the first position is available,
and the inter-layer candidate derivation means derives the inter-layer merge candidate by referring motion information which is decoded and associated with a second position, that is located on the upper left of the first position, when the first position is not available.

3. The image decoding device according to claim 1, further comprising:
a time motion information candidate derivation circuit configured to derive the merge candidate based on the motion information decoded in a picture other than a picture to which the target prediction unit belongs,
wherein the merge candidate derivation circuit execute either an inter-layer merge candidate derivation process, which is conducted by the inter-layer candidate derivation means, or a merge candidate derivation process, which is conducted by the time motion information candidate derivation means.

4. An image encoding device which generates a prediction residual of a target layer by subtracting a predicted image which is generated by motion compensation prediction based on motion information which is derived in the target layer which is an encoding target, from an input original image of the target layer, in a case of generating hierarchically encoded data, comprising:
a merge candidate derivation circuit configured to derive a plurality of merge candidates in a target prediction unit for generating the predicted image on the target layer,
wherein the merge candidate derivation circuit includes, as one of individual merge candidate derivation means, an inter-layer candidates derivation circuit configured to derive a merge candidates called an inter-layer merge candidate, by using a motion information which is decoded and associated with a predetermined region on a reference layer,
wherein the predetermined region is a position corresponding to a lower right position derived by adding an offset, having a lower right direction, to a pixel position on a reference layer calculated by referring to a top-left pixel position of the target prediction unit, wherein the merge candidate derivation circuit further includes, as one of the individual merge candidate derivation means, a spatial merge candidate derivation circuit configured to derive a merge candidate called a spatial merge candidate, by using motion information of positions of an upper right part, a lower left part, and an upper left part of the target prediction unit, wherein a plurality of merge candidates derived by the merge candidate derivation circuit include the inter-layer merge candidate and the spatial merge candidate, wherein a recording position of the motion information, which is decoded and associated to the predetermined position, is represented by ((xC0//N)*N, (yC0//N)*N), where (xC0, yC0) is the predetermined position and N is positive integer value.

* * * * *